United States Patent [19]

Harrison et al.

[11] Patent Number: 5,379,439

[45] Date of Patent: * Jan. 3, 1995

[54] FIXED DISK DRIVE MOUNTED TO PRINTED CIRCUIT BOARD

[75] Inventors: Joel N. Harrison, Monte Sereno; William G. Moon, Sunnyvale; Randolph H. Graham, Fremont, all of Calif.

[73] Assignee: Quantum Corporation, Milpitas, Calif.

[*] Notice: The portion of the term of this patent subsequent to Jan. 27, 2004 has been disclaimed.

[21] Appl. No.: 782,376

[22] Filed: Oct. 24, 1991

Related U.S. Application Data

[63] Continuation of Ser. No. 697,726, May 3, 1991, abandoned, which is a continuation of Ser. No. 395,910, Aug. 18, 1989, abandoned, which is a continuation of Ser. No. 277,024, Nov. 28, 1988, Pat. No. 4,860,194, which is a continuation of Ser. No. 926,627, Nov. 3, 1986, abandoned, which is a continuation of Ser. No. 741,175, Jun. 4, 1985, Pat. No. 4,639,863.

[51] Int. Cl.⁶ .............................................. G06C 1/16
[52] U.S. Cl. .................................. 395/800; 364/248; 364/DIG. 1
[58] Field of Search ............... 395/800; 360/77, 73; 364/248, DIG. 1

[56] References Cited

U.S. PATENT DOCUMENTS

| | | | |
|---|---|---|---|
| 4,419,701 | 12/1983 | Harrison et al. | 360/77 |
| 4,568,988 | 2/1986 | McGinlay et al. | 360/77 |
| 4,639,798 | 1/1987 | Harrison et al. | 360/73 |

Primary Examiner—Parshotam S. Lall
Assistant Examiner—John Harrity
Attorney, Agent, or Firm—David B. Harrison

[57] ABSTRACT

A fixed disk memory subsystem connects to digital signal buses and a power supply of a host computer and includes a printed circuit board forming a subsystem mounting substrate for mounting and connecting a head and disk assembly and drive electronics. The head and disk assembly includes a radially positionable head transducer for flying in close proximity to a data storage surface of at least one rotating data storage disk, an actuator for positioning the data transducer at concentric data tracks defined on the surface, and a DC brushless spindle motor for rotating the data storage disk. The drive electronics includes a data transducer position control circuit for controlling operation of the actuator in relation to the concentric data tracks, read/write electronics connected to the transducer, a disk user data controller for obtaining digital control signals and digital data blocks from the host computer for storage in predetermined ones of said data tracks, and for supplying digital status signals and digital data blocks retrieved from predetermined ones of said data tracks to the host computer, and a programmed digital microcontroller connected for controlling operations of said data transducer position control circuit, the disk user data controller and the interface circuit.

9 Claims, 28 Drawing Sheets

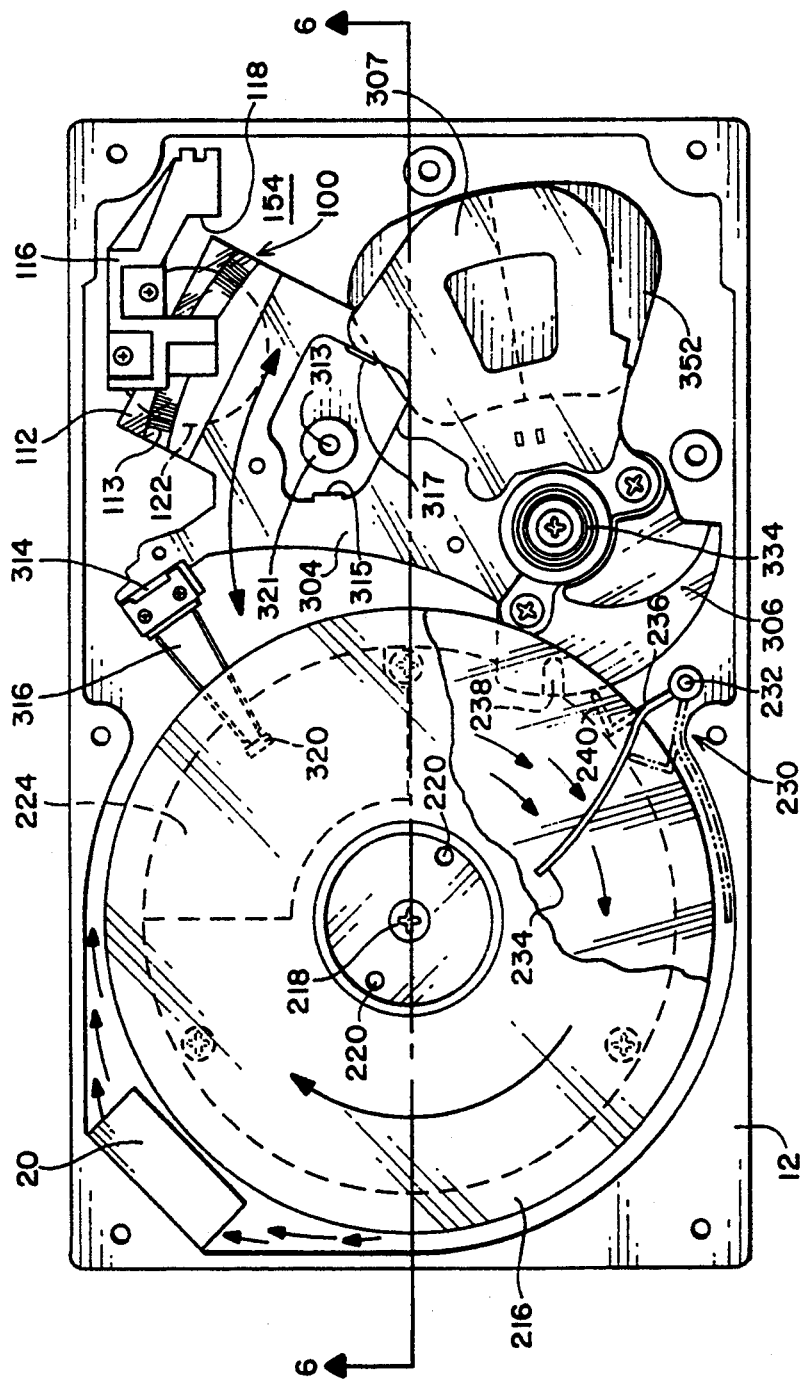

FIXED DISK DRIVE MOUNTED TO PRINTED CIRCUIT BOARD

This is a continuation of U.S. patent application Ser. No. 07/697,726 filed May 3, 1991, now abandoned, which is a continuation of U.S. patent application Ser. No. 07/395,910 filed on Aug. 18, 1989, now abandoned, which is a continuation of U.S. patent application Ser. No. 07/277,024 filed on Nov. 28, 1988, now U.S. Pat. No. 4,860,194, which is a continuation of Ser. No. 06/926,627, filed on Nov. 3, 1986, now abandoned, which is a continuation of U.S. patent application Ser. No. 06/741,175, filed on Jun. 4, 1985, now U.S. Pat. No. 4,639,863.

BACKGROUND OF THE INVENTION

The present invention relates to rotating disk data storage peripheral equipment for digital computers. More particularly, the present invention relates to a miniaturized, plug-in rotating fixed disk file subsystem module.

REFERENCE TO RELATED PATENTS AND PATENT APPLICATIONS

The following U.S. Patents and co-pending patent applications are pertinent to the present disclosure:

U.S. Pat. No. 4,396,959 (now U.S. Reissue Pat. No. 32,075) for Data Transducer Position Control System for Ratating Disk Data Storage Equipment;

U.S. Pat. No. 4,419,701 for Data Transducer Actuator Control System for Rotating Disk Data Storage Equipment;

U.S. Pat. No. 4,516,177 for Rotating Rigid Disk Data Storage Device;

U.S. patent application Ser. No. 06/439,897 filed on Nov. 8, 1982 for Aerodynamically Released Safety Latch for Data Transducer Assembly in Rotating Rigid Disk Data Storage Device now U.S. Pat. No. 4,538,193;

U.S. patent application Ser. No. 06/806,082, filed on Dec. 6, 1985, a division of Ser. No. 06/444,523 filed on Nov. 26, 1982, for Improvements in Rotating Disk Data Storage Device now U.S. Pat. No. 4,638,798;

U.S. patent application Ser. No. 06/728,674 filed on Apr. 25, 1985, for Aerodynamic Latch for Disk File Actuator now U.S. Pat. No. 4,647,997;

U.S. patent application Ser. No. 714,179, filed on the same date as this application for Optical Encoder Assembly, now U.S. Pat. No. 4,703,176;

U.S. patent application Ser. No. 741,178, filed on the same date as this application for Compact Head and Disk Assembly, now U.S. Pat. No. 4,712,146;

U.S. patent application Ser. No. 741,588, filed on the same date as this application for Microprocessor Controlled Rigid Disk File Subsystem, now U.S. Pat. No. 4,819,153;

U.S. patent application Ser. No. 741,174, filed on the same date as this application for Improved Optical Encoder, now U.S. Pat. No. 4,661,696.

Disk drives (also known as disk files) have become standard equipment for storing and retrieving user data in both large and small digital computer systems. Such drives have used removable rigid, semi-rigid and flexible disks e.g. coated with magnetic media for storing the data. Optical data storage techniques are also known. Disk drives of the type employed by the present invention have also used non-removable rotating storage disks in sealed, dust free environments in which the data transducers fly very close to the storage surface on an air cushion or bearing in accordance with what is known as "Winchester" technology. These disk drives store and retrieve data in concentric data tracks formed on the major surfaces of the data storage disk. Such non-removable or "fixed" disk base drives are able to store a significant amount of user data on each storage surface, such as five million bytes of user data per storage surface.

By moving the data transducers radially relative to the rotating disks with electromagnetic disk actuator mechanisms, disk drives are able to gain access to any data location within a very short period of time. Thus, such drives combine the features of substantial data storage capacity and random rapid access to any selected concentric track containing the stored data.

Traditionally, disk drives have been bulky and have required multiple separate subparts: an enclosed head and disk assembly; control electronics for the head and disk assembly, usually packaged with the head and disk assembly, a controller for controlling the formatting of the data storage surface and for thereafter controlling each data storage (write) and retrieval (read) operation performed by the drive; and an interface, for interfacing both the controller and the drive control electronics to the host computer, so that its operating system may use the drive effectively as a data storage resource available to the computer user.

Small computer systems, sometimes referred to as "personal computers" and as exemplified by the IBM Personal Computer TM typically provide attachment locations and electrical connections for a few accessory circuit cards. These accessory cards may provide disk drive controller, video display, modem, additional memory, and other functions. Usually the space allocated for such accessory cards is narrow (one inch across) and elongated. Also, the power supply available for such additional accessories is quite limited.

One significant drawback of the traditional approach has been that the use of separate circuits for the control electronics, controller and interface has led to redundancies of circuitry, particularly control, address and data buffers, and consequent high power consumption levels. These power consumption levels have required host computer systems to be designed to supply the required higher levels, or have required separate or special power supplies to be used.

One other significant drawback of the traditional approach has been the physical space required to house the head and disk assembly, its control electronics, the controller and the interface. When separate housings have been employed, significant drawbacks have been the clutter presented by the multiple housings and requirement that housings be cabled together with cables carrying a large number of conductors. Such cablings and plugs, extending outside of the housings, are exposed and have been known to fail, thereby rendering the disk drive subsystem inoperative and useless until repaired. Also, multiple housings have complicated the portability of small personal computer systems.

Fixed disk drive head and disk assemblies do not lend themselves to home or field repairs. The disk drive enclosure may only be opened safely for inspection and service in a "clean-room" environment. Thus, the servicing of small fixed disk files usually goes on in the factory or at one or a few central service locations.

In light of these and other drawbacks known to those skilled in the art, a hitherto unsolved need has arisen for a fully integrated, highly miniaturized, very low power rotating non removable disk data storage subsystem module for direct plug-in attachment to and use within small host computer systems, typically of the "personal or professional computer" (single user) type, without use of any cabling and without any modification of the host beyond plugging in the modular subsystem.

SUMMARY OF THE INVENTION WITH OBJECTS

A general object of the present invention is to miniaturize and to integrate a complete disk file subsystem into a small unitary module for direct plug-in attachment to and removal from a host computer system in a manner which overcomes the limitations and drawbacks of prior art disk file subsystems.

A specific object of the present invention is to provide a miniaturized, fully integrated disk drive subsystem in a flat, elongated form factor for plug-in attachment to a single user computer so as to occupy a single accessory jack location provided in the computer for attachment of accessories.

A further object of the present invention is to provide a miniaturized and fully self contained unitary disk file subsystem for direct plug-in attachment to a host computer of the single user type without requiring any hardware modification of the computer.

One more object of the present invention is to provide a miniaturized and fully self contained unitary disk file subsystem which may be plugged into and used with a host computer of the single user type by the computer user without requiring any special skills or special tools for the installation or for use.

A further object of the present invention is to provide a compact and efficient electronic control system which uses a single microprocessor to supervise operations of the disk file.

A modular unitary disk file subsystem for a host computer incorporating the principles of the present invention includes a thin, compact, and enclosed radially movable head and fixed rotating disk assembly. An elongated, planar support substrate is provided for mounting and supporting the head and disk assembly and for mounting, carrying and connecting electronic circuit elements for moving the head radially relative to the disk. The electronic circuit elements are provided for controlling data storage operations for storing and retrieving data from among selected concentric data tracks formed on a data storage surface of the fixed rotating disk through the head, and for interfacing the disk file subsystem with the host computer. The support substrate further includes a connector at a single location thereon, the connector being provided for obtaining power, control and data signals from the host computer, and for supplying control, status and data signals to the host computer. Thus, the support substrate thereby carries and interconnects the subsystem with the host computer as a direct plug-in unit within the housing of the host, without any cabling between the host and the subsystem.

These and other objects, advantages and features of the present invention will become more apparent from the following detailed description of a preferred embodiment, presented in conjunction with the accompanying drawings.

BRIEF DESCRIPTION OF THE DRAWINGS

In the Drawings:

FIG. 5 is a diagrammatic top plan view of the head and disk assembly depicted in FIG. 3, showing the elements thereof in place, except for the upper magnet and flux return plate, and certain flexible connection substrates which have been omitted to facilitate clarity of explanation and understanding.

FIG. 6 is a longitudinal view in side elevation and section of the assembly of FIG. 3 through the axis of rotation of the spindle motor. The section is along the line 6—6 in FIG. 5.

DETAILED DESCRIPTION OF A PREFERRED EMBODIMENT

Figure 1:
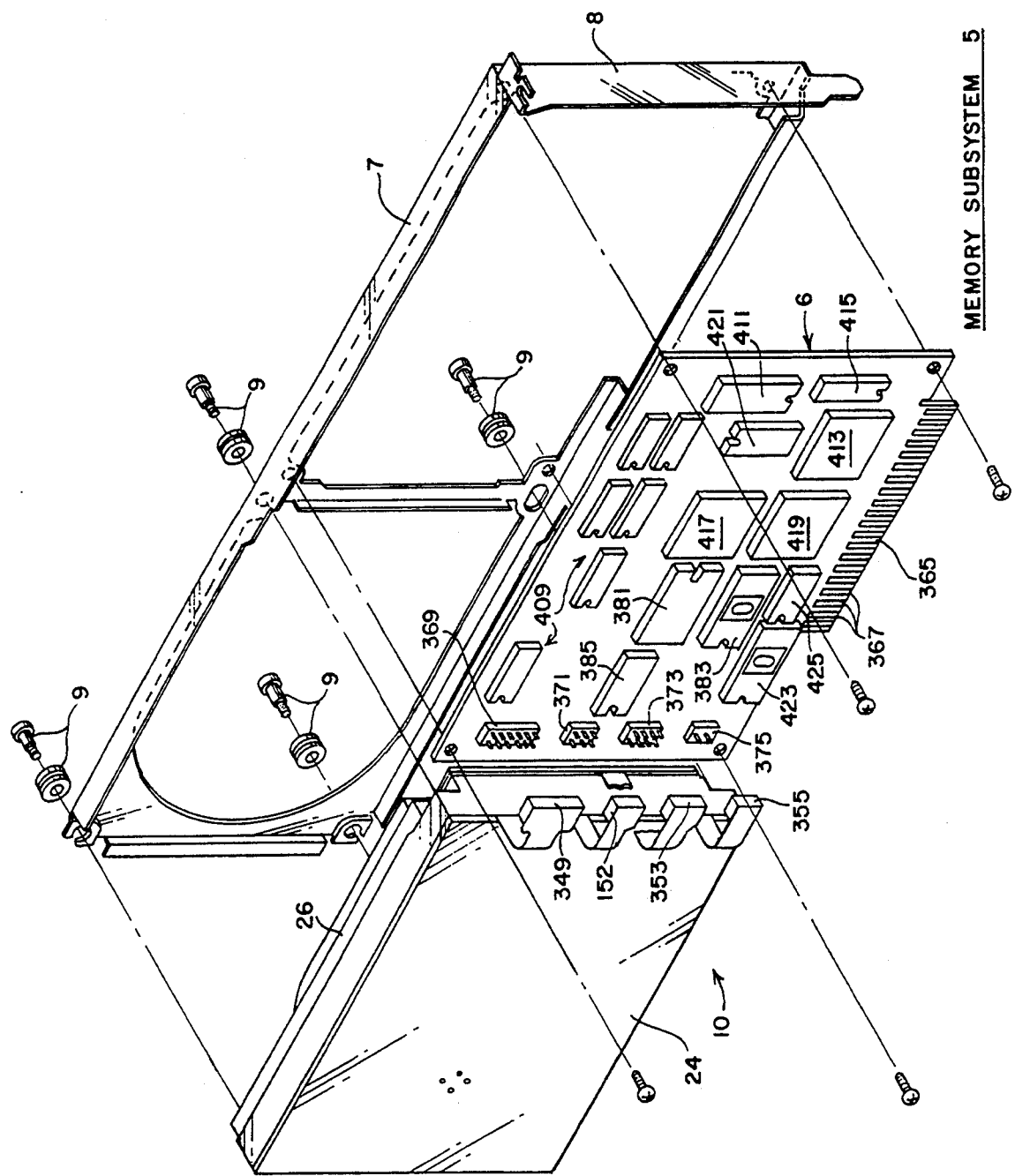
FIG. 1 is an exploded isometric and somewhat diagrammatic view of a compact, modular disk file subsystem including a mounting frame, the subsystem being in accordance with the principles of the present invention.
Figure 2:
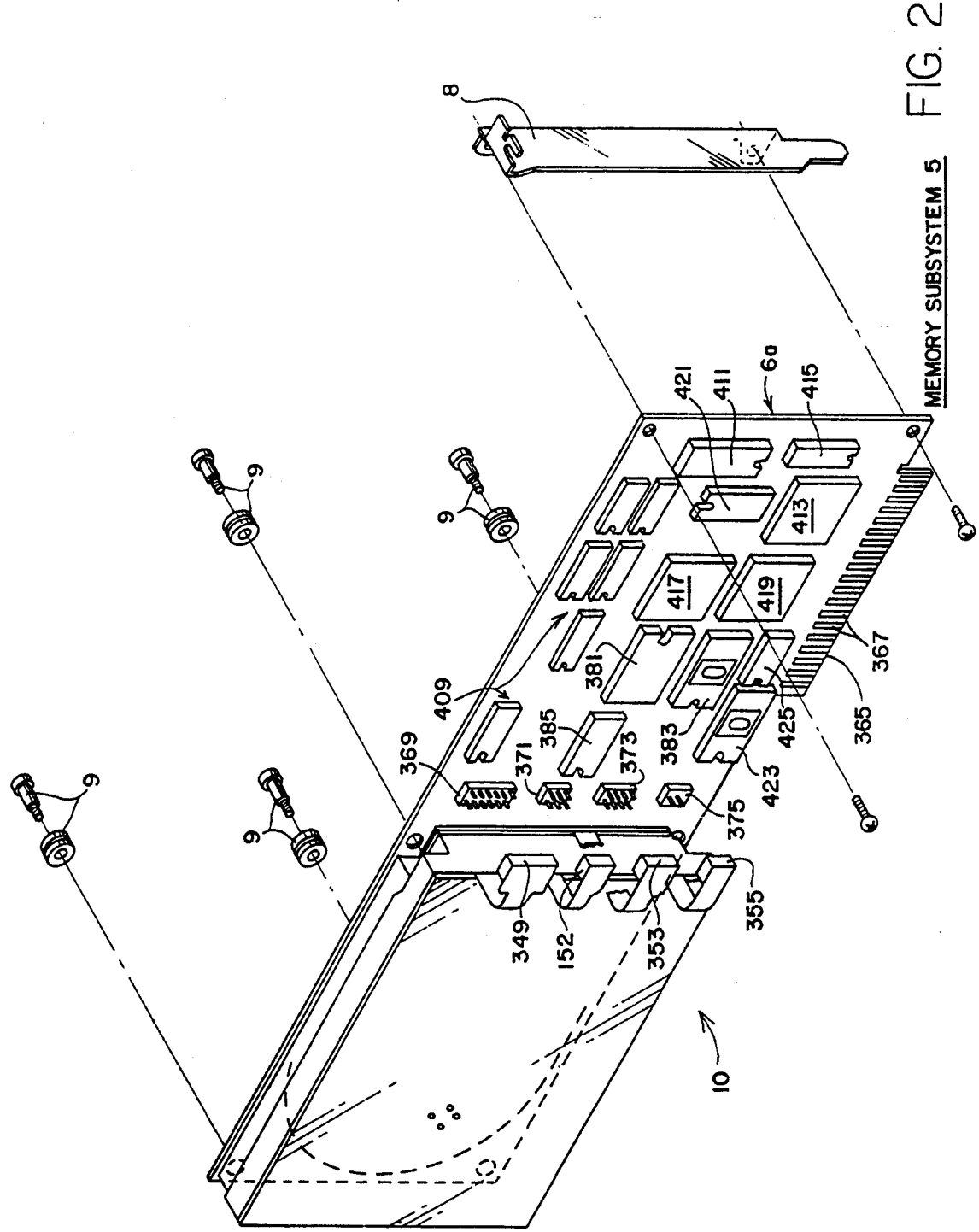
FIG. 2 is an exploded isometric and somewhat diagrammatic view of the subsystem of FIG. 1 wherein a printed circuit substrate is extended and provides the mounting substrate for the head and disk assembly.

As seen in FIGS. 1 and 2 a miniaturized rotating fixed disk data storage subsystem 5 includes in FIG. 1 a printed circuit card 6 carrying substantially all of the highly modularized and integrated electronic circuits required to operate the subsystem 5, and an elongated frame 7 (shown in FIG. 1). The printed circuit card may be strengthened and elongated and be used as a supporting substrate 6a in lieu of the frame 7, as shown in FIG. 2. A mounting flange 8 formed as a part of the frame 7 (FIG. 1), or attached to the circuit card 6A by screws (FIG. 2), enables the subsystem 5 to be mounted in and occupy a single accessory slot of a single user computer, such as the IBM Personal Computer TM, for example and thereby achieve a direct electrical plug-in connection thereto.

Head and Disk Assembly

A thin and compact head and disk assembly 10, depicted in detail in FIGS. 3–10 and discussed hereinafter, is attached to the frame 7 (FIG. 1) or to the printed circuit board 6 (FIG. 2) via mounting hardware 9 which provides for some insulation of the assembly 10 from physical shocks to the host.

Figure 3:
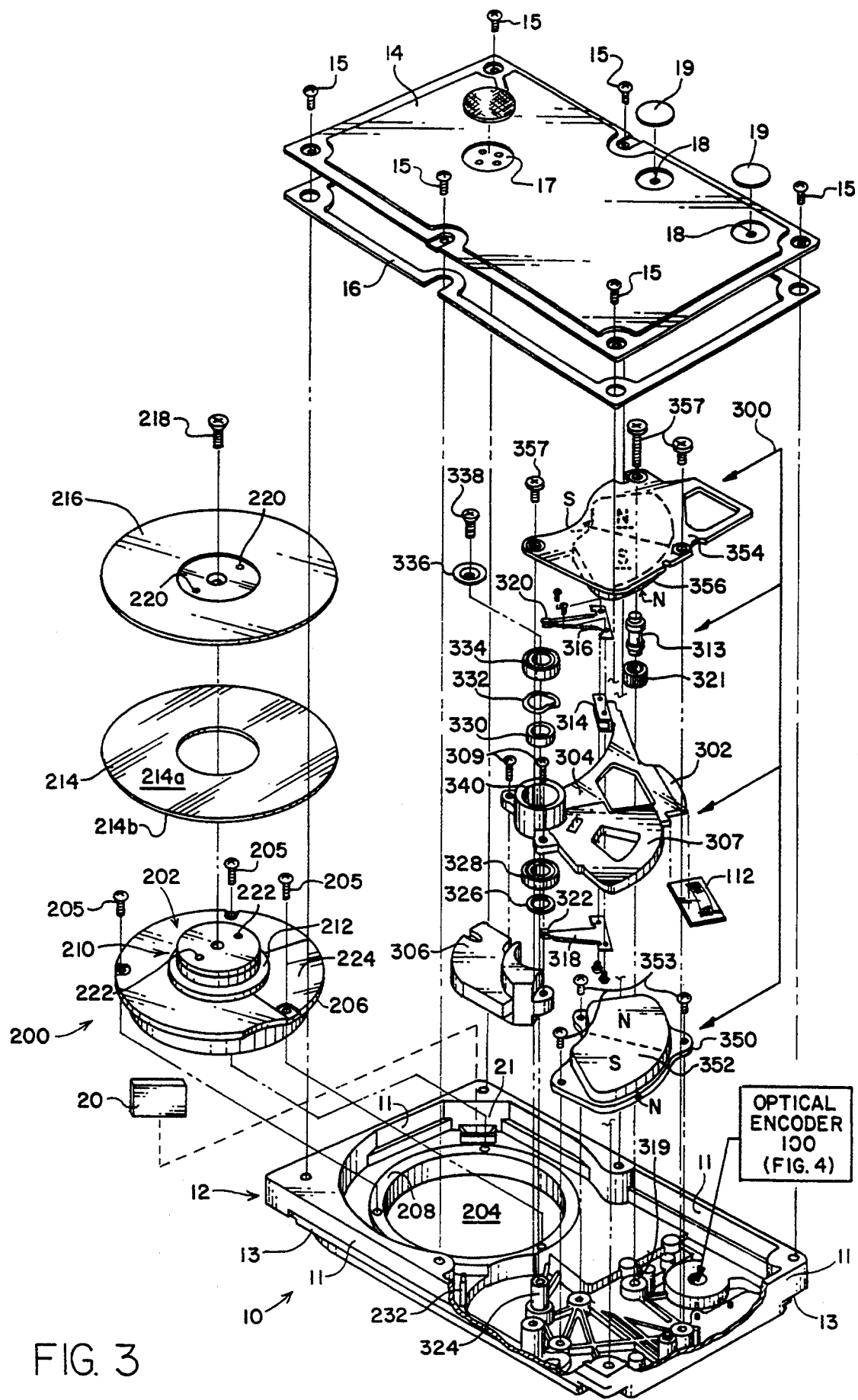
FIG. 3 is a somewhat diagrammatic and exploded view in perspective of an assembly of the elements comprising the head and disk assembly incorporating the principles of the present invention. The elements depicted in FIG. 3 have been dispersed along broken explosion lines to facilitate illustration of the head and disk assembly.

In FIG. 3, the assembly 10 is shown as including a housing 12, which functions to enclose, align, and/or support all of the other elements included as part of the assembly 10. The housing 12 is preferably formed as a metal casting, such as of aluminum. The housing 12 may also be formed from stock by machining, and may also be formed by sintering of formed powdered metal, in accordance with known technology. A continuous outer peripheral wall 11 and recesses 13 (FIG. 7) serve to reinforce the housing 12 and also to minimize the amount of material required in its fabrication.

A cover 14 attaches to the housing 12 via screws 15 and thereby encloses the interior thereof. A gasket 16 seals the interior of the housing 12 from the ambient, and prevents intrusion of foreign particulate material, such as dust, which would interfere with the operation of the assembly 10. A breather filter 17 enables the pressure inside the housing 12 to equalize to exterior ambient. Two ports 18 are provided through the cover 14 to enable the interior to be purged of dust particles during the manufacturing operation. Seals 19 seal the two ports 18 after purging.

A micropore air filter 20 is mounted in one corner 21 of the housing 12 and filters internal air to remove any particulate contamination during operation.

The head and disk assembly 10 includes three major elements or subsystems: an optical encoder subassembly 100 described in connection with FIG. 4; a disk, spindle and direct drive spindle motor subassembly 200 described in connection with FIGS. 3 and 6–8, and a rotary actuator and motor subassembly 300, described in connection with FIGS. 3, 5, 6, 8, and 9.

Optical Encoder Subassembly 100

The encoder subassembly 100 includes three major parts. The first part is a moving scale 112 having alternating light translucent and opaque radial microlines 113. The scale 112 is mounted on a ledge 302 of a substantially planar rotary actuator frame 304 of limited angular displacement which is rotatably journalled to the housing 12 as shown in FIGS. 3 and 5, and discussed hereinafter in greater detail. Thus, in this preferred embodiment the scale 112 is also of limited angular displacement, limited to a maximum of approximately thirty degrees of arc (30°).

The second part of the encoder 100 is a unitized encoder structure 114 comprising a light source holder 116 carrying an LED light source 118 and a mirror 120, a photocell array carrier 122 carrying and aligning a photocell array 124 and an overlying mask or reticle 126, a support bolt 128 having a widened circular head or table top 130 for mounting the light source holder 116 and the photocell array carrier 122 and having a threaded cylindrical shank 132. A wave spring washer 134 is interposed between the shank 132 and an annular machined plateau 136 surrounding a cylindrical opening formed through a bottom wall portion 136 of the housing 12. The cylindrical opening is sized to receive the shank therethrough in a freely rotating relationship. A locking nut 140 threads onto the shank 132 after it is passed through the base portion 138 so as to secure the bolt 128 and the other elements it carries to the base portion 138.

The photocell array 124 includes an upper photocell 124A, a lower photocell 124B, and an AGC cell 124C located between the two photocells 124A and 124B.

Figure 4:
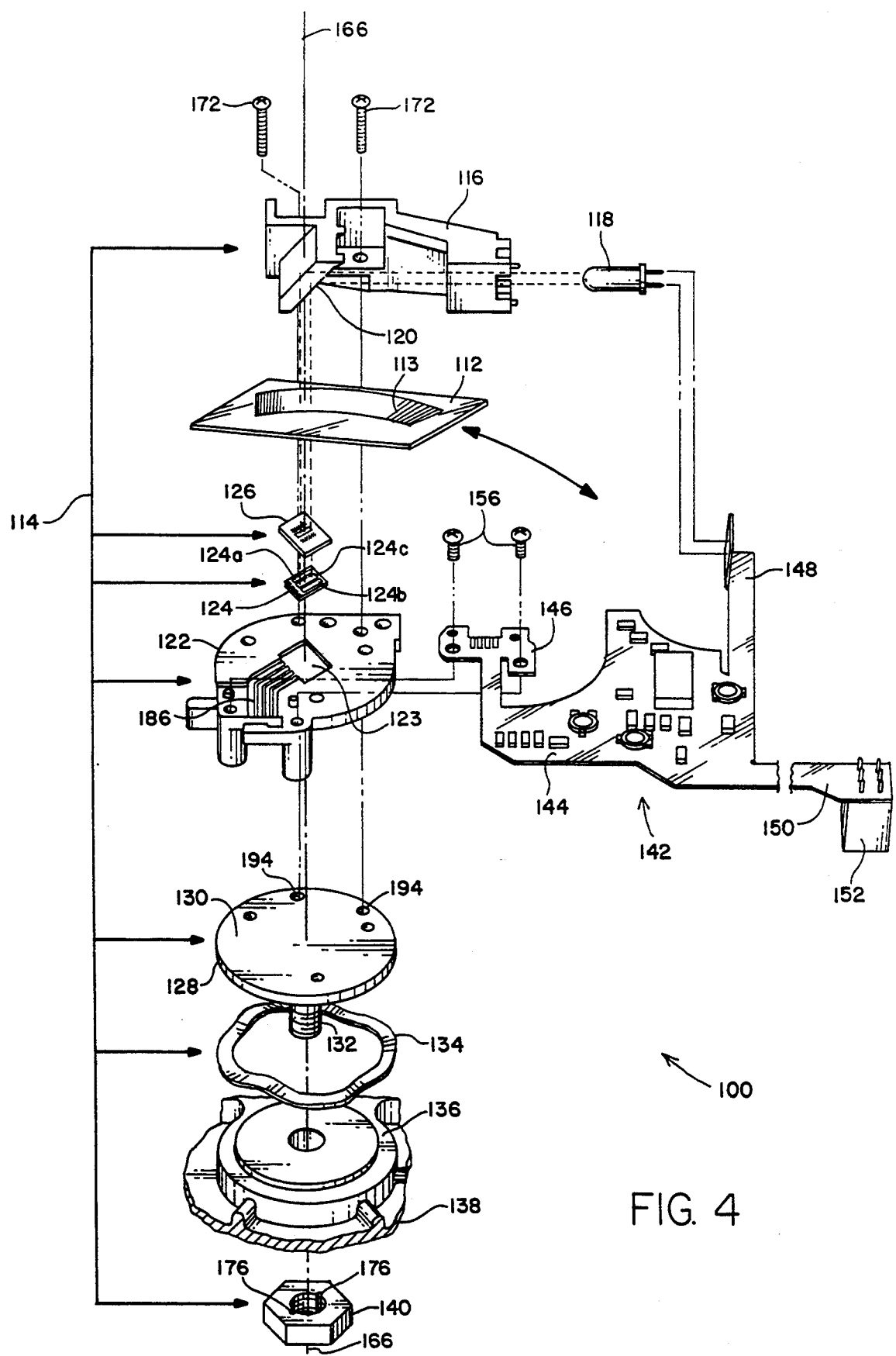
FIG. 4 is an exploded diagrammatic view in perspective along a single central axis of explosion of the structural elements comprising a compact optical encoder subassembly incorporated within the head and disk assembly depicted in FIG. 3.

The LED light source holder 116 is secured to the support bolt 128 by screws 172 which pass through the holder 116, and also through the photocell array carrier 122 and into threaded openings 194 provided in the table top 130 of the support bolt 128, as shown in FIG. 4.

The photocell array carrier 172 includes a central well 123 in which the photocell array 124 is mounted. A small printed circuit board 186 is provided adjacent to a connection edge of the photocell array 124. Fine wires are then bonded between connection pads of the array 124 and corresponding traces of the circuit board 186. The reticle 126 is then directly mounted over the photocell array 124 in precise optical alignment, so that openings in the reticle 126, in cooperation with the radial microlines 113 of the scale 112, enable generation of polyphase incremental position electrical signals which are related to the position of the actuator frame 304 relative to the housing 12.

Figure 7:
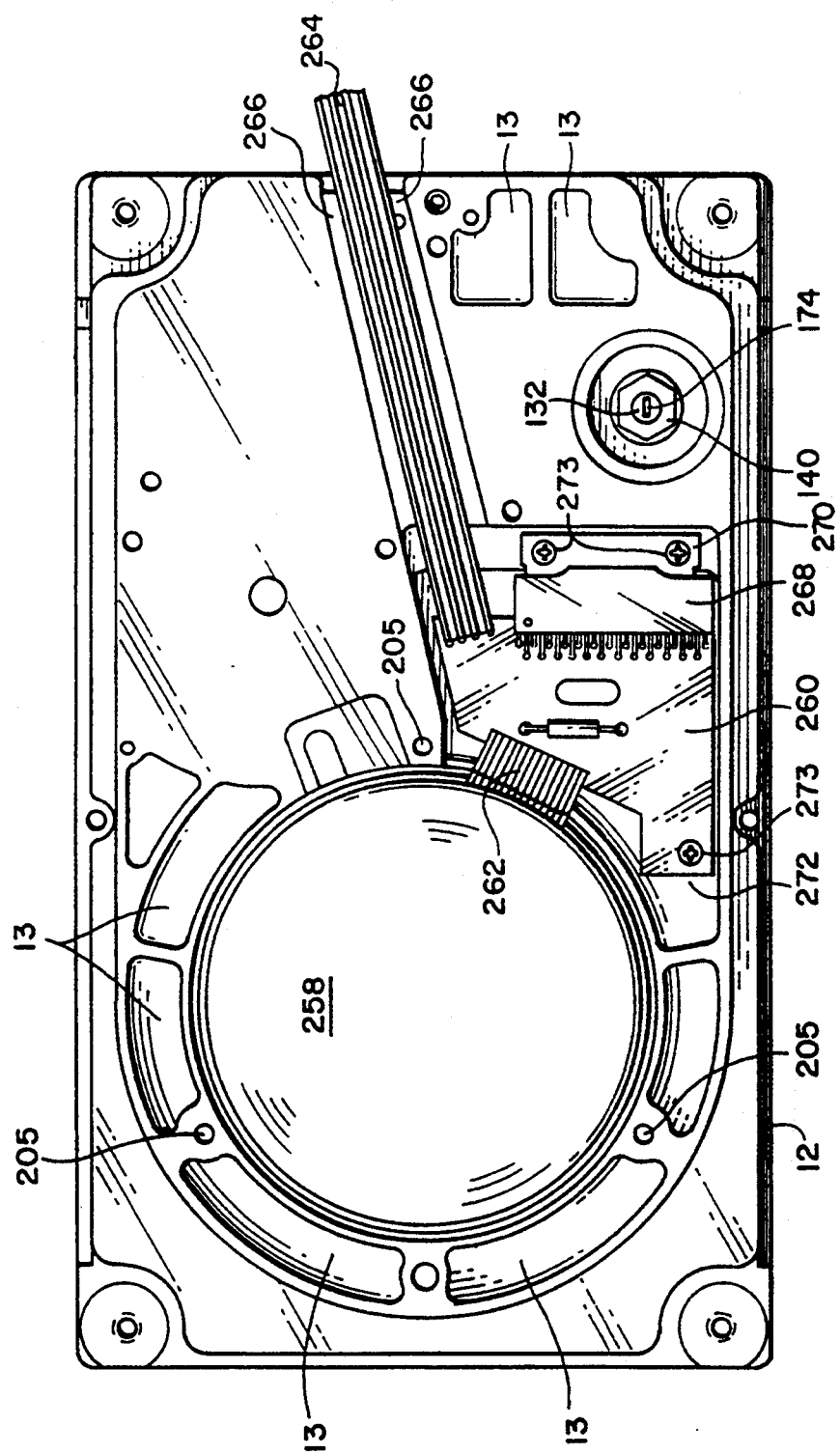
FIG. 7 is a diagrammatic bottom plan view of the head and disk assembly depicted in FIG. 3.

The threaded shank 132 of the bolt 128 passes through the housing at the location shown in FIGS. 3 and 7. The bolt 128 includes a slot 174 (FIG. 7) which enables the encoder assembly 114 to be rotated during final assembly and optical alignment in the housing 12. The nut 140 enables the assembly 114 to be locked at a precise height relative to the scale, by virtue of compression of the wave spring washer 134. The nut 140 includes two transverse grooves 176 at its threads. These grooves 176 enable the nut 140 to be glued effectively to the bolt 128 and to the housing 12 once proper alignment of the encoder and scale is achieved during the manufacturing process.

The third part of the subassembly 10 is an electronic circuit 142 which is preferably formed of electronic components secured to a flexible film printed circuit substrate 144. The substrate 144 is adapted to be placed inside the housing 12 adjacent to the encoder subassembly 100, in a well generally designated by the reference numeral 154 in FIG. 5.

The substrate 144 includes three integral flexible connection extensions, a first extension 146 enabling connection to the photodetector array 124 via the small circuit board by screws 156 at the locations indicated by the broken lead lines in FIG. 4. A second extension 148 extends to and enables connection of the circuit 142 to the LED light source 118, and a third extension 150 includes a suitable plug 152 for enabling direct overall electrical connection of the subassembly 110 to the disk drive control electronics circuit cord 6, 6a with which the head and disk assembly 10 may be used. This connection via the plug 152 is external to the housing 12, and the thin film extension 150 passes between the housing 12 and the gasket 16 to the external connection location, with the electrical traces being adjacent to the insulating gasket 16 and with the mylar substrate being against the lip of the housing 12.

Optical Encoder Circuit 142

Figure 18:
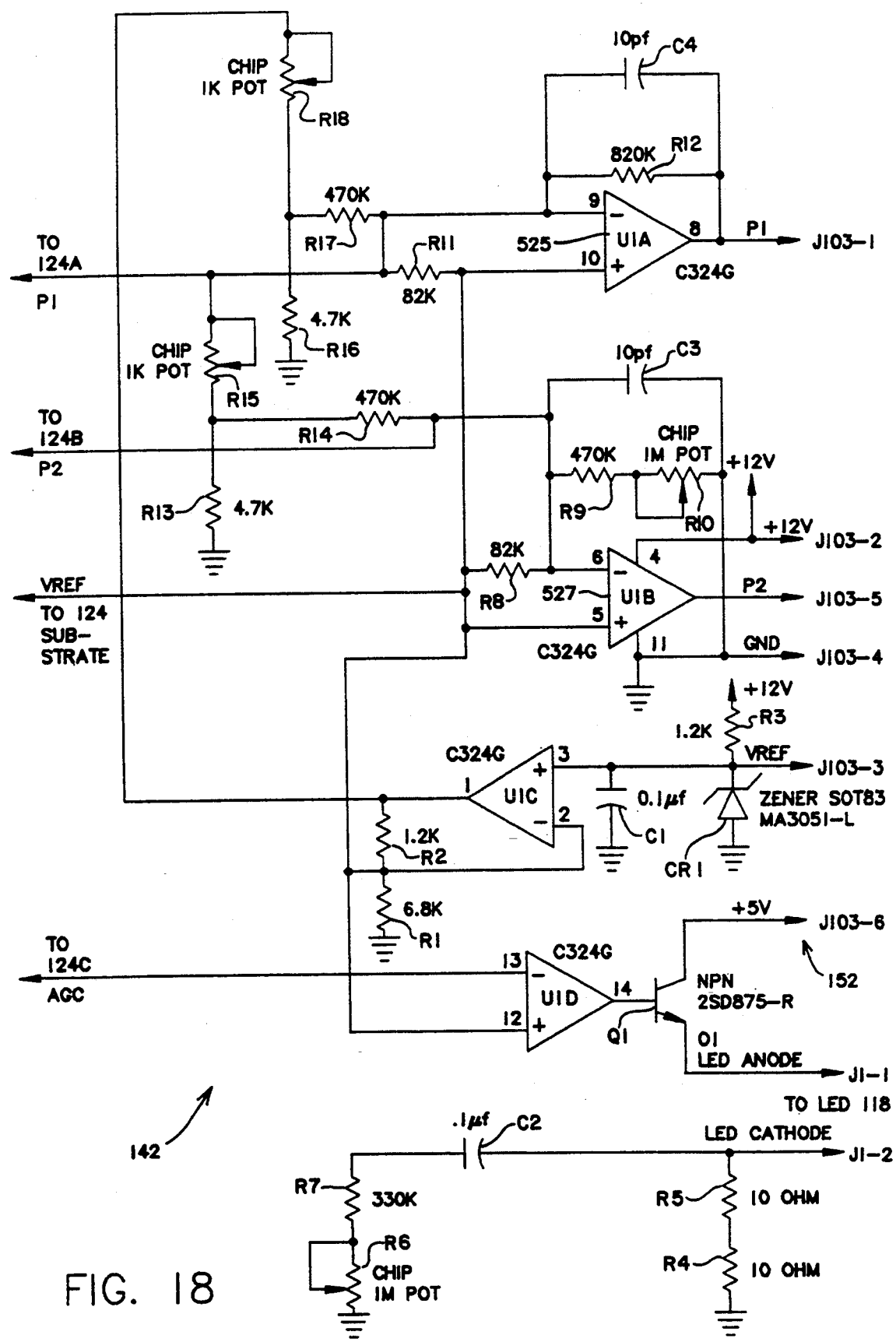
FIG. 18 is a detailed schematic diagram of an optical encoder circuit carried on the flexible circuit substrate depicted in FIG. 4.

As depicted schematically in FIG. 18, an integrated circuit U1 contains four operational amplifiers U1A, U1B, U1C and U1D. The amplifier U1A is a current to voltage converter and has an inverting input connected to the anode of the upper photocell 124A of the photodetector array 124, and the amplifier U1B is a current to voltage converter having an inverting input connected to the anode of the lower photocell 124B of the array. A negative feedback circuit comprising a capacitor C4 and a resistor R12 adjusts the frequency response and gain of the converter U1A, and a similar but adjustable network of capacitor C3 and series resistors R9 and R10 adjusts the frequency response and gain of the converter U1B. The resistor R10 is variable, so that the gain characteristics of U1B may be made the same as those for the converter U1A.

A reference voltage Vref is derived from a 12 V supply bus from the host computer through a network comprising a series resistor R3 and 5.0 volt zener diode CR1. The zener regulated 5.0 volts is applied to the non-inverting input of an operational amplifier U1C. A resistance network of resistors R2 and R1 provide at a common node a feedback path to an inverting input of the amplifier U1C and a reference voltage Vref which connects to the common cathode substrate of the photodetector array 124 via a connector J2-2. The values of the resistors R1 and R2 establish the voltage present at the output of the amplifier U1C. This output voltage is supplied to two adjustable networks: the first network comprising the resistors R16, R17 and R18 for controlling the operation of the converter U1A, and the second network comprising the resistors R13, R14 and R15 for controlling the operation of the converter U1B. Resistors R18 and R15 are individually adjustable so that the electrical characteristics of the photocells 124A and 124B respectively may be individually controlled and equalized in terms of voltage output over the range of light to dark. These two adjustments R18 and R15 also enable each photocell 112, 114 of the polyphase encoder 100 to be trimmed to accomodate the particular gap between the scale 112 and the mask 126 without loss of current amplitude between the maxima of light and dark conditions at each photocell.

An automatic gain control (AGC) cell 124C of the array 124 is connected to an inverting input of an operational amplifier U1D via a connector J2-31. The non-inverting input of the amplifier U1D is connected to the Vref node. The output of the amplifier U1D is connected to a driver transistor Q1 which in turn supplies current from a 5 volt bus of the host equipment to the anode of the LED light source 118. The cathode of the light source is connected through two current limiting resistors R4 and R5 to ground. A series network of resistors R6 and R7, in combination with the current put out by the AGC photocell 124C controls the current put out by the operational amplifier U1D and actually applied to the LED through the driver transistor Q1. R6 is adjustable to control quiescent current through the LED 118.

Disk and Spindle Motor Subassembly 200

The disk and spindle motor subassembly 200 includes a very thin and flat direct drive, brushless spindle motor 202 which mounts in a well 204 of the housing 12 by three screws 205. The screws 205 pass through openings in a peripheral flange 206 of the motor 202 which mates with a machined annular surface 208 adjacent to the open well 204. The lower surface of the flange 206 and the facing surface 208 of the housing 12 are machined, so that the motor 202 is thereby sealed in an airtight arrangement with the housing 12.

The motor 202 includes a rotating hub 210 which has a lower flange 212. A data storage disk 214 mounts over the hub 210 and against the flange 212. The flange 212 has a height adapted to align the data disk 214 properly within the interior of the housing 12. The disk 214 is coated on both major surfaces with a magnetic storage material such as a ferrous oxide or plating and provides the storage medium of the compact head and disk assembly 10. In the preferred embodiment, the disk has a diameter of approximately 95 millimeters, and has the capability of easily storing in excess of ten million bytes of formatted data.

An airflow generator disk 216, preferably formed of a low-mass plastic material, attaches to the top of the hub 210 by a single axial locking screw 218. Two opposed peripheral openings 220 through the disk 216 align with two openings 222 on the top of the hub 210. A spanner wrench is used to prevent the hub 210 from rotating while the screw 218 is tightened. The spanner wrench is provided with two pins aligned with, the openings 220 and 222. The pins pass through the openings 220 and 222 and thereby align the top disk 216 and the hub 10 as the screw is locked into place. A spacer 213 between the top disk 216 and the data disk 214 locks the data disk 214 against the lower flange 212.

The top surface of the spindle motor 202 includes a recessed and shielded region 224, in which an electromagnetic shield is placed, in order to prevent contamination of data stored on the lower surface by the electromagnetic fields generated inside of the motor 202.

As seen in FIG. 5, an aerodynamically released shipping latch 230 is rotatably mounted on a vertical post 232 (FIG. 3) in the housing 12. A vane 234 and flag 236 of the latch 230 are deflected by airflow generated by clockwise rotation of the disks 214 and 216. The airflow is sufficient to overcome the force exerted by a bias spring (not shown) which urges the latch 230 in a clockwise direction. A notch 238 provided in a counterweight 306 of the rotary actuator 300 is engaged by a finger 240 when there is no rotation of the disks 214 and 216 (and no airflow). This arrangement latches the rotary actuator 300 into a landing zone position.

When power is removed from the head and disk assembly, the counter electromotive force generated by rotation of the spindle motor 202 in response to the inertia stored in the motor 202, spindle 210 and disks 214, 216, is automatically applied to the rotary actuator 300 in order to return the actuator to the landing zone position before disk rotation ceases and the aerodynamic latch 230 is no longer deflected by airflow. This electronic return spring feature is described hereinafter, in connection with the electrical circuit elements.

One important requirement for the head and disk assembly 10 is that the spindle 210 be effectively grounded to the frame. Ordinarily, an electrical brush makes contact between the spindle shaft and the housing external to the motor. However, such arrangement adds significantly to the height of the motor and to the overall thickness of the head and disk assembly. Thus, it has been discovered that a grounding mechanism 250 (FIG. 6) may be placed entirely within the spindle shaft 252 of the motor 202.

The preferred mechanism includes a spring loaded ball or tip 254 inside the hollow spindle shaft 252. The tip 254 is of conductive material, such as a carbon impregnated plastic resin material, and it makes direct contact with a pad 256 of highly conductive hardened material such as stainless steel which is fixed and connected to the stationary enclosure 258 of the motor 202. The enclosure 258 is grounded to the housing 12 at the peripheral flange 206 by the screws 205.

One important aspect of the present invention is that the electronic circuitry required to drive the multiple windings of the spindle motor 202 be sinked directly to the housing. The arrangement shown in FIG. 7 makes direct heat sinking of the driving circuitry to the housing 12 possible. In FIG. 7, a small printed circuit module 260 plugs into a cable 262 from the motor 202 and also plugs into the circuit board 6 externally of the head and disk assembly 10 via a cable 264 disposed in a channel 266 formed in the back of the housing 12.

Figure 8A:
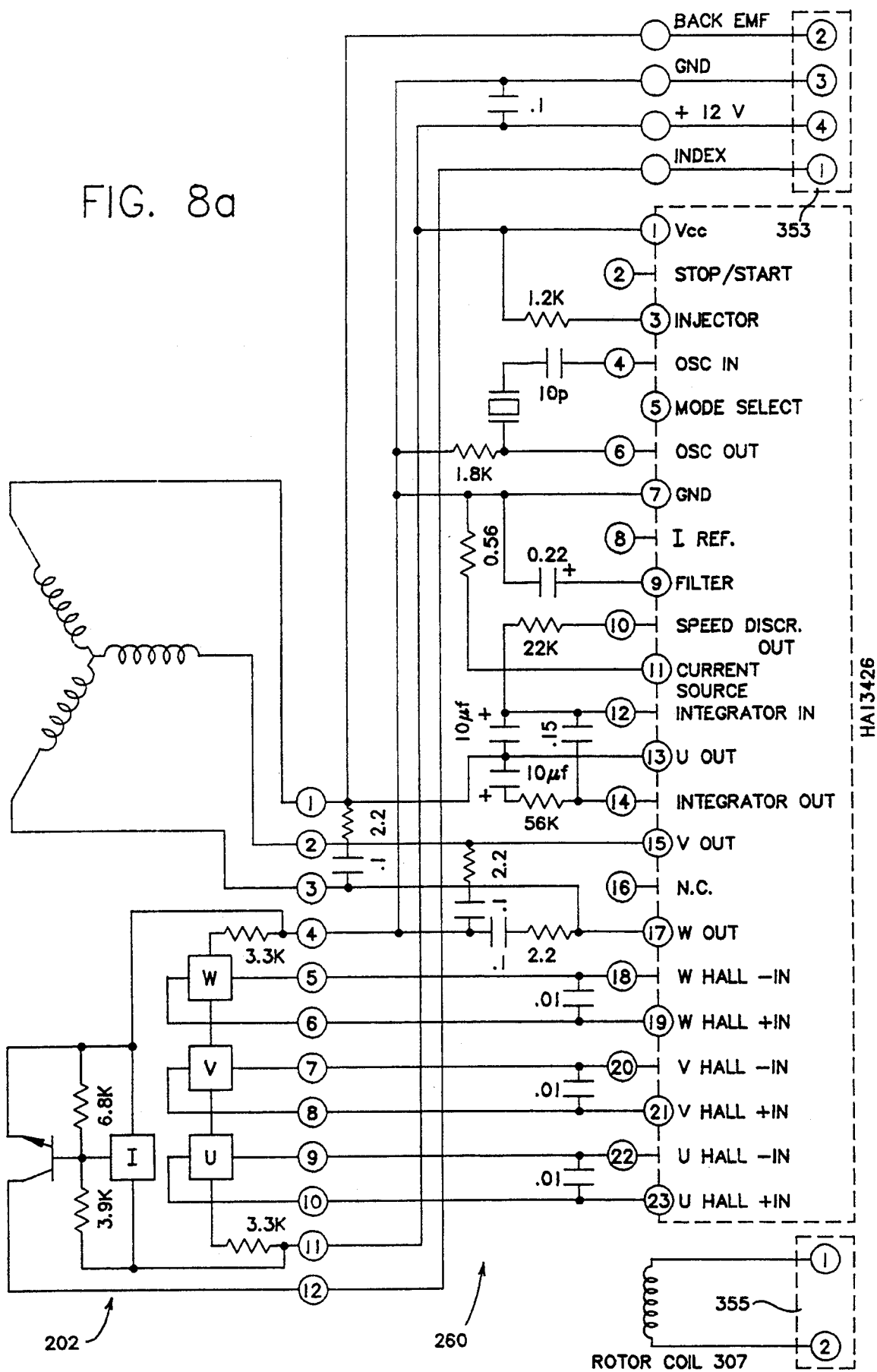
FIGS. 8A, and 8B are respectively an electronic schematic circuit diagram of the three phase, brushless spindle motor depicted in FIG. 3 and an electronic schematic circuit diagram of a driver circuit needed to operate and commutate the brushless DC spindle motor; and, a bottom or inside plan view of one preferred layout of a small circuit module for carrying the circuitry depicted in FIG. 8A.
Figure 8B:
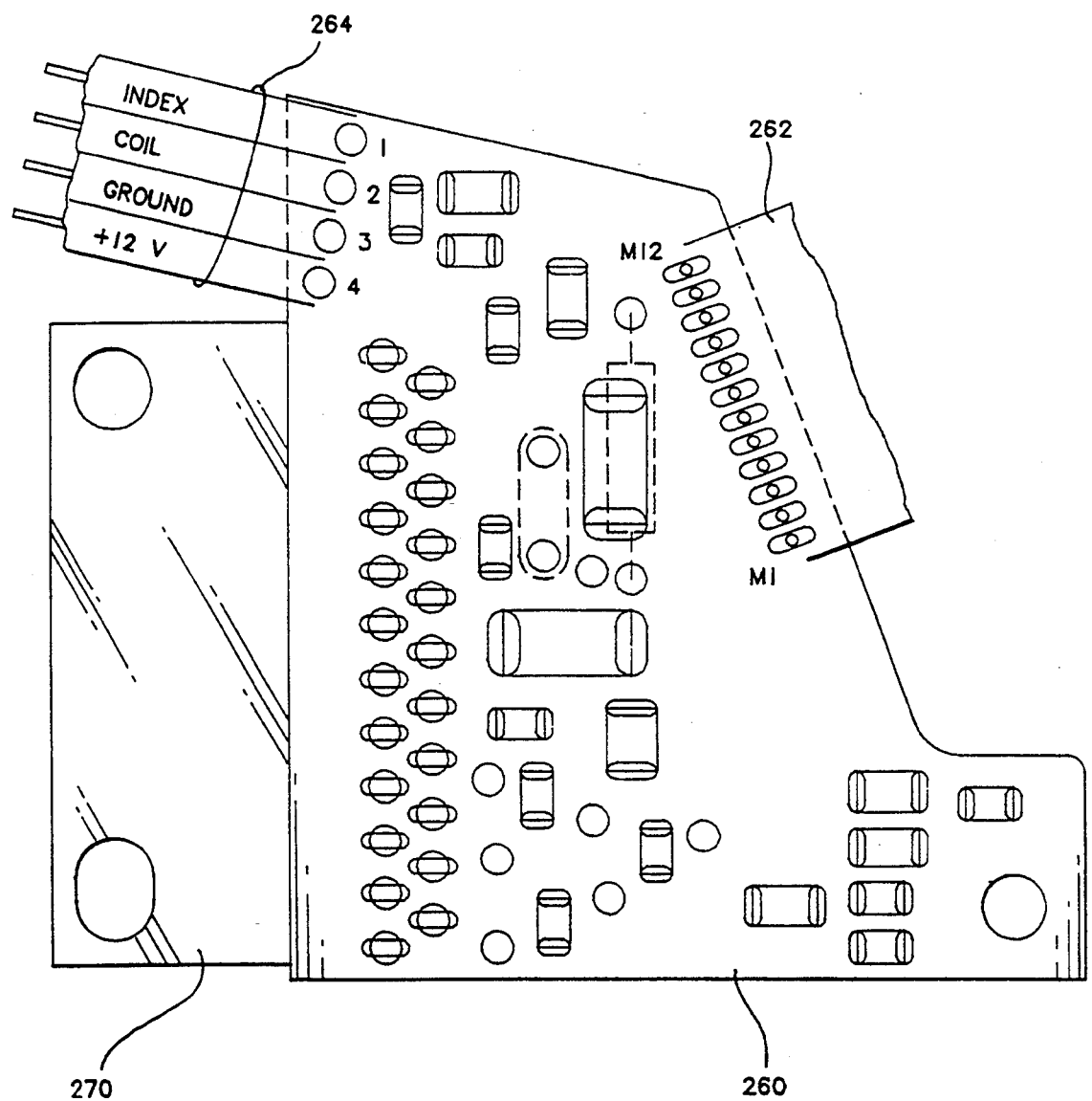

An integrated circuit motor driver 268 such as type HA13426 supplied by HITACHI America, Ltd., Chicago, Ill. 60006 having its pins connected to the circuit board 260 as shown in FIGS. 7 and 8A, includes a flange 270 which is directly mounted to the back of the housing 12 in a well 272 formed in the housing with a sufficient depth from the lower surface profile in order to hold the circuit board 260 and its components (FIG. 8B) most of which are located on the underside of the board 260. Screws 273 secure the heat sink flange 270 of the integrated circuit directly to the housing 12 inside the well 272.

The circuitry for the three phase motor 202 is depicted in FIG. 8A, which indicates that the motor is Y wound and generates three phase commutation signals by three Hall effect generators U, V, W responsive to a small permanent magnet disposed in the rotating permanent magnet in the armature of the motor, as is conventionally known and understood. A fourth Hall effect transducer I generates and puts out a once per revolution index signal which is ultimately supplied to the control electronics external to the head and disk assembly 10.

A bottom or inside plan view of the modular circuit board 260 (FIG. 8B) indicates one acceptable form of layout for the discrete components on the circuit board 260, in which all but two of the discrete components are mounted between the printed circuit board and the facing bottom wall of the housing 12. This arrangement protects these components from physical harm, and it enables ready attachment of test equipment should troubleshooting of the circuit carried on the module 260 ever be required. Also, the cables plug into the circuit module 260, enabling it to be removed and replaced very easily, without disturbing any other circuitry, and without any need to enter the dust-free housing 12.

Rotary Actuator Subassembly 300

The third major subassembly of the head and disk assembly is a very flat and thin rotary actuator subassembly 300, depicted in various levels of detail in FIGS. 3, 5, 6, 7, and 10. As already mentioned, the actuator 300 includes a planar frame 304, preferably formed of cast or stamped aluminum. The frame 304 includes four regions. The region 302 for supporting the scale 112 of the optical encoder 100 has already been discussed.

A second region of the frame 304 is for aligning and supporting a triangular electromagnetic coil 307 of a single winding 308 whose two ends are connectable at connection pins 310. The coil 307 is wound on a bobbin and is then integrally molded to the frame 304 with a suitable molding compound 311. Regions 312 denote holes passing through the frame 304 which are filled with potting material during the molding process, so that the coil 307 may be precisely aligned both radially and in the planar dimension relative to the frame 304.

A third region of the frame 304 provides a support extension 314 for two arms 316, 318 supporting respectively two oppositely facing "flying head" data transducers 320, 322 which are disposed in proximity to the two major, data storage surfaces of the data disk 214, as shown in FIG. 6. During rotation of the disk 214, the transducers 320, 322 ride or "fly" upon an air bearing in very close proximity to the data surface in accordance with what is known as "Winchester" technology.

The fourth region of the frame 304, already mentioned, supports the counterweight 306, whose mass is selected to counterbalance the other regions of the frame 304, and also to cooperate with the aerodynamically released shipping latch 230, also previously explained. The counterweight 306 is attached to the frame 304 by screws 309.

The actuator frame 304 includes a central opening 301 which reduces its mass and inertia, and which provides a convenient location for a single crash stop post 313 which is adapted to engage oppositely facing surfaces 315, 317 formed on the inside walls of the frame 304 which define the opening 301 The post 313 is press fit into a suitable opening 319 in the housing 12. A cylindrical rubber gasket 321 slips over the post 313 and dampens the impact of the frame 304 upon the post 313. The crash stop post 313, in combination with the arc length between the surfaces 315, 317, limits the displacement of the actuator 300 to a predetermined maximum. This limitation of displacement is essential to prevent the transducers from coming off of the data disk 214, and from crashing into the lower flange 212 of the spindle hub 210.

A rotary actuator spindle includes a fixed shaft 324 mounted upwardly from the housing 12. A washer 326, a lower bearing 328, a spacer 330, a wave spring washer 332, an upper bearing 334 and a locking washer 336 and screw 338 all cooperate to provide a freely rotating journal for the actuator frame 304. These elements are mounted and contained in an axial cylindrical opening 340 provided through the frame 304 and enable the frame 304 to move across an arc of approximately thirty degrees and thereby move the transducers radially across the data surfaces of the data disk 214 so that each of the multiplicity of concentric data tracks formed on each data surface of the disk 214 may thereby be accessed by operation of the rotary actuator 300.

Figure 10:
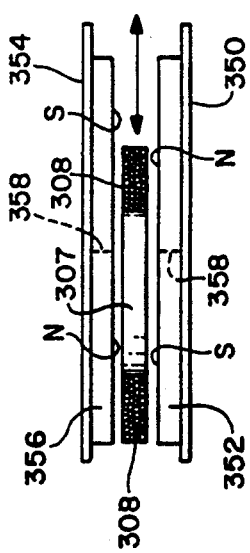
FIG. 10 is a diagrammatic view in side elevation and section of a portion of the rotary actuator motor, taken along the line 10—10 in FIG. 4.
Figure 9:
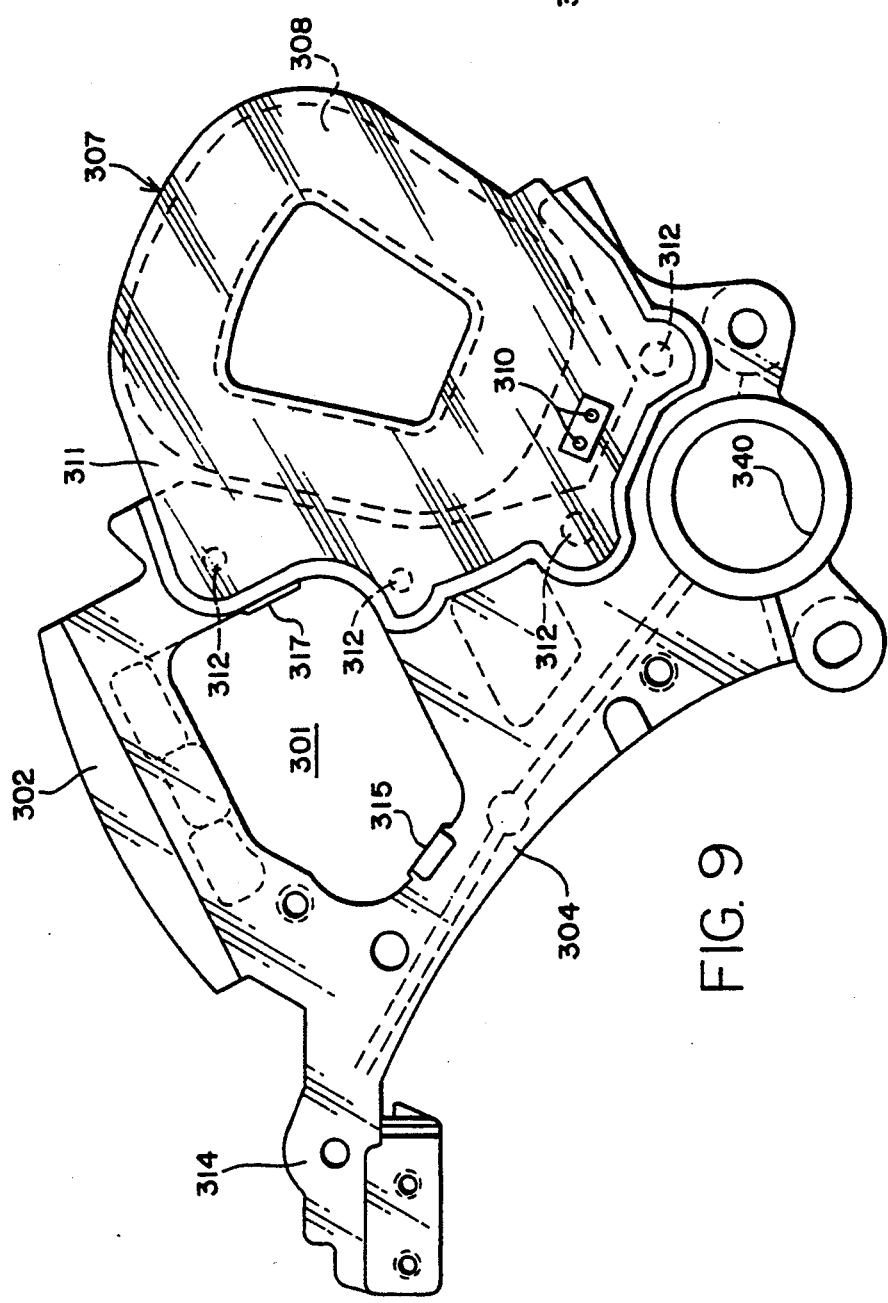
FIG. 9 is an enlarged top plan view of a rotary actuator element of the the head and disk assembly depicted in FIG. 3.

A lower flux-return magnet plate 350 carrying a lower permanent magnet 352 is mounted to the housing 12 by screws 353; and, an upper flux-return magnet plate 354 carrying an upper permanent magnet 356 is mounted to the housing 12 by screws 357. As seen in FIG. 10, the coil 307 is disposed between the two oppositely facing permanent magnets 352 and 356.

Each magnet 352, 354 is magnetized to have two regions of pole reversal. The magnetic poles are at the major surfaces of the magnets 352, 354, and are complementary with each other so that a very strong flux region exists in the between the two opposed faces of the two magnets 352 and 356 (FIG. 10). A polar reversal region 358 generally bisects each magnet 352, 354. This is so that the effect of the flux on e.g. the left side (FIG. 10) on the coil 307 with current passing through it adds to the effect of the flux on e.g. the right side, since current will be passing through the single winding 308 in one direction only.

Head Select and Amplifier Circuitry

A thin, highly flexible mylar circuit connection film 360 is provided for direct connection to the data transducers 320, 322. This elongated, highly flexible and durable connector film 360 extends from a larger flexible mylar printed circuit 362 which is preferably mounted on the upper flux return plate 354 and which carries some of the read and write drive circuitry and head select circuitry required for operating the transducers 320, 322. A plan view of the circuit 36 is depicted as FIG. 13C. A connection extension 364 for the mylar circuit 362 extends outwardly from the drive between the gasket 16 and the upper face of the peripheral wall 11 along the same lineal edge thereof as passes the connection portion 150 for the optical encoder subassembly 100. The electrical circuit diagram of circuit elements and connections for the circuit carried by the film is depicted FIG. 13A. Therein, a monolithic integrated circuit 366 provides a six channel (six head transducer) head select and amplification function (FIG. 13B). This circuit 366, is preferably a type SSI 117, made by Silicon Systems Incorporated, or equivalent.

Circuit Card 6

Four flexible circuit substrates extend from the head and disk assembly 10. These substrates may be conductive traces formed upon thin, flexible mylar film, or they may be thin and flat wire cables. In any event, one leads to a jack 349 for connecting internal head read/write electronics with an external read/write channel, another leads to the jack 152 for connecting the optical encoder subassembly 100 with an external analog/digital servo element, another leads to a jack 353 for connecting the spindle motor control module 260 with the circuit board 6 circuitry, and a final one 355 leads from the coil 307 of the rotary head positioning actuator 300 within the head and disk assembly 10 to external drive electronics, being part of the analog/digital servo element.

The small double sided printed circuit card 6 carries all of the electronics required for the control system of the present invention (except for the circuits within the head and disk assembly which have already been mentioned).

The circuit card 6 includes a conventional edge connector region 365 having properly aligned connection traces 367 for engaging corresponding contact pins of an accessory or peripheral circuit card connector of the system board or mother board of the personal computer (host system) in which the storage subsystem 5 is installed and connected solely via the traces 367 on the edge connector region 365.

Four plugs 369, 371, 373 and 375 are provided on the circuit card for receiving respectively the jacks 349, 152, 353 and 355, previously described. These plugs enable the circuitry inside the head and disk assembly 10 to extend to and be connected to the circuitry carried on the circuit card 6 and to be supplied with power from the host system via the edge connector 365.

Electronics Overview

The following major circuit elements are contained on the printed circuit card 6 generally in the positions indicated in FIGS. 1 and 2. (These circuit elements are interconnected in accordance with the architectural overview of FIG. 11 and in accordance with the detailed connection diagram made up of FIGS. 12a through 12i, as arranged and read together in accordance with the FIG. 12 layout plan.

Microcomputer 381 and Program Memory 383

A single programmed, sequential state monolithic microcomputer 381, sometimes referred to as a "microprocessor", provides overall control of the subsystem 5. The microcomputer 381 is preferably a type 7810, manufactured by NEC Corporation, of Japan, or equivalent. The microcomputer 381 includes a single central processing unit (CPU) and a single arithmetic logic unit (ALU), as well as other internal supporting architecture. It executes only one instruction at a time.

The type 7810 is a single chip, five volt, eight bit microcomputer including an internal analog to digital converter having eight multiplex-selectable analog inputs. The analog to digital converter operates continuously by converting whatever voltage appears at a selected input into a digital value which may be read at any time by the microcomputer 381 under program control.

The microcomputer 381 also includes a 256 by eight bit RAM, multifunctional timer/event counters, general purpose serial and parallel interfaces and input/output ports, and maskable and non-maskable interrupt capability. The microcomputer 381 may also control external memory directly, and requires an external program memory for containing the instructions which it is to execute in carrying out the supervisory functions of the control system of the present invention. Each instruction cycle requires one microsecond, and the basic clocking frequency for the microcomputer 381 is 12 MHz. The software controlled functions of the microcomputer 381 are discussed in greater detail subsequently herein.

The microcomputer 381 utilizes a multiplexed bus structure, so that the same electrical lines may carry both address information and data information, at different times. These times alternate, so that in one machine cycle, a bus may be carrying addressing information, and at the next cycle, the same bus may be carrying data information, and so forth.

The 256 byte random access memory within the microcomputer 381 is used as a stack and provides all of the general purpose registers required for operations of the microcomputer.

An eight kilobyte external read only program memory 383 is connected to the microcomputer 381, and it contains the instructions which the microcomputer 381 will execute during operations of the disk file subsystem 331. These instructions are presented as a listing at the end of this specification.

The microcomputer 381 is the heart of the control system and has two overall tasks: it supervises and controls radial head position via an electromagnetic voice coil actuator 300 of the head and disk assembly 10 via servo control loops, and it responds to commands from the host computer system by initiating and monitoring transfers of blocks of data to and from the host and the disk data storage surfaces via the controller/interface.

It is important to remember that throughout the data read/write operations and data transfer operations the microcomputer 381 is monitoring the progress of such operations and it is simultaneously controlling the track following head position servo loop so that it is tightly servoing the heads 320, 322 at the centerline of the track at which data is being read or being written.

Track Positioning and Following Servos

The subsystem servo performs two functions: First, it must hold read/write data transducer heads in alignment with the centerline of each data track during track following operations. Second, it must be able to perform track seeking operations which cause the heads 320, 322 to be moved rapidly and accurately from a known departure track location to a desired destination track location. All servo operations are controlled and supervised by the microcomputer 381 which controls the current which passes through the coil 308 of the voice coil actuator 300.

An analog/digital servo circuit 385 is connected to the microcomputer 381, and the circuit 385 provides circuit elements which are required to carry out servo control loop functions in data track seeking and track following operations of the head and disk assembly. This monolithic circuit 385 is explained in greater detail in conjunction with FIG. 18 hereinafter.

The optical encoder assembly 100, previously described, responds to relative light levels indicative of position of the scale and converts the light levels into two phase signals P1 and P2 which are in phase quadrature. These phase signals are converted to voltages by the current to voltage converters U1A and U1B of the assembly 142 and are then supplied to the analog to digital converter within the microcomputer 381, via the analog/digital servo chip 385. The circuitry of the encoder is set forth and discussed herein in greater detail in conjunction with FIG. 18.

Figure 11:
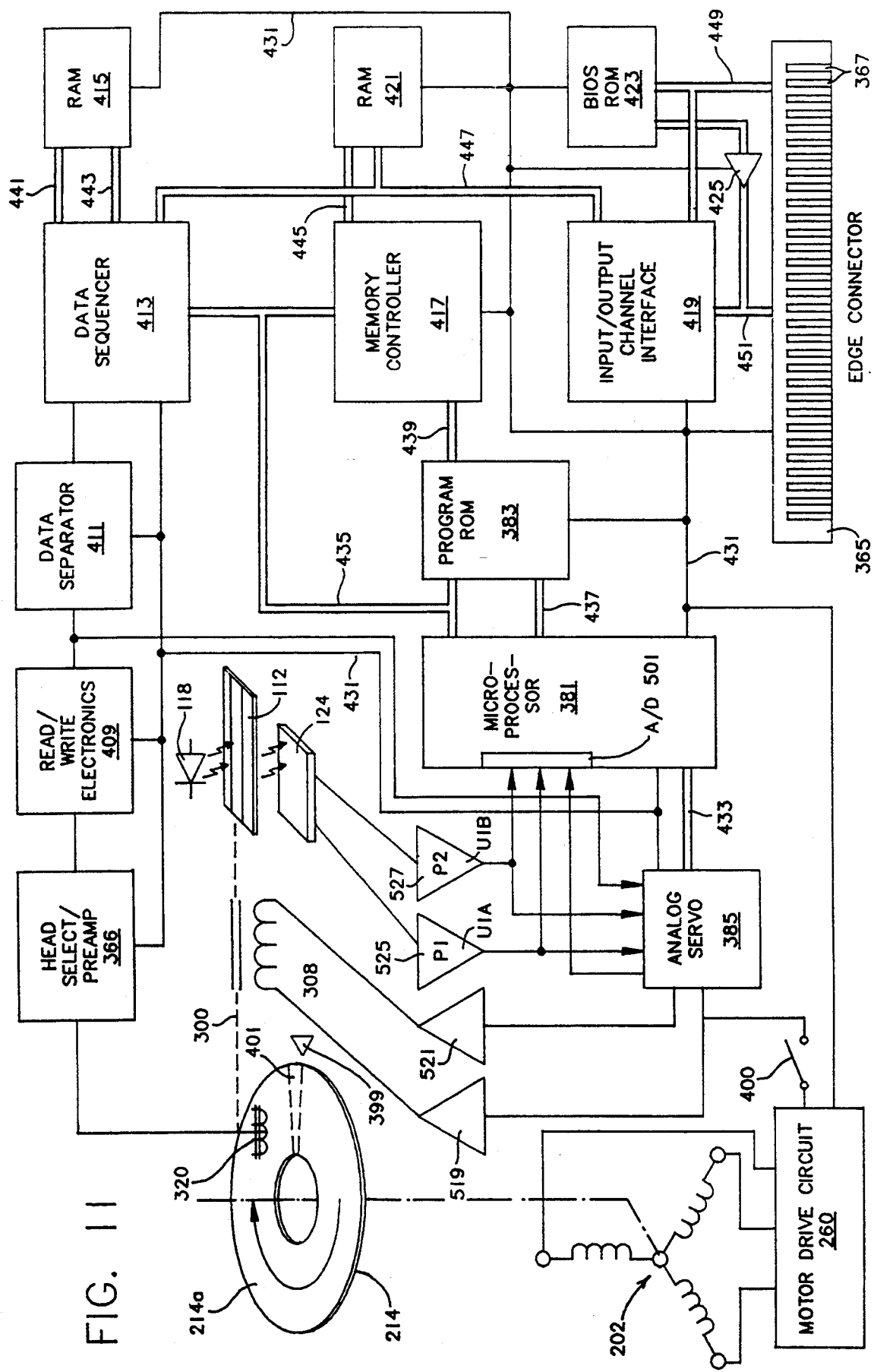
FIG. 11 is an electrical block diagram of the control electronics for the disk file subsystem depicted in FIG. 1.
Figure 12:
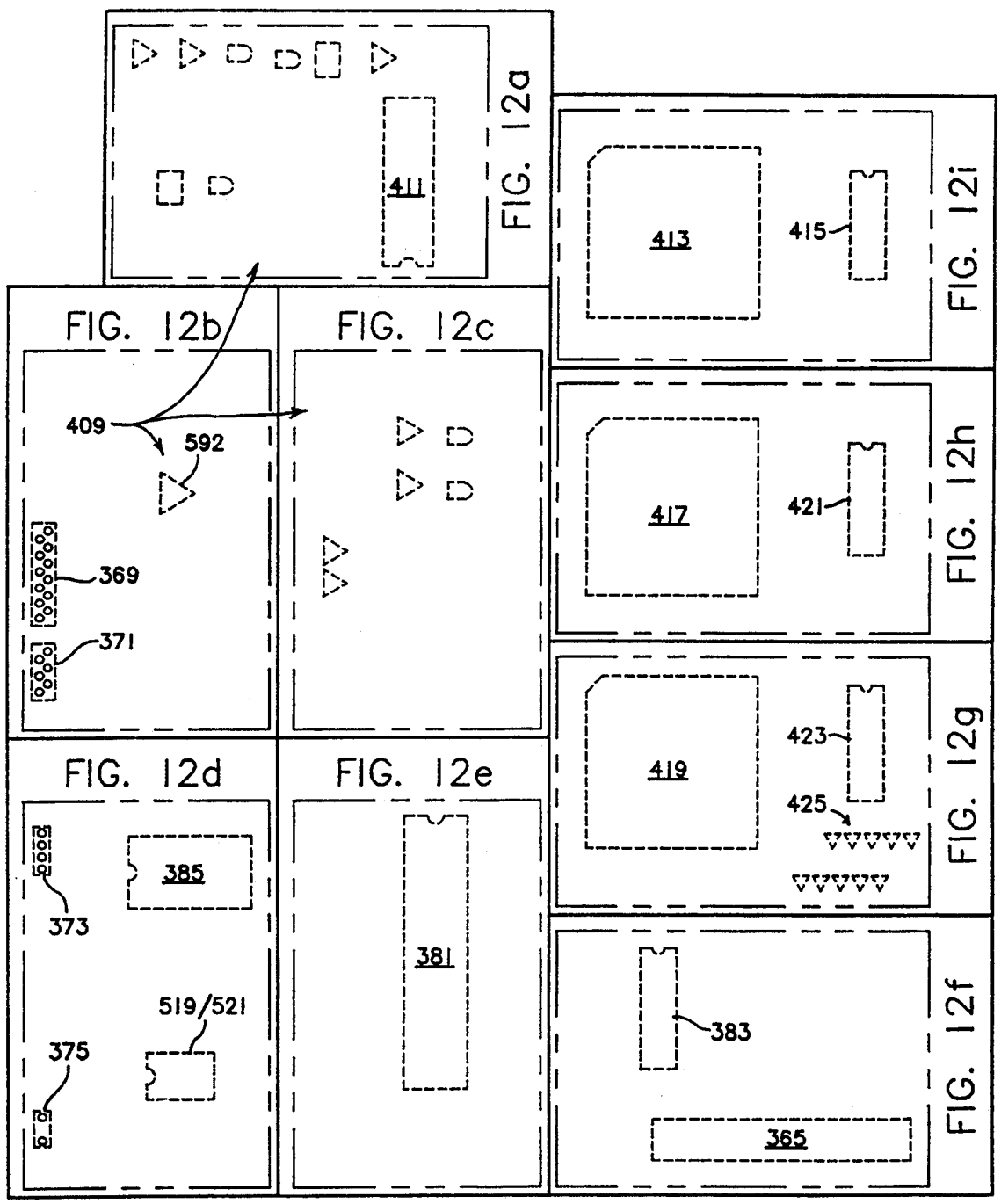
FIG. 12 is a layout plan for the nine sheets of FIGS. 12a through 12i, and explains graphically how these nine sheets should be arranged together in order to provide the overall single electrical circuit schematic diagram.
Figure 12A:
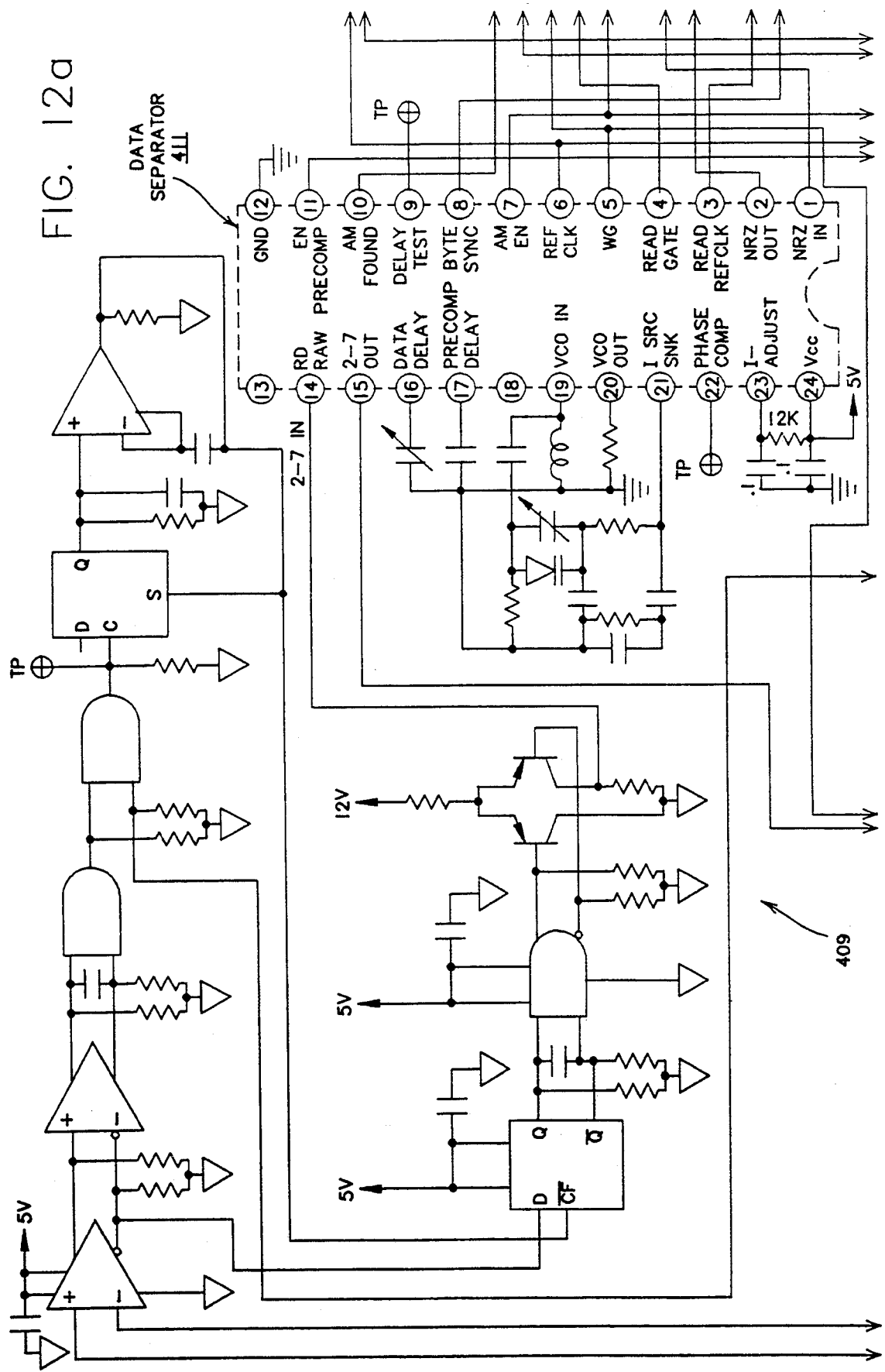
FIGS. 12a, 12b, 12c, 12d, 12e, 12f, 12g, 12h 12i comprise nine sheets of drawings which together set forth a single electrical circuit schematic diagram of the electronics for the disk file subsystem depicted in FIG. 2.
Figure 12B:
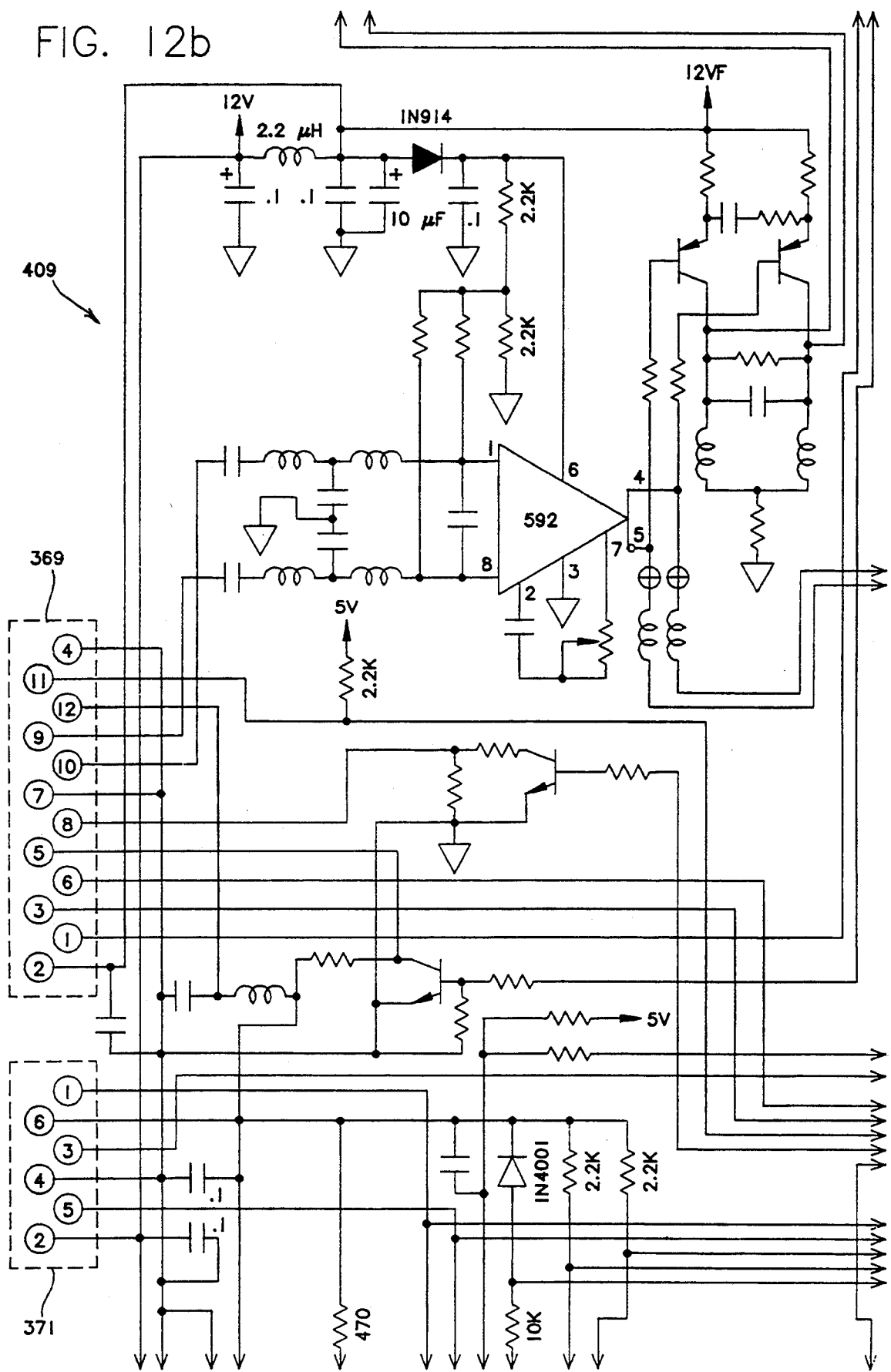
Figure 12C:
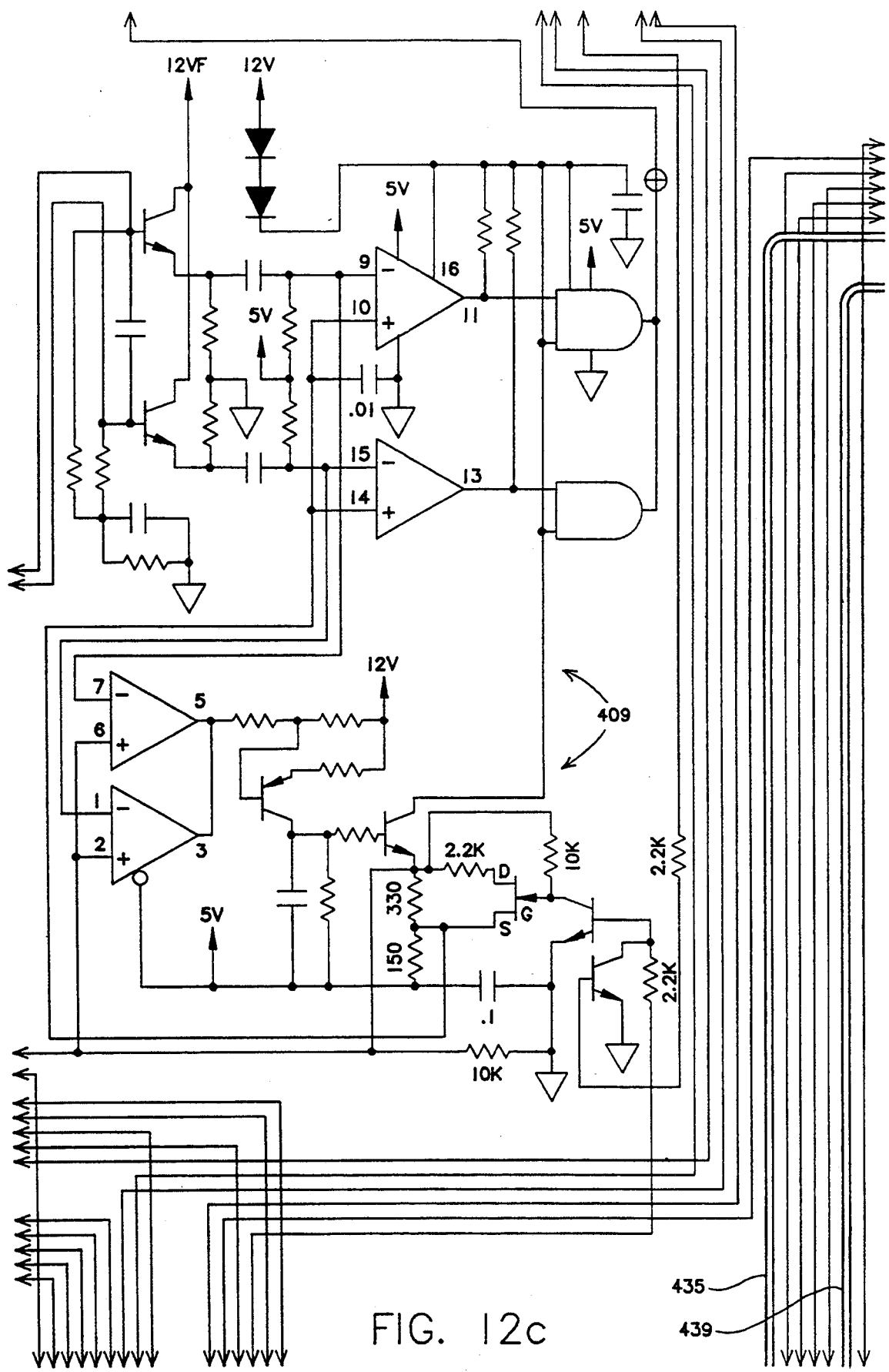
Figure 12D:
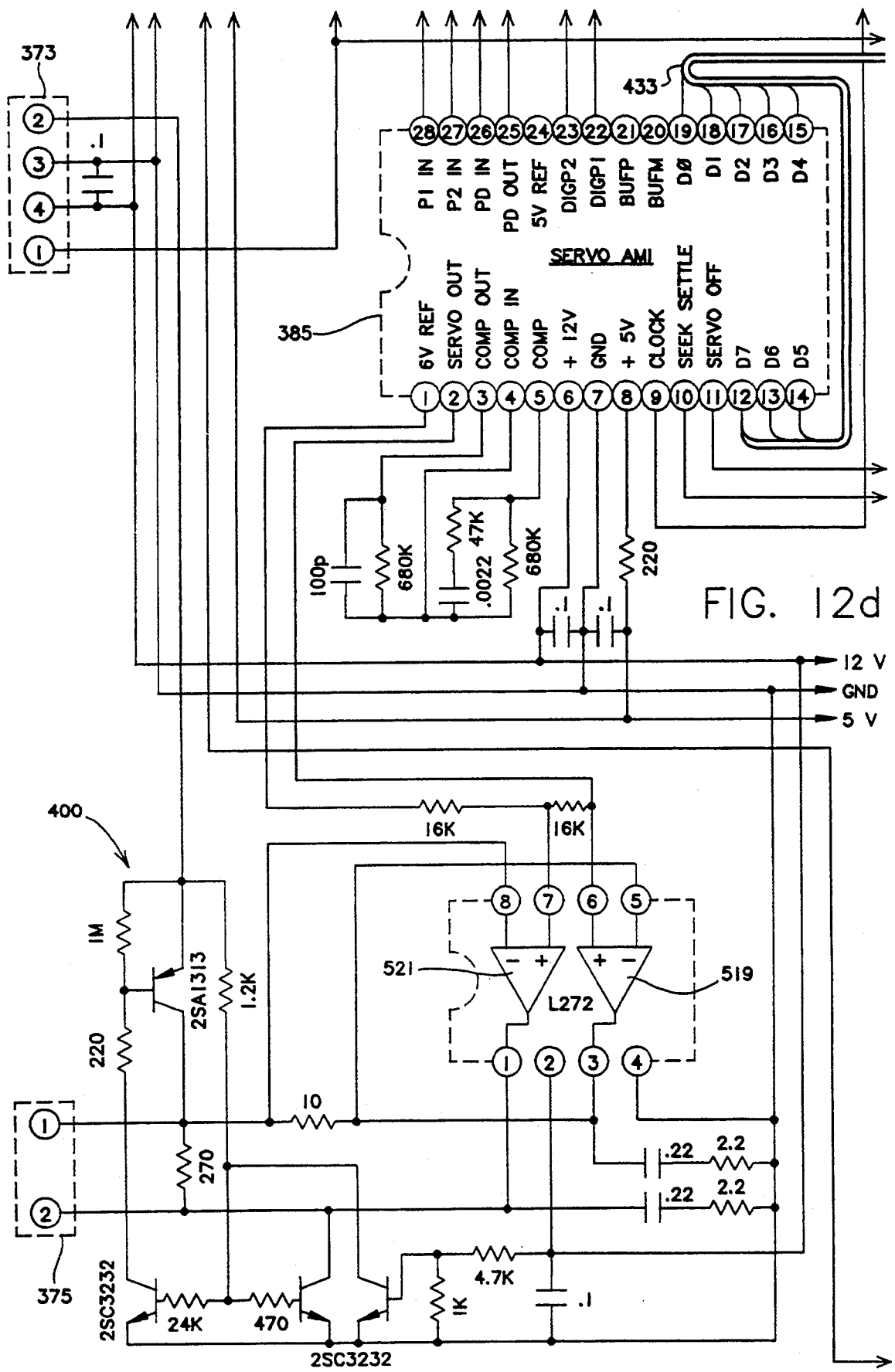
Figure 12E:
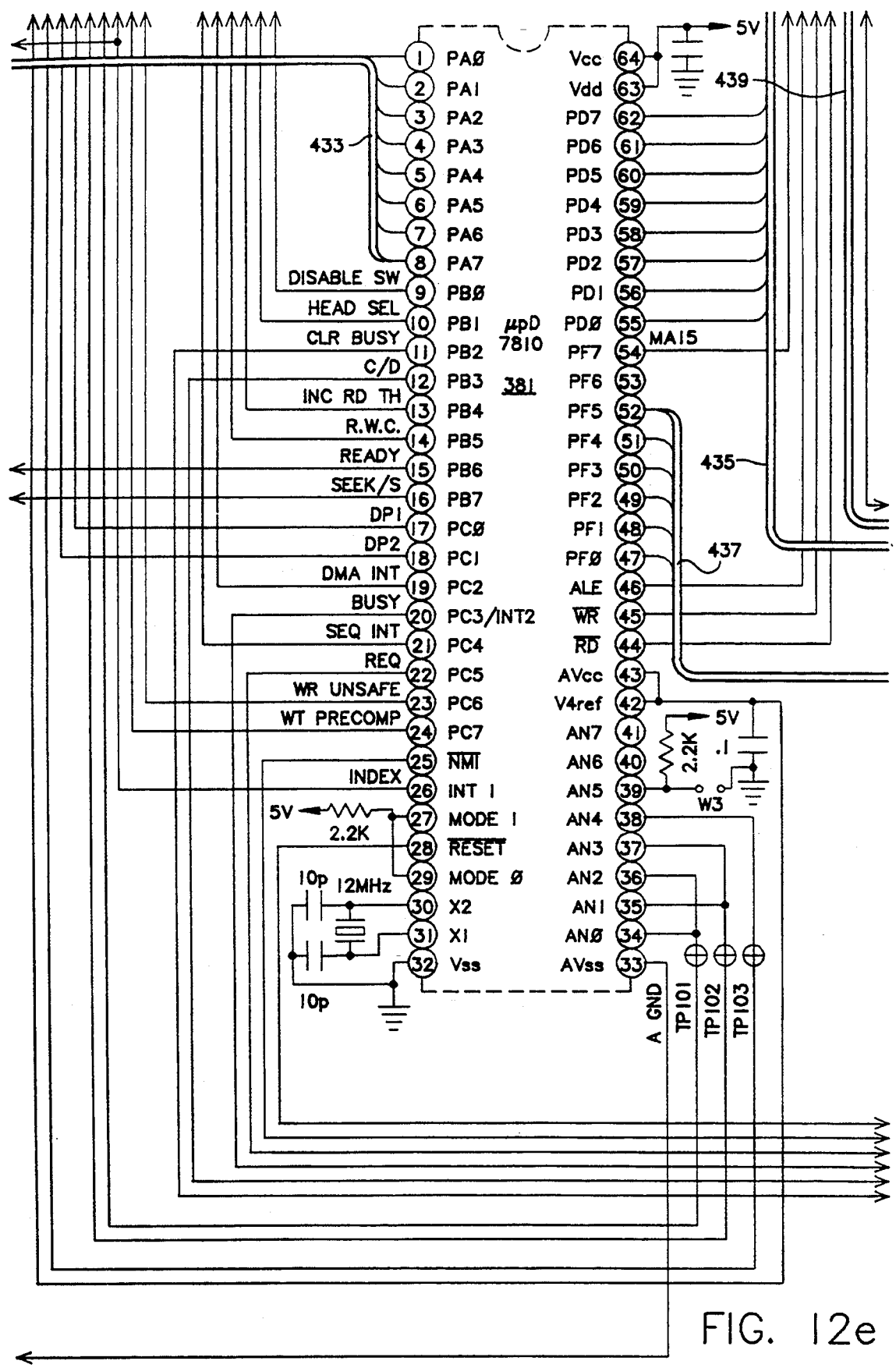
Figure 12F:
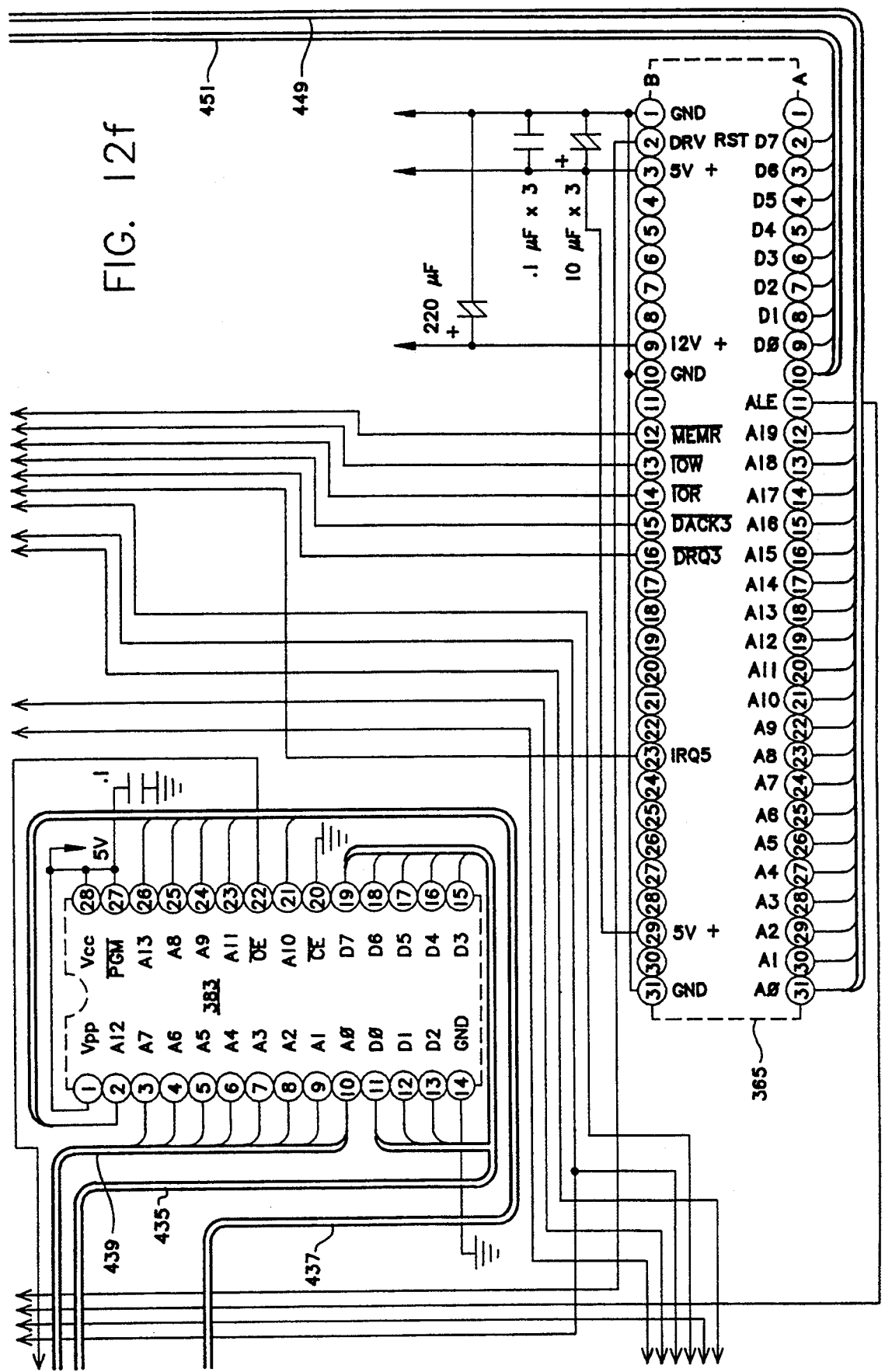
Figure 12G:
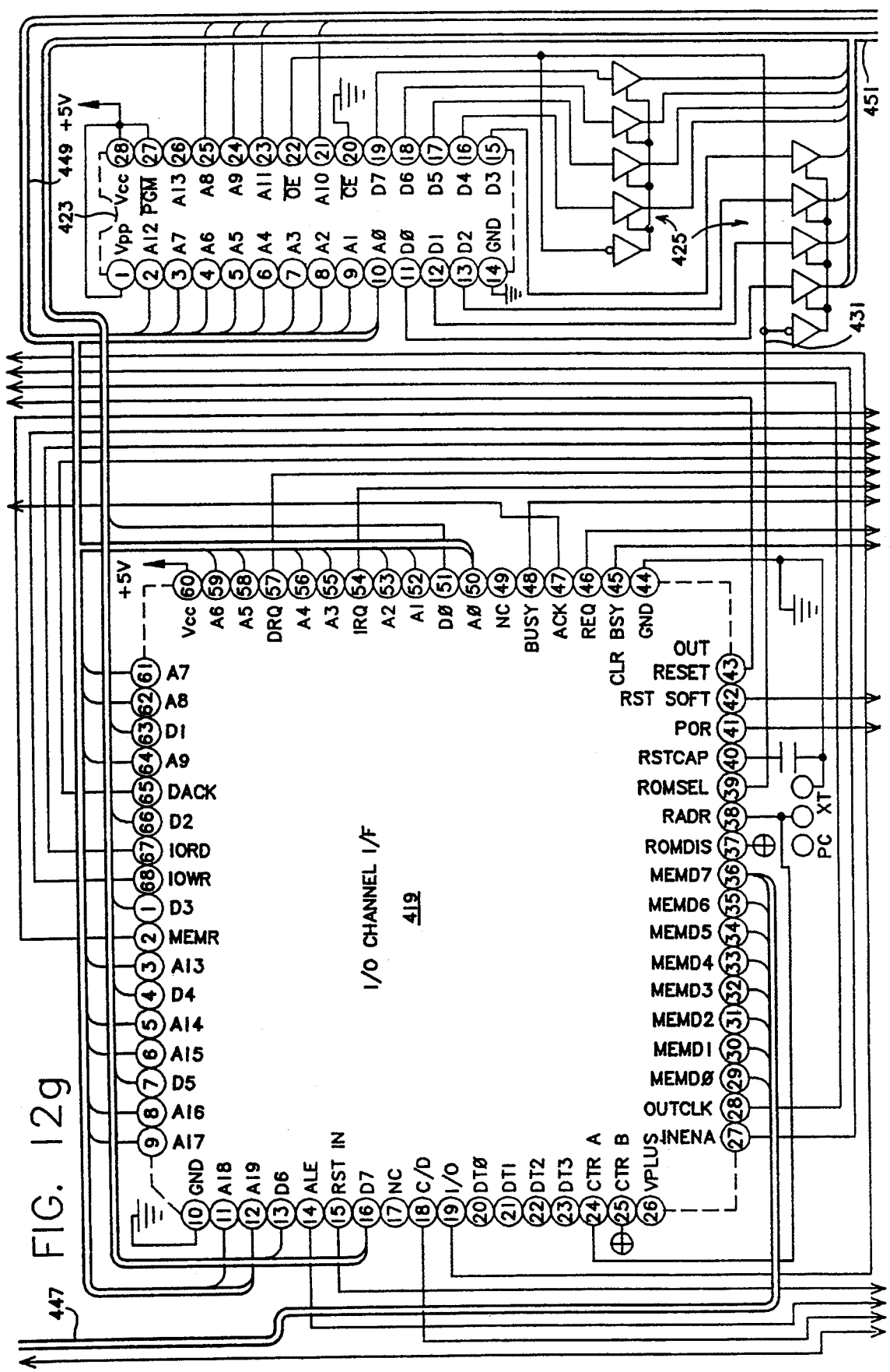
Figure 12H:
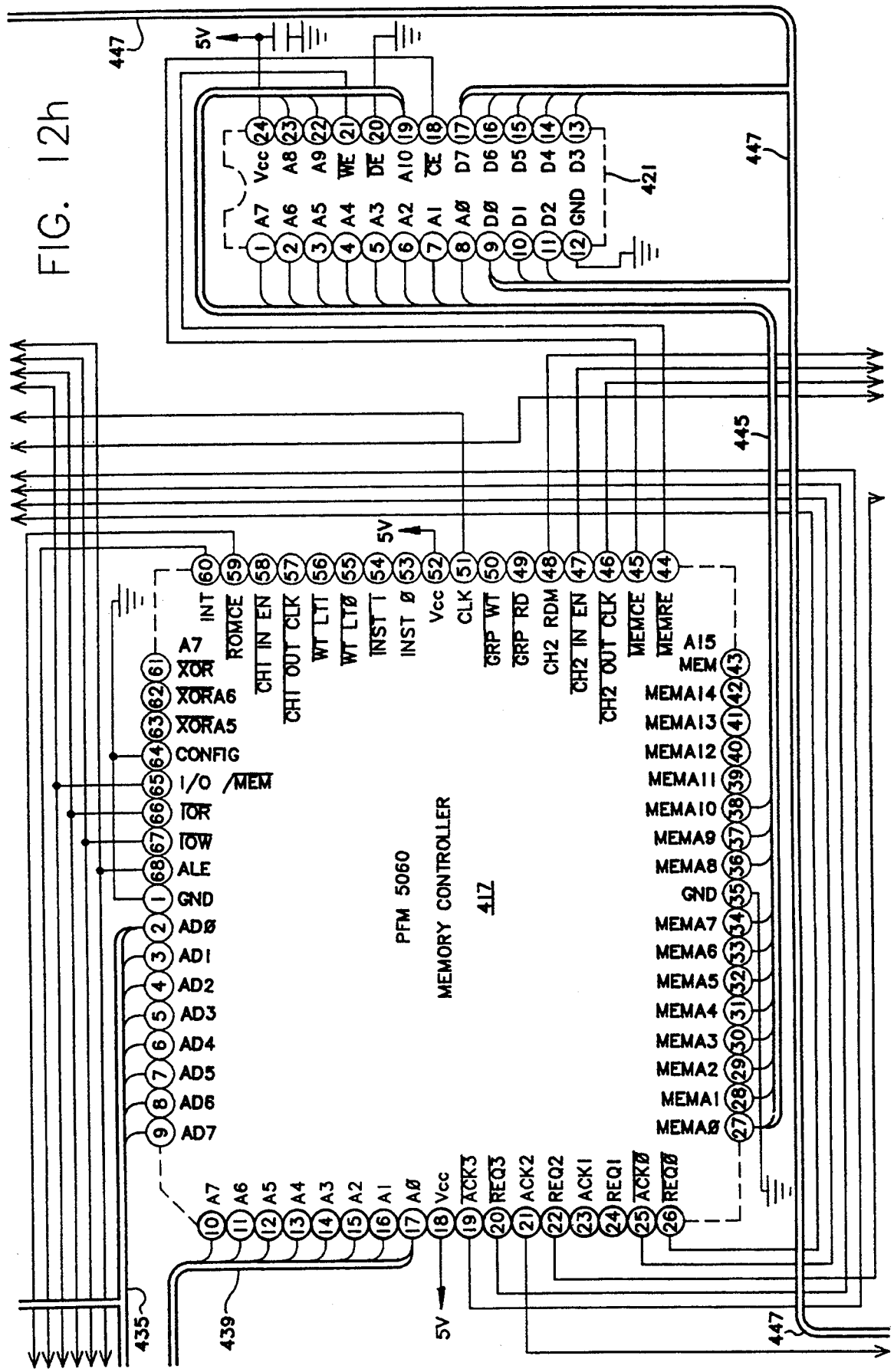
Figure 12I:
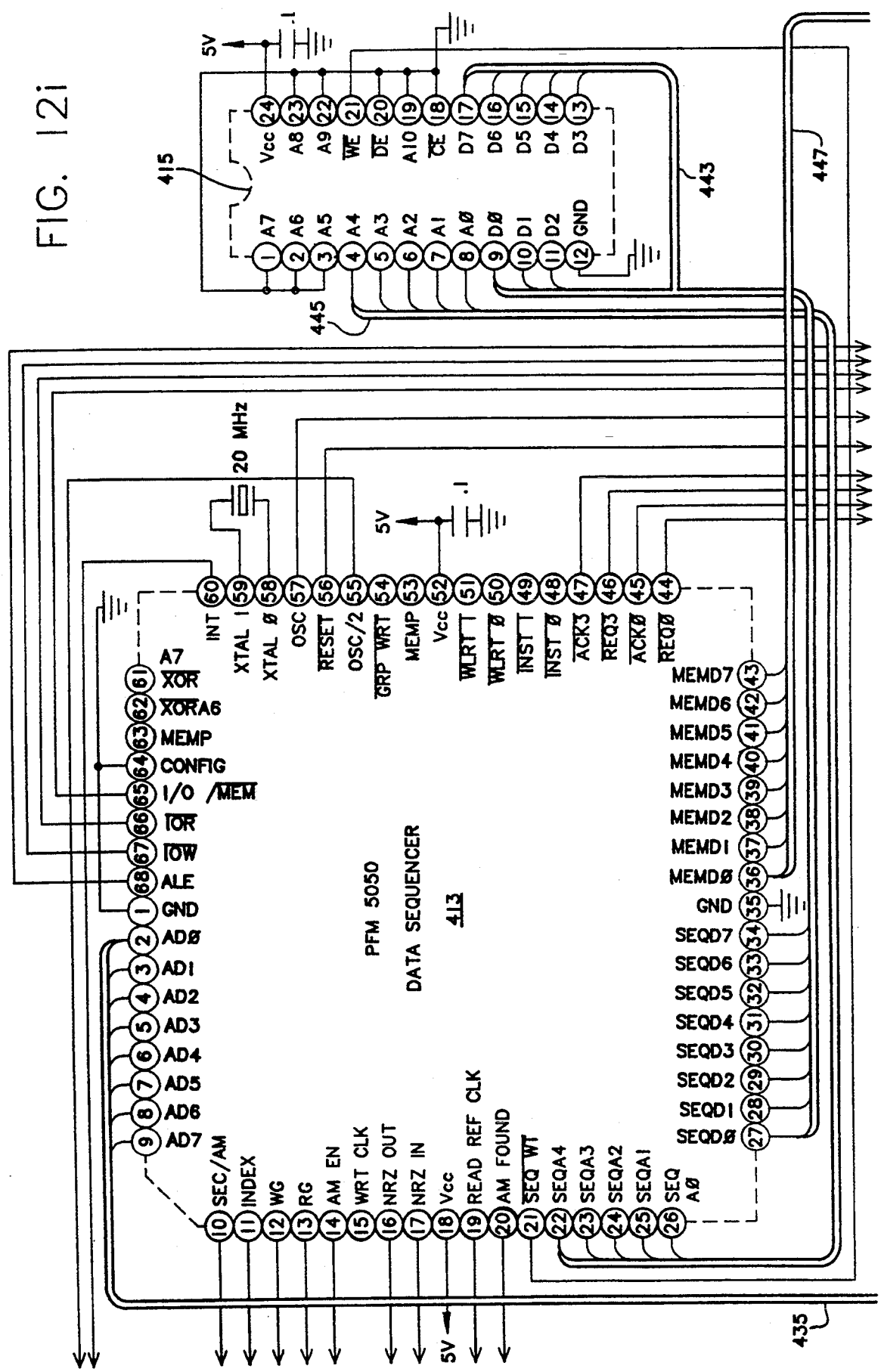

The analog/servo chip 385 and related circuitry converts digital position values to driving currents and applies these currents through driving circuitry 390 to a winding 308 of the rotary actuator 300, symbolized in FIG. 11 by the broken line carrying reference numeral 300 and interconnecting a symbolic data transducer head 320, and the moving scale 112. The direction and magnitude of current passing through the coil 308 determines the direction and velocity of the head 320 in moving among concentric data tracks formed on the data storage major surface of the data storage disk 214. The servo circuit 385 is described hereinafter in greater detail in connection with FIG. 17.

Storage Disk 214

The disk 214 includes two major data storage surfaces 214a and 214b coated with a suitable magnetic data storage material. Each data storage surface provides storage room for a multiplicity of concentric data storage tracks, there being some 612 logical tracks available per data surface. Some 24 additional spare tracks are provided at the outer periphery of the disk surface 214a, 214b to be used in place of tracks having media defects so that the first tracks required by the host's operating system for directory purposes will be free of defects, and thereby be reliable in all cases.

An inner landing zone region LZ is provided so that the ferrite slider head 320, 322 comes into actual contact with its underlying data surface 214a, 214b, and subjects it to possible abrasion only in the landing zone region LZ. Each concentric data track nominally holds approximately 10,416 bytes, and is divided into eighteen data sectors, seventeen of them being for storage of useful data and one of them being held in reserve in the event that a media defect renders any one of the other seventeen unusable. Each data sector contains approximately 568 bytes, including 512 bytes of useful data and the remainder being sector address headers, error correction, speed tolerance gap fillers, etc.

An index marker 399, generated by motor driver circuitry 260 controlling the spindle motor 202, marks the location in time for a narrow, approximately 200 microsecond, 130 byte wide, single servo sector 401 prerecorded with track centerline information for each data track upon one or more data storage surfaces 214a, 214b of the disk 214.

The disk 214 rotates at a substantially constant angular velocity, and the time period for each revolution is nominally 16.67 milliseconds. The motor driver circuitry is illustrated in FIG. 8A and includes an integrated circuit motor driver, such as type HA 13426, provided by Hitachi America, Ltd., 707 W. Algonguin Road, Arlington Heights, Ill. 60006, or equivalent. This integrated circuit includes a flange which is directly mounted to the base casting 12 for the head and disk assembly 10. The spindle motor 202 is Y wound and it generates three phase commutation signals by Hall effect transducers U, V and W responsive to a small permanent magnet in the armature of the motor 202, which are used by the integrated circuit to generate the necessary phases to drive the motor 103, as is conventionally known and understood.

A fourth Hall effect transducer I generates and puts out a once per revolution index signal on an index line. The microcomputer 381 monitors the index line from the motor control 105 and times the interval between each index marker 99 to be sure that the disk 96 is rotating at proper angular velocity, and it takes the subsystem 31 out of service in the event that disk rotation is determined to be improper.

Two radially offset, time staggered bursts are provided for each concentric data track within the servo sector 401. The transducer 320 reads the first burst and its amplitude value is sampled and sent to and digitized by the microcomputer 381. The transducer 320 then reads the second burst and its amplitude value is sampled and sent to and digitized by the microcomputer 381. Differences in the digitized amplitude values are used by the microcomputer 381 to calculate centerline offset correction values which are stored and combined with a digitized phase value and sent to the coil 308 in order to maintain the head 320 in centerline alignment with each track during track following operations.

The 612 tracks are divided into five contiguous zones, there being four zones of 128 tracks each and one zone of 100 tracks each. Track centerline data is acquired and stored for the tracks of each zone, and this data is used for initial correction whenever the actuator has placed the head 320, 322 at a track within the zone. A zone timer is set for each zone, and times out after a predetermined interval, requiring that new centerline information for the zone be obtained before read/write operations will be permitted. These architectural features and operations of the fine servo loop and track zones are explained in further detail in the referenced U.S. Pat. Nos. 4,396,959, 4,419,701 and 4,516,177, the disclosures of which are hereby incorporated by reference into the specification at this location.

Electronic Return Spring 400

The aerodynamically released spring biased shipping latch 230, already described structurally above, is deflected by airflow generated by rotation of the disk 214. This latch 230 includes a member which engages the rotary actuator 300, thereby locking the heads 320, 322 at landing zone positions over the landing zone LZ whenever disk rotation is insufficient to generate an air bearing effect upon which the heads "fly" (in accordance with well-known Winchester technology).

In order to be sure that the actuator 300 returns the heads 320, 322 to the landing zone LZ, an electronic return spring, symbolized by the switch 400 in FIG. 11 is provided in the subsystem 5. When power is lost or intentionally removed from the subsystem 5, this fact is sensed, and the operation of the spindle motor 202 is reversed: i.e. it becomes a generator, and the electrical energy it generates, due to the kinetic energy stored in the rotating disk 214, is switched to the coil 308 of the rotary actuator 300. So long as there is disk rotation, the electrical energy generated thereby is sufficient to return the head to the inner landing zone LZ of the disk 214 and keep it there so that the spring-biased latch 230 reengages the actuator 300 and thereby retains the heads 320, 322 at their inner landing zones LZ. The dynamics of the latch 230 and the electronic spring return 400 are designed so that the heads 320, 322 are returned to the landing zones LZ in good time before the latch 230 reengages.

Further details of the aerodynamic shipping latch 98 are set forth in the referenced co-pending U.S. patent application Ser. No. 06/728,674, filed on Apr. 29, 1985, for Aerodynamic Latch for Disk File Actuator.

A significant feature provided by the combination of the aerodynamic latch 230 and the electronic return spring 400 is that the bias force applied to the actuator by a conventional mechanical return spring (and which must be continuously overcome during disk file operation) is eliminated completely. This means that the actuator 300 operates with significantly less power consumption, a consideration to be made when drawing all of the power for the subsystem 5 from the accessory socket of the personal computer host system.

Read/Write Channel

Figure 13A:
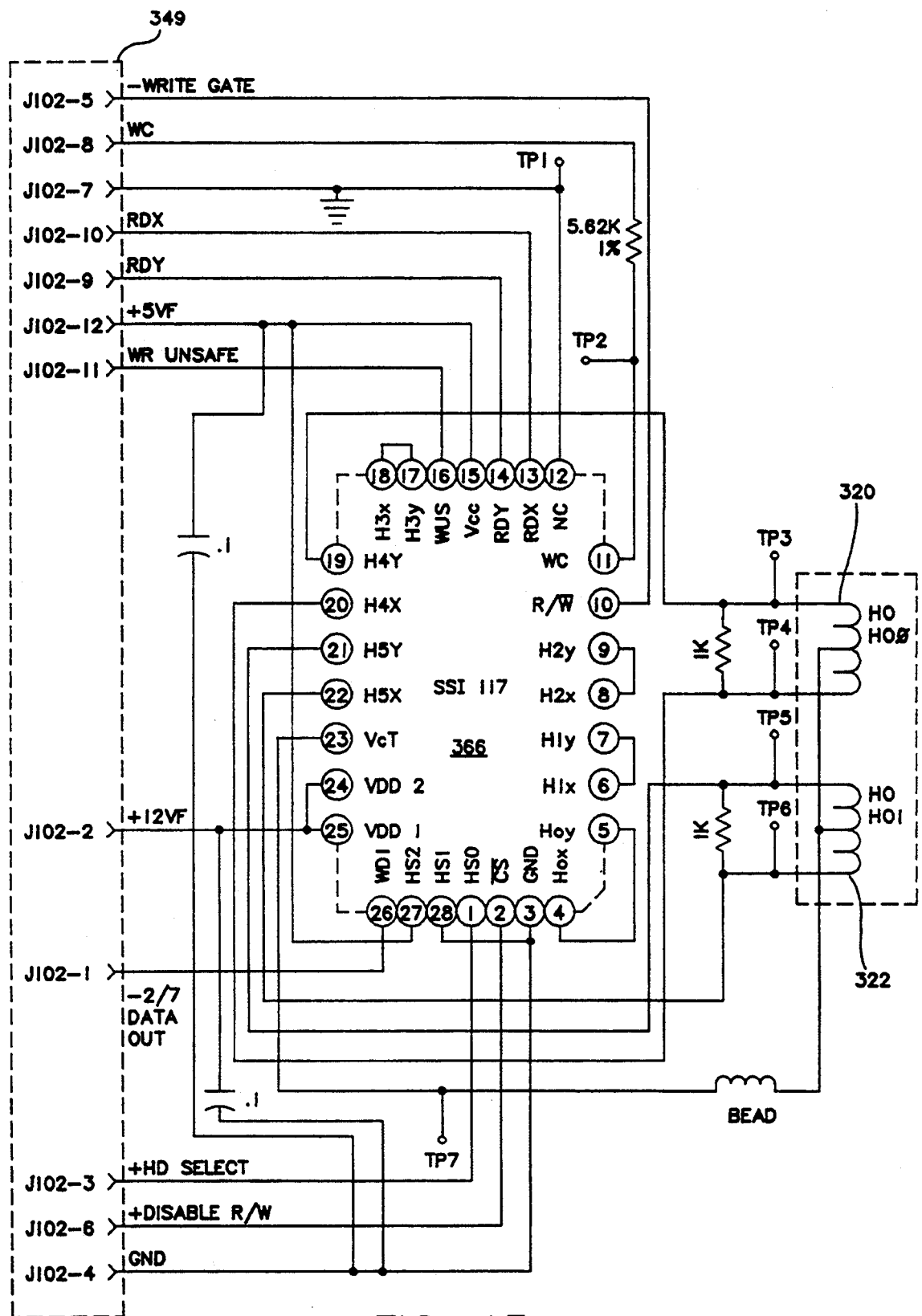
FIGS. 13A, 13B and 13C are respectively an electrical circuit schematic, a block diagram of a two channel monolithic read/write and head select circuit and a thin film flexible circuit substrate mounted within the head and disk assembly shown in FIG. 3, and which plugs into the read and write circuitry depicted in FIG. 12A.
Figure 13B:
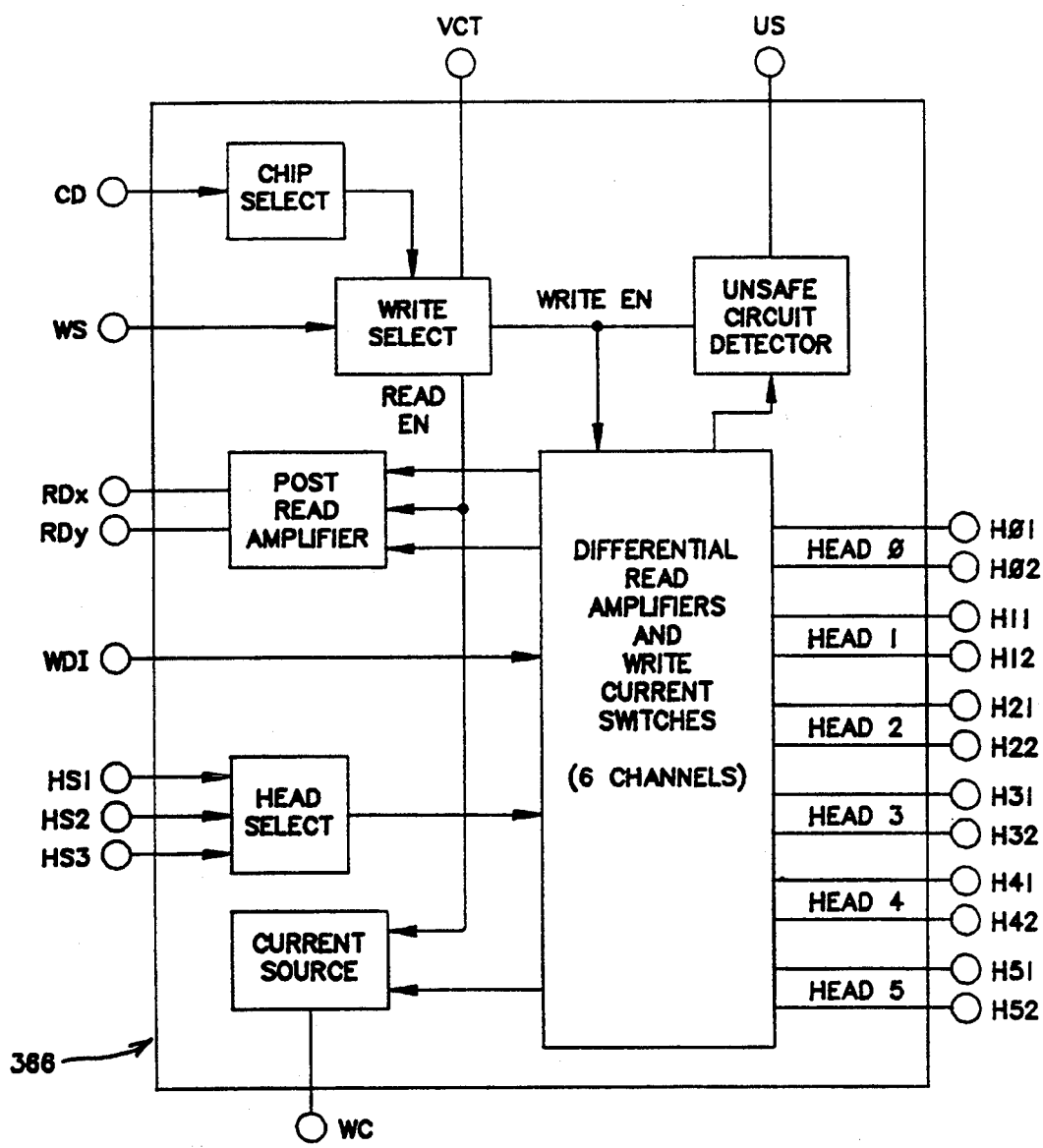
Figure 13C:
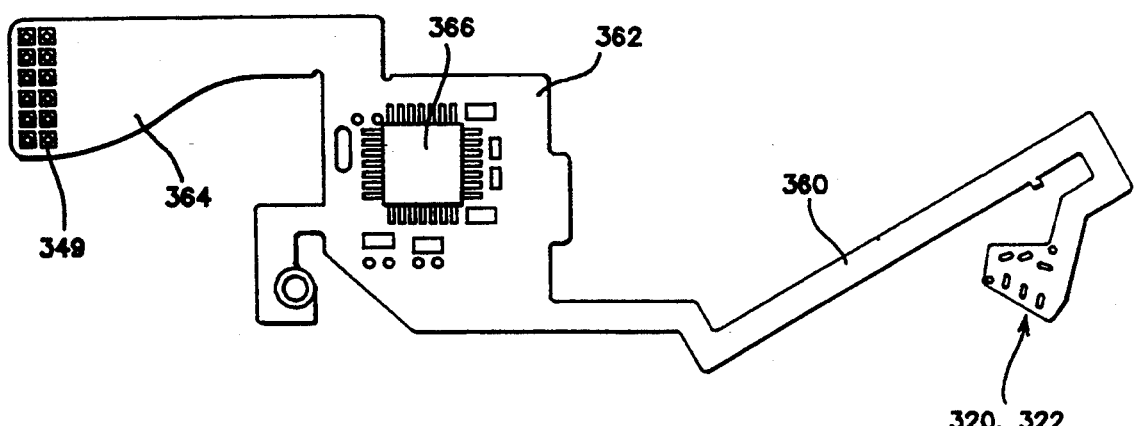

The overall read/write channel includes a head select and preamp circuit 366 which is carried on the flexible circuit substrate 361 within the head and disk assembly 10 and which is described herein in connection with FIGS. 13A, 13B, and 13C. The channel also includes read/write electronics 409 schematically illustrated in FIG. 1A, and a data separator 411. The data separator 411 encodes and decodes the data bits to and from an encoding format, such as 2,7 code, which is used in the actual record and playback process on the disk 214. The data separator 411 is described further in connection with FIG. 19.

Controller/Interface

The controller/interface of the control electronics for the disk file subsystem 5 includes a programmable data sequencer 413 having its own data sequencer random access memory 415, a memory controller 417, an input/output data random access memory 421 addressed by the memory controller 417 and temporarily storing data from the data sequencer 413 from an input/output channel interface 419.

A BIOS (basic input/output system) read only memory 423 is associated with the input/output channel interface 419, and it contains basic input output program routines which are accessed and executed directly by the host CPU whenever its operating system wishes to make use of the subsystem 5. Actually, the BIOS memory 423 is not required for operation of the subsystem 5, and its inclusion is a matter of convenience for the user, thereby enabling the subsystem 5 to be plugged directly into a personal computer host system without requiring the user to add any software driver routines to the operating system which are needed in order to use the subsystem 5.

The BIOS memory 423 may also include a collection of error and status condition routines which are used by the operating system of the host system to determine and indicate to the user the status and/or error condition of the disk file subsystem 5 from time to time. An eight bit tri-state bus driver 425 is interposed in a data bus between the BIOS ROM 423 and the input/output channel interface 419 and edge connector 365 so that the BIOS program routines from the ROM 423 may be transferred via the host bus to the host CPU and executed whenever the operating system addresses the BIOS memory 423.

System Buses

A control bus 431 extends throughout the printed circuit card 6. This bus, shown symbolically in FIG. 11 as a single line, is actually many different lines. Not all lines extend to all elements. For purposes of convention, unless a bus line is a data bus or an address bus, it is considered to be a control bus line. Thus, the data and address buses shown symbolically in FIG. 11 for ease of understanding and in more detail in FIGS. 12A, 12B, 12C, and 12D, define by omission each of the lines making up the overall control bus.

An eight bit undirected data bus 433 enables the microcomputer 381 to send digital actuator control values to the analog servo chip 385. Digital data passes over the bus 433 from the microcomputer 381 to the analog servo 385 wherein it is converted to analog values and sent to control the position of the rotary actuator 300 during track seeking and following operations.

An eight bit time multiplexed data and address bus 435 interconnects the microcomputer 381, the program memory 383, the data sequencer 413 and the memory controller 417.

A six high order bit (A8-A13) address bus 437 interconnects the microcomputer 381 and the program memory 383. The low order eight address bits (A0-A7) for the program memory 383 are sent by the microcomputer 81 over the data/address bus 435 during address time to the memory controller 417 where they are latched and held in order to be sent over an address bus 439 to address the program memory 385.

A five bit address bus 441 and an eight bit data bus 443 interconnect the data sequencer 413 and its dedicated small random access memory 415, which stores at most only 32 bytes.

The input/output random access memory 421 is addressed via an eleven bit address bus 445 from the memory controller 417, while an eight bit data bus 447 connects the data sequencer 413 and the input/output channel interface 419 with the buffer memory 421. The buffer memory 421 provides temporary input/output data storage and functions as a sector buffer, holding a maximum of two sectors of data which are in the process of being stored or retrieved from a data surface 214a or 214b of the disk 214, in addition to all status and control information which passes between the host and the subsystem 5.

A thirteen bit address bus 449 extends between the edge connector 365, the BIOS ROM 423 and the input/output channel interface 419; and, an eight bit data bus connects the BIOS ROM 423 with the interface 419 and edge connector 365 via the tri state bus driver 425.

Data Sequencer 413

Figure 14:
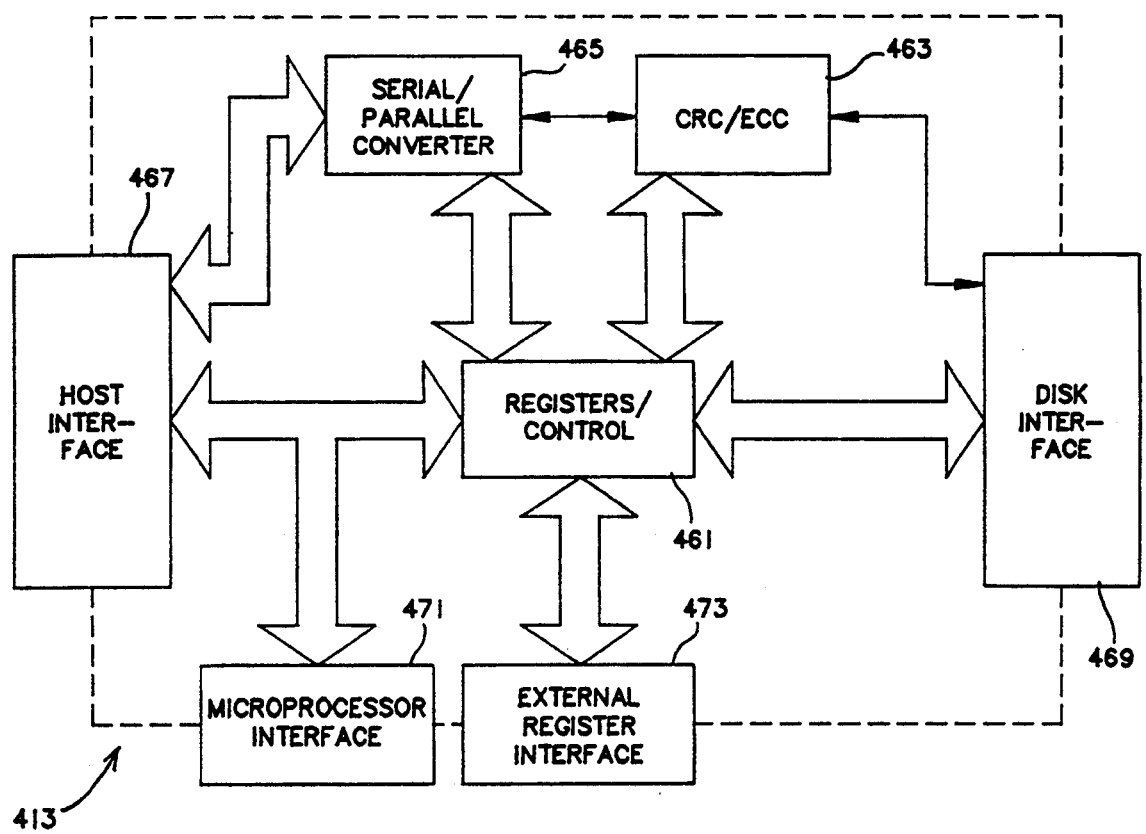
FIG. 14 is a detailed block diagram of the structure of a data sequencer included within the circuitry shown in FIG. 11.

The data sequencer 413 is a monolithic large scale integrated circuit containing seven internal functional blocks, as shown in FIG. 14. These blocks include a registers/control logic block 461. This block 461 contains 32 eight bit internal control registers and associated control logic. The registers may be individually written to initialize the parameters that control data transfer, and individually read by the microcomputer 381 in order to obtain status information about sequencer command execution. This block 461 includes disk address registers for storing cylinder, head and sector identification data, status, etc., for the data block to be handled. The microcomputer 381 issues commands to the sequencer 413 by writing to these registers.

An error correction code/cyclic redundancy check logic block 463 generates and checks error correction code (ECC) or cyclic redundancy check (CRC) bytes appended to the data and identification fields respectively of each sector. This block enables use of either a standard CCITT 16 polynomial CRC or a programmable ECC. The particular polynomial may be up to 64 bits long and is determined at initialization time by values written into the registers/control block 461.

A serial/parallel conversion block 465 enables parallel data from the host to be serialized for the disk. This logic is implemented with high speed shift registers which effect the necessary format translation between parallel and serial data.

A host interface block 467 connects the sequencer to the buffer memory 421 via the data bus 447. The DMA memory controller 417 provides the addresses in the buffer memory 421 to which the data is to be transferred via the address bus 445.

A disk interface block 469 provides logic to generate and receive control signals such as read gate, write gate, address mark enable, etc., and it also passes the serial data to and from the disk via the data separator 411 and the read/write circuits 409 and 407.

A microcomputer interface 471 enables the microcomputer 381 to read and write the internal control registers of the block 461 to control operations of the sequencer 413 and to monitor its status.

An interface 473 to the external random access memory 415, via the address bus 441 and the data bus 443 provides access to 32 format parameter registers. These format parameter registers specify the size and content of the fields within each data sector on the disk. There are two registers for each field. One specifies the number of bytes in the particular field, and the other specifies the actual value contained in that field.

A monolithic integrated circuit, product code OMTI PFM 5050 Programmable Data Sequencer, available from Scientific Microsystems, Inc., 339 N. Bernardo Ave., Mountain View, Calif. 94043, is the presently preferred implementation of the data sequencer 413.

The function of the data sequencer 413 is to monitor the serial data stream coming from the data separator 411 in order to locate the precise sector of a track at which data is to be transferred. Once a sector address coming in from the data surface is determined by the sequencer 413 to correspond with the correct sector identification, data read or write operations are then carried out.

In the case of a read operation, the sequencer transfers the data from the correctly identified disk sector (512 bytes) to the sector buffer 421 where it may then be passed through the interface to the host. In the case of a write I operation, the sequencer transfers 512 bytes of data from the host (stored in the sector buffer 421) through the write path and into the data region of the properly identified sector in the correct track on the selected disk surface 214.

The sequencer 413 is preprogrammed to carry out these transfers on a single sector basis. The microcomputer 381 servos on track while waiting until the sequencer has completed its operation before it executes any other commands. Once the transfer of a sector of data is completed, a completion signal is sent by the sequencer to the microcomputer 381. The microcomputer 381 then checks status registers within the sequencer 413 to be sure that no errors have occurred. In the case of a data read operation, the microcomputer 381 then programs the memory controller 417 to transfer the 512 bytes of data from the buffer 421 through the interface 419 to the host. The microcomputer 381 then continues to servo on track while waiting for that transfer to be completed successfully.

Memory Controller 417

The memory controller 417 is a low power monolithic integrated circuit for managing the flow of data between the data sequencer 413 and the buffer memory 421, and between the buffer memory 421 and the interface 419 and host computer. It controls the transfer of 512 byte blocks of user data stored on and retrieved from the selected data surface 214, and it also controls the transfer of command and status bytes to and from the microcomputer 381. Fundamentally, the function of the memory controller 417 is to generate addresses which are sent to the buffer memory 421 via the address bus 445. It also resolves service request contentions during multiple block data transfers between the host and the subsystem 5, when data blocks are being moved through the buffer 421.

Three channels of the memory controller 417 are used by the subsystem 5, and word count registers and address registers are provided internally for each of the channels. The microcomputer 381 programs the controller with the address from or to which data is to be transferred, the number of bytes to be transferred, and the direction of the transfer. With these parameters loaded into the controller 417, it then executes the transfer.

Figure 15:
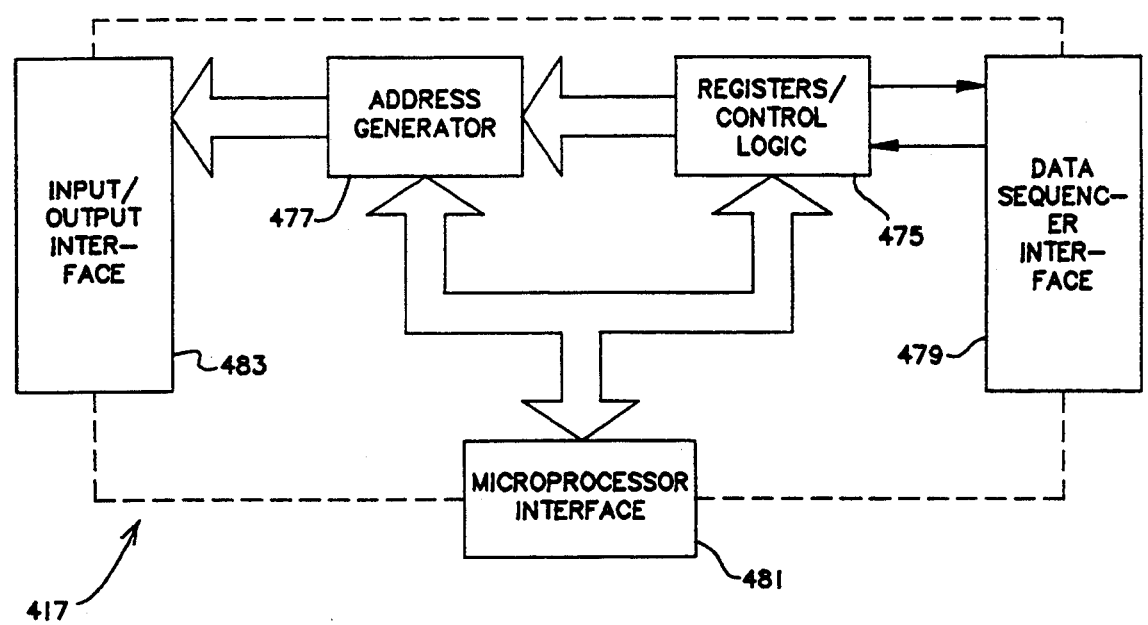
FIG. 15 is a detailed block diagram of the structure of a memory controller included within the circuitry shown in FIG. 11.

FIG. 15 sets forth a conceptual diagram of the structure of the memory controller 417. Inside the memory controller 417 a registers and control logic block 475 contains the write and read registers for each channel. The write registers may be individually written in order to initialize the parameters that control data transfer. Read registers are available and may be individually read by the microcomputer 381 in order to obtain status information about data block movement command execution.

An address generator 477 generates and puts out addresses to the buffer memory 421 via the address bus 445. These addresses locate the data to be transferred to the disk via the data sequencer 413 or to the microcomputer 381 or to the input/output interface 419. In the event of a block transfer the address generator 477 operates automatically to increment the address value to point to the next location in the buffer 421 until the entire block of data for the selected sector is transferred.

A data sequencer interface 479 connects the registers and control logic block 475 with appropriate control lines of the data sequencer 413 via the system control bus 431.

A microprocessor interface 481 enables the microcomputer 381 to read status registers and to write the control registers in order to monitor and control block data transfers. The memory controller 417 also is used to demultiplex (latch) program addresses for the program memory 383 from the address/data bus 435, and these addresses, initiated under the control of the microcomputer 381, are applied to the program memory via the interface 481 and the address bus 439.

Finally, an input/output interface 483 enables the memory controller 417 to control the operations of the input/output channel interface 419.

A monolithic integrated circuit, product code OMTI PFM 5060 Four Channel Memory Controller, available from Scientific Microsystems, Inc., 399 N. Bernardo Avenue, Mountain View, Calif. 94043 is the presently preferred implementation of the memory control let 417.

The memory controller 417 is preprogrammed to control the transfer of information, i.e. both data blocks and command and status bytes between the subsystem 5 and the host system. In this regard, the controller 417 handles and coordinates the passing of data blocks and control and status bytes back and forth across the interface 419 with the host system. Once a sequence of control bytes has been received from the host, (typically six successive bytes sent to one of four predetermined logical ports to which the subsystem is programmed to respond), these bytes are then transferred to the microcomputer 381.

There is no data path directly between the microcomputer 381 and the buffer memory 421. In order for the microcomputer 381 to receive command bytes and to send out status bytes to the host via the buffer memory 421, it is necessary that such bytes pass through the data sequencer 413. In order to write a byte to the buffer memory 421, the microcomputer 381 sets up the third channel of the memory controller 417 for writing to the address of the buffer 421 to which the byte is to be written. Then, the microcomputer 381 writes the byte to a register address within the data sequencer 413, and the byte is thereupon automatically transferred to one buffer address by coordinated automatic action of the sequencer 413 and the controller 417. A similar, but 2-step procedure is followed to move a byte of data from the buffer 421 into the internal random access memory of the microcomputer 381. A prefetch is used after setting up the controller 417 by the microcomputer 381 to place the first byte into the sequencer 413. A fetch is then used to move the byte from the sequencer 413 into the processor's internal random access memory. Fetches are then used to transfer all remaining bytes of the sequence.

The memory controller 417 passes data back and forth with the host on a byte by byte handshake basis. Once a block of data, usually a 512 byte sector amount, has been passed successfully, completion of the transfer is signalled to the microcomputer 381.

The host computer normally handles data block transfers from and to the subsystem 5 on a direct memory access basis wherein after the six command bytes have been passed to the subsystem 5, the host central processing unit (CPU) relinquishes the data bus and data is directly transferred into the active memory of the host under the control of a host memory controller. Byte-by-byte data transfers are used between the storage subsystem 5 and the host for command and status bytes on a programmed input/output basis, wherein such bytes pass through the accumulator register of the host. Such transfers may be used for data blocks but would take far more time and greatly impair the speed advantages normally associated with rigid disk data storage devices.

Input/Output Channel Interface 419

The input/output channel interface 419 is implemented as a special purpose low power VLSI monolithic circuit. This circuit 419 provides all of the circuitry necessary for interfacing the controller elements 413, 417, 381 and related circuitry of the Winchester disk subsystem 5 to the input/output channel bus of a selected host computer, such as the IBM Personal Computer TM . The circuit 419 provides a buffered data path to the host input/output channel, and it provides address decoding for access to eight host input/output address ports, address decoding for access to the external BIOS memory 493 via the buses 449 and 451, and circuitry for control of host bus interrupts and DMA transfers.

Figure 16:
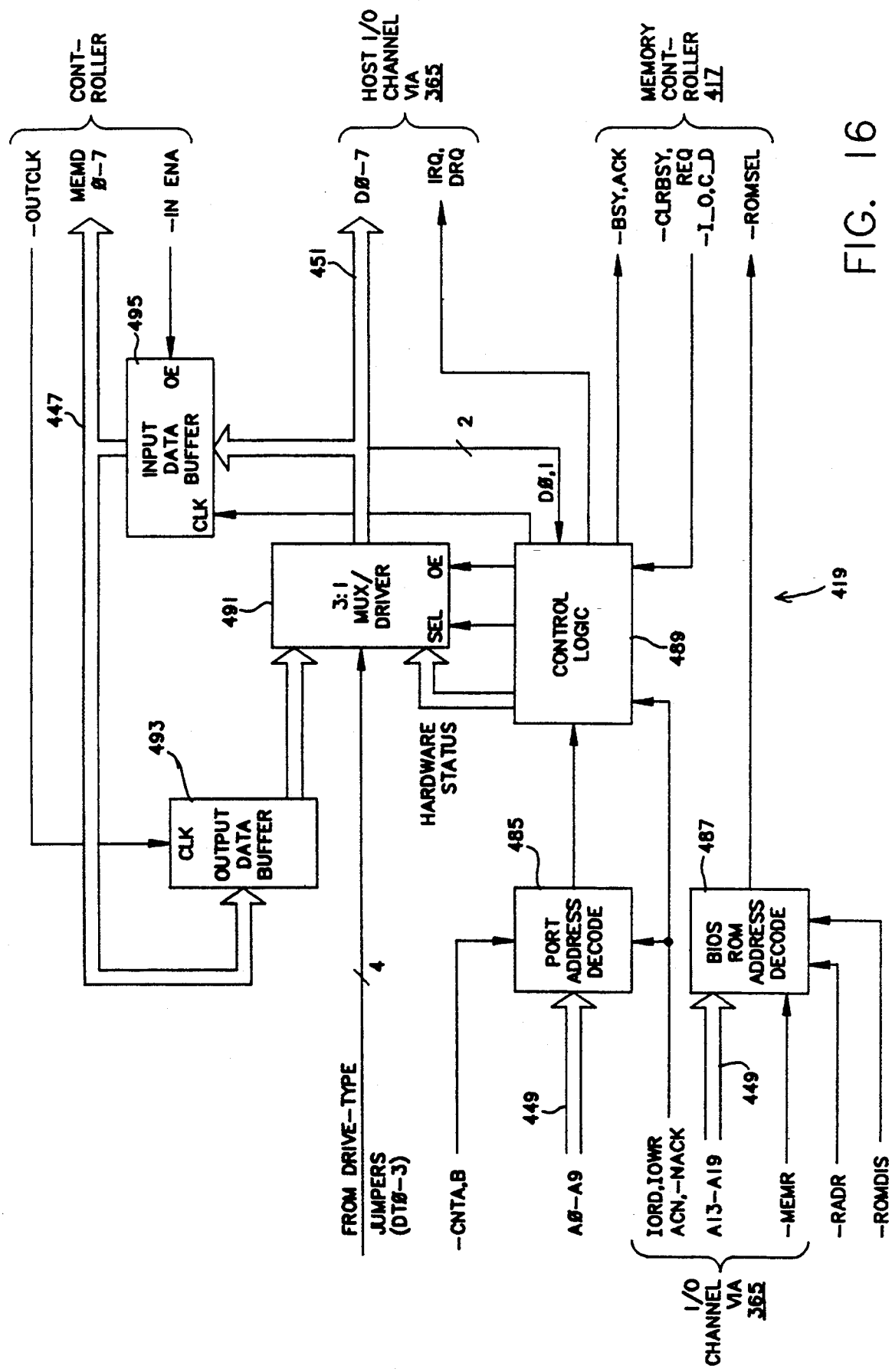
FIG. 16 is a detailed block diagram of the structure of an input/output channel interface included within the circuitry shown in FIG. 11.

As seen in FIG. 16, the circuit 419 includes a port address decode block 485 which decodes address lines A0-A9 from the host I/O channel in order to enable selection of eight input/output ports: four write ports and four read ports (of which only three are used). Two user accessible address select input pins —CNTA and —CNTB are provided to change the address range of the host's input/output ports to enable the use of multiple storage subsystems 5 in the same host personal computer.

A BIOS memory address decode block 487 decodes address lines A13 through A19 from the host I/O channel to give a ROM select signal —ROMSEL for enabling reading of the external BIOS memory 423. An address select input pin —RADR is provided to change the address range of the BIOS memory 423. An input pin —ROMDIS is also provided to disable decoding of the BIOS address entirely.

A control logic block 489 contains logic circuitry to control the host input/output port register reads and writes, data block transfers to and from the host and interrupts sent to the host. This block includes two internal flip-flops which control whether the host will be interrupted at the completion of a command, and also whether the transfer of data to the host will be by direct memory access through a host memory controller, or not. These bits are set by bits D0 and D1 of a control word written by the host into one of the write ports of the control logic block, and control the logic levels on an interrupt request line IRQ and a data memory request line DRQ extending to the host. A data acknowledge signal -DACK is received into the control logic block 489 from the host to indicate receipt of a data byte and thereby signal the readiness of the host to receive another data byte.

A 3:1 Multiplex/Driver block 491 enables one of three different host input/output read ports to be read on the host input/output channel by the host. These ports include an output data buffer 493 (Port 0) which latches data on the bus 447 from the buffer memory 421 and puts out the data to the host through the block 491 and the data bus 451 on a byte-by-byte handshake basis. The multiplex/driver block 491 also selects a hardware status register (Port 1) located in the control logic 489 which thereupon indicates to the host the state of the various control signals inside of the input/output circuit 419, and also a drive type register (Port 2), also within the control logic 489, which enables the host computer to read the value of four inputs which specify the type of disk drive in use. Although a fourth read port (Port 3) is available, it is not used by the subsystem 5. An input data buffer 495 latches data on the bus 451 from the host and puts out data to the buffer memory 421 on the bus 447 on a byte by byte handshake transfer basis.

Servo Circuit 385

Figure 17:
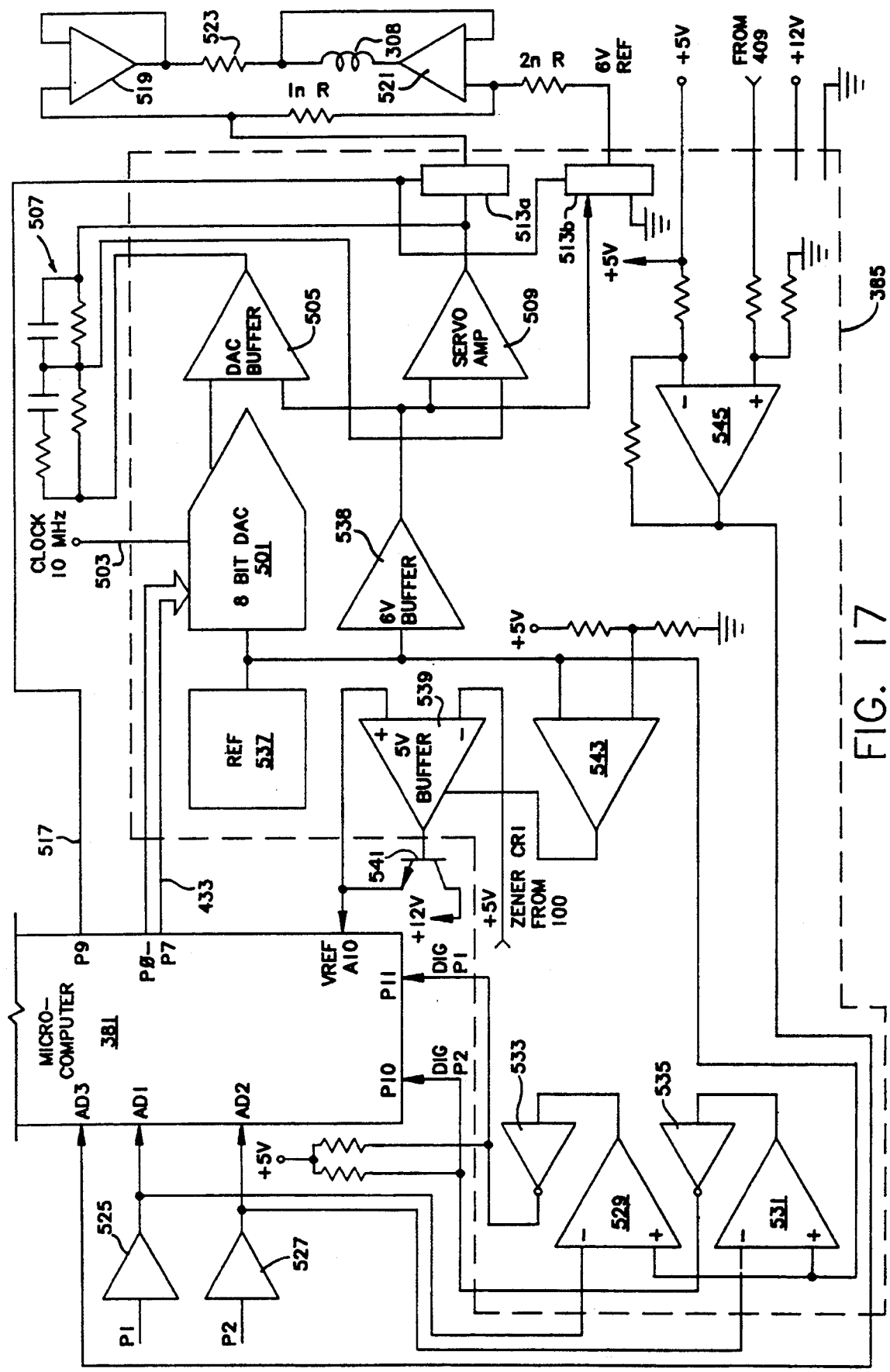
FIG. 17 is a detailed schematic and block diagram of the structure of an analog/digital servo circuit included within the circuitry shown in FIG. 3.

A low power monolithic analog and digital integrated circuit 385 is provided for the analog/digital servo circuit. Its internal architecture is depicted in FIG. 17. This chip 385 includes the circuitry required to carry out digital to analog conversions to provide control current to the actuator power drivers 519, 521 for track following and seeking operations. The servo circuit 385 also performs a peak detection function upon the read signal immediately following the index marker 399 when the head 320, or 322 reads the servo bursts. The peak detection function enables the microcomputer 381 to determine track centerline information from the radially offset, time staggered servo bursts.

The servo functions are carried out by sending an analog direct current through the rotor coil 308 of the moving actuator assembly 300. The direction (polarity) of the current passing through the coil determines the direction, whether in or out radially on the disk, of head movement. The electromagnetic motion of the head actuator assembly 300 is controlled by the microcomputer 381 which monitors coarse position information generated by the optical encoder assembly 100 and by the fine position information derived from the single servo sector 101 via the read and write channel.

FIG. 17 diagrams the circuitry of the servo circuit 385 within its environment of the microcomputer 381, optical encoder 100, and rotor coil 308.

Beginning with the eight bit servo data bus 433 from the microcomputer 381, digital data enters an eight bit digital to analog converter 501. The digital to analog converter is a switch-capacitor design and uses a 10 MHz clocking signal which is supplied over a line 503. The analog output from the DAC 501 is buffered in an operational amplifier DAC buffer 505 and then passes through an external phase lead filter 507 which provides servo loop phase compensation in combination with an internal track following servo amplifier 509. A switching circuit 513 operating in response to a signal from the microcomputer 381 via a servo off control line 517 enables current to be removed entirely from the rotor coil 308 under the control of the microcomputer 381.

Two external driver amplifiers 519 and 521 are used to drive current through the coil 308. A voltage output of the amplifier 509 is applied directly to the non-inverting input of the amplifier 519 and is applied to one end of a voltage dividing network comprising resistors having a two to one resistance ratio. A common node of the network is connected to the non-inverting input of the amplifier 521. The network is also connected at its other lower resistance end to a six volt reference voltage, so the actual voltage between three and nine volts put out to the amplifier 519 is proportioned about the reference voltage when it reaches the input of the amplifier 521.

For example, when a three volt potential is applied to the amplifier 519, three volts appears at its output. At the same time a four volt potential appears at the input and output of the amplifier 521. A one volt difference is then present across a ten ohm sense resistor 53. A one volt drop across the 10 ohm resistor 523 creates a current flow of 100 milliamps which passes through the rotor coil 308 from up to down in FIG. 17, and causes it to move the actuator assembly 300. When the voltage at the input of the amplifier 519 is e.g. nine volts, only eight volts appears across the amplifier 521, causing a 100 ma current in the opposite direction to flow.

The voltage drop across the resistor 523 is sensed by both amplifiers 519 and 521 at inverting inputs thereof, and is used, in combination with the control voltage applied to the non-inverting inputs, to control the magnitude and direction of current passing through the coil 308. The driving amplifiers 519, 521 supply a maximum of approximately 100 milliamperes to the coil 308, in either direction of current flow.

The two current to voltage converters 525 and 527 in the optical encoder subassembly 100 convert the light-induced phase currents P1 and P2 into analog voltages. Outputs from these converters 525 and 527 (U1A and U1B in FIG. 18) enter the microcomputer 381 analog to digital conversion ports and also enter the servo circuit 385, as shown in both FIGS. 11 and 17. Two comparators 529, 531 in the circuit 385 monitor the P1 and P2 voltages and develop digital track crossing signals which are returned to the microcomputer via two inverting amplifiers 533, 535, also inside the circuit 385. By generating the digital track crossing signals, the microcomputer 381 is able to monitor coarse head position during track seeking operations more efficiently than if it had to convert the P1 and P2 signals to digital values first.

A voltage reference element 537 provides a reference voltage to appropriate nodes of the circuit elements within the chip 385 as shown in FIG. 10. A six volt buffer 538 provides a reference six volts to each of the DAC buffer 505 and the servo amplifier 509. The six volt reference enables the DAC to be varied in its output in a range between three and nine volts over 256 equal increments.

A five volt zener reference from the optical encoder assembly 100 passes through a buffer amplifier 539 and an external transistor 541 before being put into the reference voltage input Vref of the analog to digital circuit within the microcomputer 381. When the zener voltage from the encoder 100 drifts with temperature changes, these small changes are also tracked by the digital to analog converter of the microcomputer 381.

The analog servo chip 385 works primarily with a twelve volt power supply, while the microcomputer 381 works with a five volt power supply. A comparator circuit 543 monitors the five volt bus within the servo chip 385. If the five volt reference is lost at the chip 385, the comparator 543 shuts off the buffer 539, thereby preventing the microcomputer 381 from becoming damaged because the Vref port is being forced to ground potential. It should be noted in this regard that all of the outputs of the servo circuit 385 leading directly to the microcomputer 381 are open collector or are output protected, so that the microcomputer 381 is thereby protected against the failure of the chip 385 or any of its elements.

The chip 385 also includes a detector amplifier 545 which is directly connected to the read/write channel in order to receive the sector servo bursts prerecorded in the single servo sector 401. The peak voltage levels of the read/write channels are translated by the amplifier 545 into levels more suitable for the analog to digital converter input port AD3 of the microcomputer 381, driven by the output of the amplifier 545.

Data Separator 411

Figure 19:
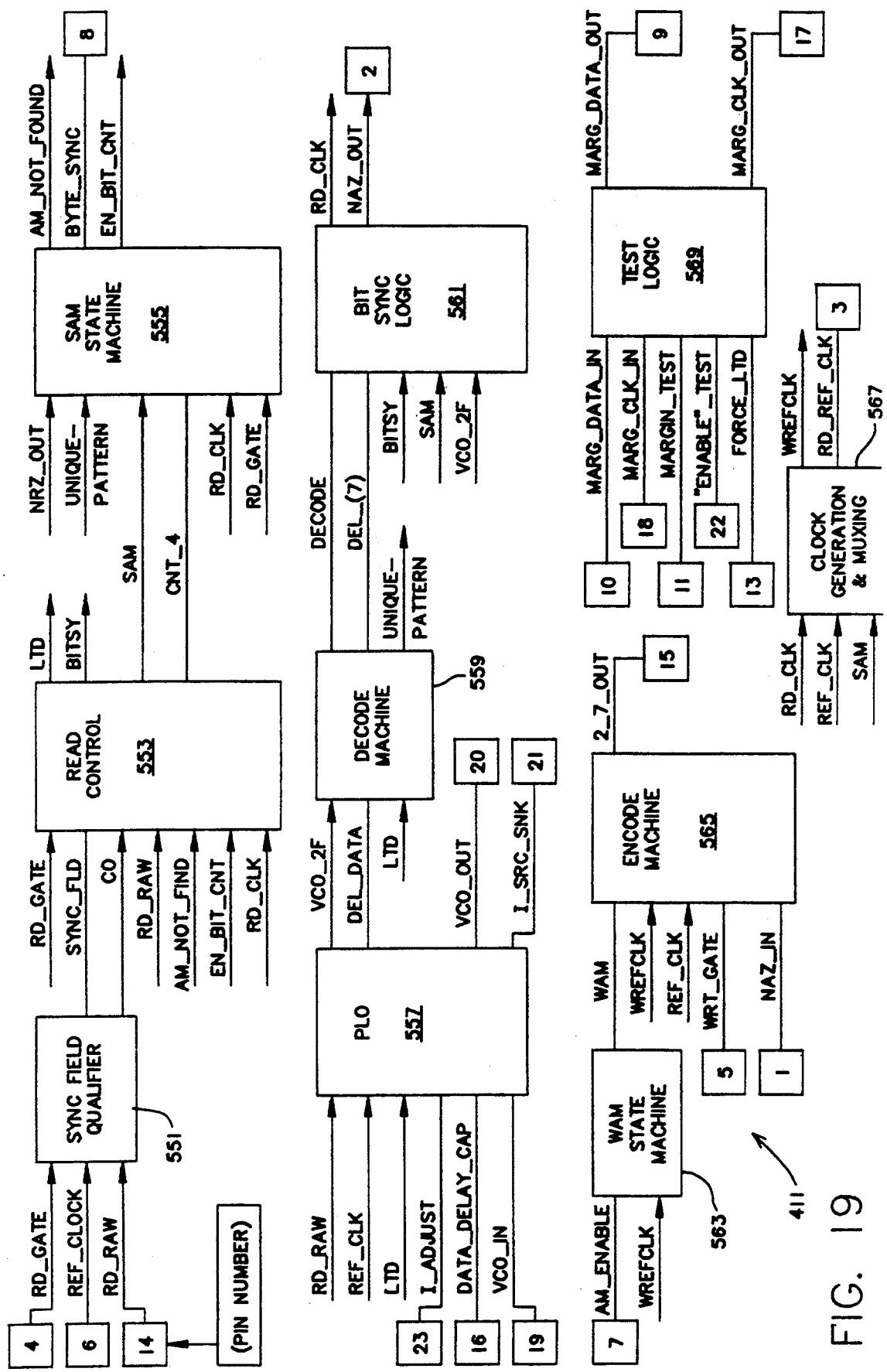
FIG. 19 is a detailed schematic and block diagram of a data separator element included within the circuitry shown in FIG. 11.

The data separator element 411, preferably formed as a monolithic integrated circuit, such as type OMTI 20527 available from Scientific Microsystems, Inc., 339 N. Bernardo Avenue, Mountain View, Calif. 94043, or equivalent, is depicted in FIG. 19. The data separator 411 performs three functions.

First, the data separator 411 determines head position relative to the data format. This task is accomplished by writing a special pattern onto the data surface 214, commonly referred to as an address mark pattern, which can be identified when a read operation is initiated. The separator circuit 411 generates and writes the address mark pattern while formatting each data track, and it identifies the address mark when a read operation is begun.

Second, the data separator 411 defines bit cell boundaries on the disk data surface. This task is accomplished by a phase locked oscillator (PLO). The PLO constructs a data clock signal which precisely defines bit cell boundaries as they exist in the formatted data track. Essentially a flywheel oscillator with inertia to average out minute fluctuations in disk speed, the PLO constantly updates the phase and frequency of the data clock signal throughout each data read operation.

Third, the data separator encodes and decodes non return to zero (NRZ) data to a format more suitable for being recorded on the media as a series of magnetic flux transitions, due to constraints peculiar to magnetic recording phenomena. One suitable format is 2,7 code, and the data separator 411 handles the code conversion.

The monolithic data separator circuit 411 as shown in FIG. 19 includes a sync field qualifier circuit 551. This circuit 551 inspects the frequency of incoming pulses from the read electronics 409. The output of the circuit 551 is a logical one or zero, depending upon the frequency of the incoming pulses. For example, if the pulses are separated by less than 204 nanoseconds or more than 602 nanoseconds, the output will be low. If the pulses are separated by greater than 300 nanoseconds and less than 492 nanoseconds, the output will be high, indicative that a sync field is validly present in the raw data stream. Only if the sync field is valid will the PLO be permitted to lock onto incoming data.

This circuit 551 is also used to reset a read sequence. A search for the address mark cannot be initiated until the sync field is valid for eight bytes of data. Only then may a read sequence progress if the sync field falls to zero. If it does before the consecutive eight bytes are received, the read sequence is automatically reset. This mechanism protects against write splices. For example, data having a hexadecimal value of 33 encodes to one pulse every 800 nanoseconds, which will force sync field low. A field of hex 33 is written on either side of a five byte field in the format where write splices may occur. This forces the read sequence to be reset upon entering the write splice and coming out of it. This is important, because over time, write splices could form into any pattern of data including hex FF data and an address mark. However, by making the correct sequence greater than five bytes and forcing a reset of the read sequence on either side of the write splice, a false address mark cannot be generated. A read control circuit 553 provides a mechanism to discover where the data transducer head 320, 317 is located relative to the data format of a track being read, and to lock the PLO to the disk data. The control circuit 553 includes a four bit asynchronous counter, three state holding flip flops and various decoding logic. A Lock to Data (LTD) signal forces the PLO to phase lock to the read raw (RD RAW) pulses coming from the read channel 409. A bit sync (BITSY) signal enables the decoder to block incoming encoded bits for correct decoding. A search for address mark (SAM) signal enables another state machine 555 to determine whether an address mark is present on the disk at the precise moment, or not. The appropriate action is then taken by the SAM circuit 555.

The phase lock oscillator 557 defines the bit cell boundaries as they exist on the formatted disk during a read operation. The PLO 557 comprises a phase comparator, a filter and a voltage controlled oscillator (VCO). The phase comparator compares the phase of the encoded data read from the data surface 97 with the VCO signal. It then supplies a current via an I_SRC_SNK pin whose duty cycle is proportional to the phase difference between the two signals. The filter requires external passive components to provide phase compensation to the phase lock loop, to attenuate the high frequency components of the I_SRC_SNK signal, and to convert the current into voltage. The VCO is a voltage to frequency converter which provides the decode machine with a bit rate clock of the same phase as raw data. The frequency is determined by the filtered I_SRC_SNK signal.

A decode machine 559 and a bit sync logic block 561, taken together, are the heart of the data separator. They take in encoded data, such as in 2,7 code format, or another suitable format, from the read channel 409, decode such data and put it out as NRZ data in phase lock with the read clock RD_CLK signal. There are two code bits for every one NRZ data bit, and the code bits must be blocked together correctly before they may be decoded. The bit sync logic block 561 determines correct blocking of encoded bits in response to a valid bit sync signal (BITSY) as generated by the read control circuit 553.

A write address mark state machine 563 generates the write address mark signal (WAM) at a specific time related to the address mark enable signal AM_ ENABLE. The WAM signal is used to invert two adjacent code bits. This alters a correctly encoded byte of data into a unique pattern which is not generated by the encode logic because of the encoding rules of the particular code employed. This pattern serves as the address mark.

An encode machine 565 converts NRZ data from the data sequencer 413 into encoded data in accordance with the selected encoding scheme, whether it be 2,7 code or some other satisfactory code. Encoding operations are carried out whenever the write gate line (WRT_GATE) is enabled. When the write address mark signal WAM is asserted, code bits are inverted. Code bits are synchronized to the reference clock signal REF_CLOCK provided from the data sequencer 413.

A clock generation and multiplexing circuit 567 contains the circuitry required to divide the reference clock signal by two in order to generate a write reference clock WREFCLK signal. This signal is required for the encoding operation of the machine 565. The multiplexer in the circuit 567 steers one of two inputs to a read reference clock output RD_REF_CLK which goes to the data sequencer 413. During a read operation, the read clock signal RD_CLK (which is synchronous with the NRZ data put out by the bit sync logic block 561) is passed to the data sequencer 413 to synchronize it with the NRZ data stream.

A test logic block 569 enables special tests to be carried out on the data separator chip 411. Such tests include holding the LTD line high in order to measure loop parameters of the PLO 557. Also, data may be delayed from the disk with respect to the bit cell in order to perform window margin testing. And the time lag between two internal signals may be changed in order to optimize the setup time on the phase comparing flip-flop.

Disk Format

Figure 20:
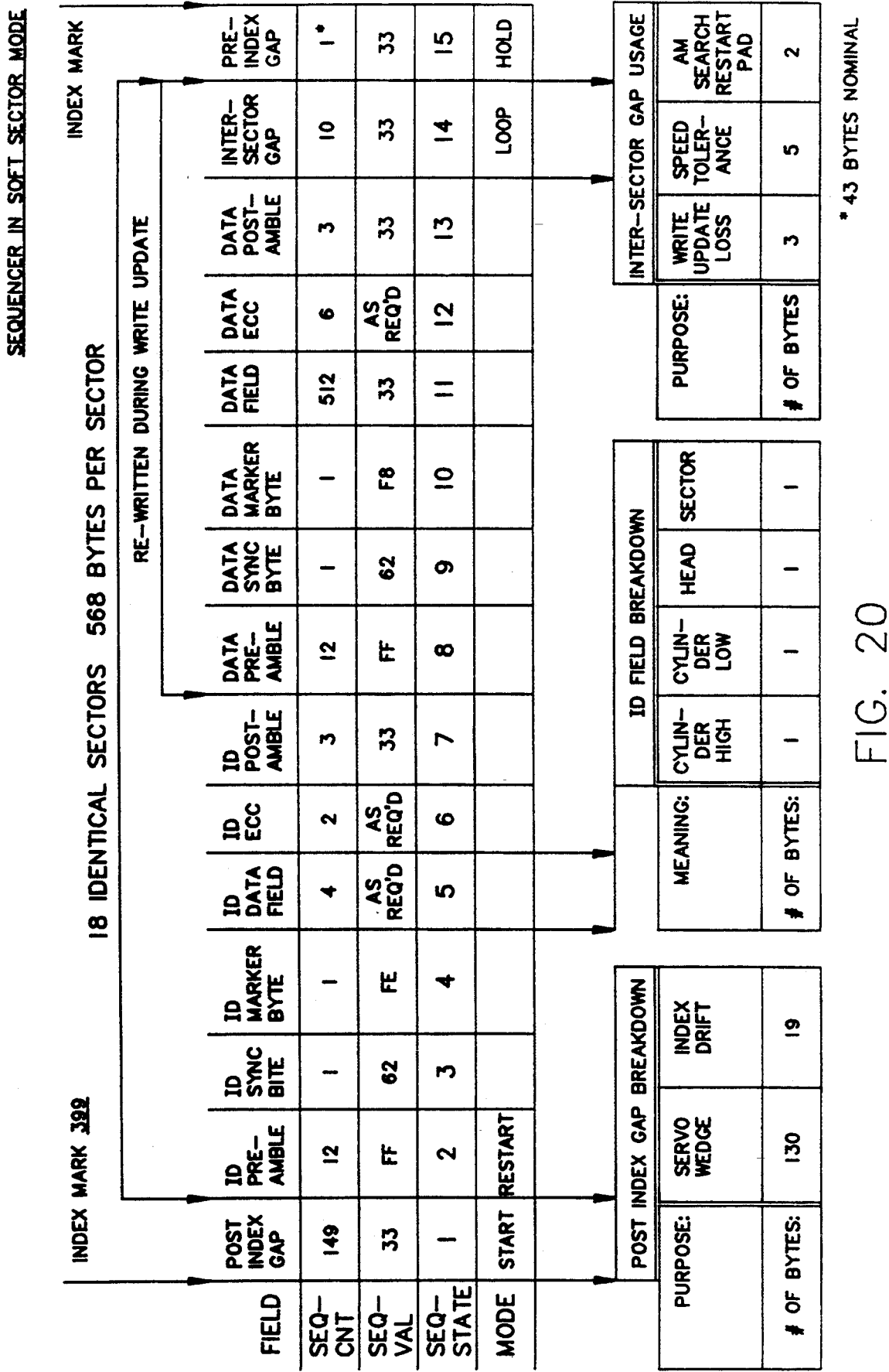
FIG. 20 is a diagram of track formatting followed in the disk file subsystem depicted in FIG. 1.

A format arrangement for the subsystem 5 is depicted in FIG. 20. Therein, eighteen identical sectors are provided following the index mark 399 and the post-index gap which contains the wedge servo bursts and a tolerance region for index drift, An ID preamble contains 12 bytes of hex FF data. Its purpose is to synchronize the PLO 557 before the data sequencer 413 reads the ID DATA FIELD. The hex FF pattern is used because it provides the highest frequency read pulses of any single byte repeating pattern, Its length allows for two bytes of PLO sync detection before locking the PLO, five bytes of PLO sync time, one byte of phase set time and four bytes for margin.

An ID SYNC BYTE is the single address mark byte for each sector. It is made unique by violating the encoding rules otherwise carried out by the encoding machine 565. The resultant unique pattern is known to, read and checked by the data sequencer 413 in order to validate the particular sector ID, An ID MARKER BYTE is a byte of hex FE data, chosen only to be different from the DATA MARKER BYTE. The data sequencer 413 uses this byte to determine that a sector ID data field is about to be read.

An ID DATA FIELD includes four bytes holding the sector address in the form of cyliner high, cylinder low, head and sector.

An ID ECC field of two bytes of CRC information are used by the sequencer 413 to check the validity of the sector address, A three byte field ID POSTAMBLE of hex 33 data is provided to guarantee a stable read clock from the PLO during the time that the last bits of the ID ECC field are read, decoded by the decoder 559 and passed to the sequencer 413.

A DATA PREAMBLE field duplicates the ID Preamble field, and its purpose is to synchronize the PLO before reading the data field.

A DATA SYNC BYTE serves the same purpose for the data field as was served by the ID DATA SYNC BYTE for the ID data field.

DATA MARKER BYTE is a byte of hex F8, used by the data sequencer 113 to determine that a data field is about to be read.

DATA FIELD. This field is for storing a block of 512 bytes of user data.

DATA ECC is a six byte field for data error correction code.

DATA POSTAMBLE is a three byte field of hex 33 data and guarantees a stable read clock from the PLO during the time that the last bits of ECC are being read, decoded and passed to the sequencer 413.

INTERSECTOR GAP is a ten byte field of hex 33 data containing three functionally separate sections. A three byte write-update field allows for the data preamble and data field to move down the track by up to three bytes between a format operation and a write update operation. This shift is accounted for by the data format encode and decode delays, a one byte sequencer delay and a number of single bit resynchronization delays. A five byte speed tolerance gap allows for a plus and minus point four percent (0.4%) speed variation of the spindle motor 202 to be accomodated between track format operations and write update operations (a 0.8% maximum difference). Finally, a two byte pad guarantees at least two bytes of hex 33 data before the ID Preamble of the next sector. This forces the PLO sync field detector to restart the address mark search sequence even if it had falsely detected some PLO sync data from write splices in the speed tolerance field.

PREINDEX GAP is a 43 byte field of hex 33 data at nominal spindle motor speed. Its purpose is to allow for motor speed variations during track formatting. An overspeed of up to 0.4% may be accomodated.

Control Software

The microcomputer 381 operates essentially in an interrupt driven mode. There are several inputs to the microcomputer 381 for setting its internal interrupt request flags. All interrupts are software maskable, except a nonmaskable interrupt line which may be operated by the host operating system (write to Port 1), in order to reset the subsystem 5 should it become lost (hung up) during command execution. The host reset operation is flagged through the BAR NMI port, pin 25. All other host commands are initiated by an interrupt which is flagged through bit position 3 of Port C, (BAR INT2, pin 20), which may be software masked if some task having a higher priority is in a critical phase of execution.

There are three main phases of software execution: Initialization, Main Loop, and Command Execution. The initialization phase, at power on (or upon an NMI host RESET command) resets and/or preloads all of the control registers with initial or default values required for proper operation of the data sequencer 413, the memory controller 417 and the head and disk assembly servo system. The operating parameter registers within the microcomputer 381 are also cleared and set with initial or default parameters. Once the subsystem 5 is set up, the microcomputer 381 seeks to track zero and enters the main loop.

The main loop is essentially an idle mode for maintaining the status quo. A track following servo value generated by the microcomputer 381 is latched into and converted to an analog voltage by the digital to analog converter 501 and is converted to a current which passes through the rotor coil 308 to keep the heads 320, 322 centered on track. A phase byte selects which phase, whether P1, P2, BAR P1, or BAR P2, should be used for servoing on-track. (P1 and P2, being in quadrature, logically define four adjacent track locations and boundaries). In the main loop, the microcomputer 387 creates a tight on-track servo loop about the selected phase signal. The selected phase is digitized and read, and the servo loop is updated, approximately every 90 microseconds. The analog to digital conversion process requires approximately 48 microseconds, and the digital processing and update requires the rest of the 90 microseconds, the time duration for main loop execution. This updating of the track following servo continues repeatedly until an interrupt occurs. It is expected that approximately 95 percent of the useful life of the subsystem 31 will be spent in executing the main loop.

There are three main interrupts which cause the microcomputer 381 to exit the main loop. The first interrupt is an Index Interrupt, which occurs once each revolution of the disk 214. The prerecorded A and B bursts in the servo wedge 401 are read sequentially and peak amplitude sampled through the analog to digital converter within the microcomputer 381. The two amplitude values are compared, and any difference value is used in a computation to provide an error correction value which is combined with the digitized selected phase value from the optical encoder to derive the correction value sent to the digital to analog converter 501. At the completion of the servo routine at Index, the microcomputer 387 returns to the main loop.

Another interrupt is a RESET operation from the host which is generated by the host's operating system in the event that the subsystem 5 fails to respond to other host commands. The Reset operation creates a hardware interrupt in the subsystem 5 and forces it to reinitialize. In this manner, if the microcomputer 381 gets out of sequence in executing commands, error recovery, i possible, will be accomplished.

A third interrupt is a SELECT Interrupt which is generated by the host computer when it sends a Host Command to the subsystem 5. Each command received by the microcomputer 381 is compared with a table of valid commands. When a matchup occurs, the table provides an address for a command execution routine in the program memory 383 which corresponds to the particular valid command received from the host. If no matchup occurs, the command is rejected as invalid. Ordinarily, when a command is received, the microcomputer 381 is interrupted, and jumps to, and begins executing the command routine for the particular command. At command completion, the microcomputer 381 returns to the main loop.

A Timer Interrupt occurs every 150 microseconds during seek operations which are carried out in response to a select interrupt which requires a seek operation.

There are a number of Host Commands which may be given to the subsystem 5. The following Host Commands are representative of the types of commands likely to be sent by a host to the subsystem 5 in order to carry out useful data storage and retrieval operations.

TEST DRIVE READY which is a check to see if the subsystem 5 is ready to receive another command, or to see if it is e.g. seeking or otherwise unavailable. The subsystem 5 puts out an error message to the host in the event that it is not ready.

REQUEST SENSE STATUS which is invoked to send four bytes of a sense block which characterizes current status of the subsystem 5. This command requires the subsystem 5 to be set up to transfer the four bytes; the bytes are placed in the buffer 421, and then they are sent to the host via the interface 419. The microcomputer 381 waits until the host signals receipt as a command completion. Any error conditions are sent to the host in response to this command.

READ ERROR LENGTH. This command sends the host a one byte burst length of the last ECC error. It requires a setup for a one byte transfer via the buffer.

INITIALIZE DRIVE CHARACTERISTICS. This command enables the host to initialize the characteristics of the subsystem 5. The memory controller 417 is set up to transfer eight bytes of data from the host through the buffer 421 and into the internal RAM of the microcomputer 381. This information includes the maximum number of cylinders (track locations) and heads. Also, the maximum ECC data burst length is stored.

FORMAT TRACK. This command enables the host to format a single track. The track address is checked to be sure it is legal; the sequencer 413 is set up for formatting; the format track command is sent to the sequencer; and a "bump detect" function is monitored throughout the formatting operation. (The Bump Detect Routine is used to detect whether any physical impulse has jarred the subsystem 5, causing the head to move off of track centerline alignment. This routine calls for monitoring the selected servo phase put out by the optical encoder 100 as closely as possible (75 microsecond loop) during the format operation. If a bump is detected, the one track format operation is automatically repeated.)

FORMAT DRIVE. This command is invoked by the host in order to format all of the host-accessible storage capacity of the subsystem 5. It includes carrying out the FORMAT TRACK command for all of the data tracks, beginning with the track specified in the command and continuing through track 611.

READ DATA. This command enables the host to receive the data from one or more specified number of sectors. A legal starting address is checked. Then, the actuator 300 is commanded to move the head transducer from its present track location to the target or destination track. After the seek, the memory controller 417 and the data sequencer 413 are set up for operations at the destination track, and a command byte is sent to the sequencer to start data transfer operations. The microcomputer 381 waits until the sequencer 413 finishes reading the proper sector at the destination track. Errors are checked for, and the microcomputer 381 waits until the host memory channel is ready to receive the data commanded. The transfer process to the host is then initialized in the memory controller 417 and the transfer to the host is carried out.

If there are additional sectors to be transferred to the host, the next address is generated and loaded into the sequencer, and the sequencer is then restarted. This process goes on until all of the data is transferred to the host. If the operation requires access to sectors in adjacent tracks, automatic single track stepping (and head switching) is commanded at the appropriate time by the microcomputer 381. When all sectors have been transferred, the command is completed and the microcomputer signals command completion to the host.

WRITE DATA. This command follows the same progression of steps as are followed for the READ command, with the exception that data is received from the host over the interface 419 and via the buffer memory 421. The microcomputer 381 moves the selected head to the correct track location. The first block of data is transferred from the host to the sector buffer 421. The sequencer 413 begins reading sector headers. When the right sector is located, the sequencer transfers data from the buffer 421 through the write channel, so that it is recorded in proper time and position in the data area of the sector. This process is carried out for each sector, until the command is completed. During the writing process, the microcomputer 381 while waiting for a command completion signal constantly performs the bump detect routine, to be sure that writing is inhibited in the event that a bump is detected. If a bump is detected, the sector is rewritten after the head and disk assembly has stabilized.

Other Commands. There are a number of utility commands (such as a SEEK which is not a part of a READ or WRITE command) which may be provided to carry out certain tests and operations desired by the host. These commands are a matter of design choice and are routinely understood in the art and are not essential for successful operation of the subsystem 5. For this they are not described herein.

Command Structure and Addressing

Every command which is sent to the subsystem 5 by the host is six bytes long. The first byte is a command code to identify the type of command, and the succeeding bytes provide the necessary parameters to carry out the command. Then, typically a block of sector data (512 bytes) is sent to or from the subsystem depending whether the command was a write or a read command. Other commands are the Initialize Drive Characteristics command which transfers eight bytes of data from the host to the subsystem 5, the Request Sense Status command which transfers four status bytes from the subsystem 5 to the host, and the Read Error Length command which transfers one byte from the subsystem to the host.

After the subsystem 5 has completed each command, the microcomputer 381 sends out a one byte command completion signal to the host, of which only two bit positions are used. The first bit indicates drive number (whether drive number zero or one) and the other bit indicates whether or not an error was detected during command completion within the subsystem 5.

All communication between the subsystem 5 and the host system is carried out across eight ports: four input ports and four output ports of the host system. The ports are paired together, so that for example port 0 which is at a single logical address is one port in its input mode and in its output mode is another port. All data transfer is via port 0. All hardware status information is transferred from the subsystem 31 to the host system via port 1. The host reads the status port during data exchanges so that it may synchronize its operations with the state of the subsystem 5. For example, it looks at the request bit of port 1 before sending each command byte.

Port 1 has very different meanings in read and write modes. In the read mode port enables the host to read the hardware status lines of the subsystem 5. The lower four status bits of port 1 are used to carry out a handshake control for each byte of data transferred between the host and the interface 419 of subsystem 5. The busy bit (3) is set by the subsystem 5 whenever it is in the process of executing a host command. For example, the busy bit is set by the subsystem 5 when the host selects it for an operation (a write to port 2) and remains set until the command completion byte is sent to the host via port 0 at the completion of execution of a host command, whereupon the busy bit of port 1 is cleared.

A control/data bit (2) indicates the status of the data bytes being transferred via port 0, whether control bytes or data bytes. An input/output bit (1) indicates whether the data at port 0 is output from the host or input to the host from the subsystem 5. (Output, if user data, corresponds to a Write command; Input, if user data, corresponds to a Read Command). A request bit (0) enables a byte by byte transfer handshake control. The setting and clearing of this bit coordinates the transfer of each byte between the host and the interface 419, during non-DMA data transfer operations as when command bytes are being sent.

A write operation to port 1 by the host generates a reset signal which results in a non-maskable interrupt of the microcomputer and a reinitialization of the subsystem 5 under host operating system control.

Port 2 is used by the host to read a drive type byte which may be used to indicate to the host which type of peripheral is attached to the host system. This byte may be polled, for example, by the host to determine storage capacity size, in the event that the storage capacity of the subsystem 5 is increased e.g. to 20 megabytes by the addition of another data storage disk 215.

A write to port 2 generates a controller select pulse which sets a flip-flop within the Input/Output Interface 419 which has an, output line -BUSY. This line interrupts the microcomputer 381 when a command from the host has been received at the interface 419. To start a command sequence, the host writes to port 2, causing the -BUSY line to become true. This event is detected by the microcomputer 381 and it leaves the main routine and begins a command execution routine. At the same time, the host monitors the subsystem hardware status port 1. As soon as the host sees the busy signal being asserted (true), the command/data (C/D) line being asserted (true), the input/output line not being asserted (not true), and the request line being asserted (true), it knows that the subsystem 5 is ready to receive the first command byte. The first byte is then written to port 0 by the host and is temporarily stored the input data buffer 495 of the I/O interface 419. An ACK signal is then sent to the memory controller 417, telling it that the first command byte is in the buffer 495. The memory controller 417, drops the request signal, generates a Memory Enable signal, and the byte is then transferred to the buffer 421 and stored therein at an address commanded by the memory controller 417. The memory controller then raises the request signal again, thereby signalling the host to send the next command byte. This procedure is followed until all six command bytes are stored in the buffer 421. They then go to the microcomputer 381 for execution, and at the completion of execution a command completion byte is latched into the output data buffer 493 read by the host at port 0.

Port 3, the fourth port, is not used as a read port. It is used as a write port by the host to enable/disable DMA operations and interrupts sent to the host from the subsystem 5. Thus, the host may write to port 3 before every command so that it may specify to the subsystem 5 whether the host expects to be interrupted at the end of the command, and whether the command to be executed will use block transfers by DMA if it is e.g. a read or write command.

EXAMPLE 1

The subsystem 5 is in the main loop, servoing on track. The host operating system will write to port 2 which will create a signal —BUSY which is an interrupt to the microcomputer 381 and which causes it to exit the main loop. The microcomputer 381 enters an interrupt service subroutine which will cause the memory controller 417 to raise the Request bit in order to obtain the first command byte via port 0. When the host writes the command byte to port 0, an acknowledge signal is sent to the memory controller 417 causing it to lower the Request signal and temporarily store the byte in the buffer 421. The Request bit is again raised, and the next byte is received across the interface 419 in the same manner and stored in the buffer 421. The handshake via the Request bit of the status port 1 continues until all six bytes of the host command have been received and stored in the buffer memory. The memory controller 417 is preprogrammed so as to expect to handle reception of the six command bytes. Completion of reception of the six command bytes is signalled to the microcomputer 381, whereupon it transfers the six bytes from the buffer 381 to its own registers via the data sequencer 413 as already explained and decodes the command by comparison with a list of valid commands in a look up table stored in the program memory 383. Once the command is decoded, the microcomputer 381 jumps to the routine necessary to carry out that command. In the event that the command received does not correspond to any of the valid commands listed in the lookup table, an invalid command error message is returned to the host. At the completion of execution of a command, a command completion acknowledge signal is returned to the host. The occurrence of any error known to the subsystem 5 occurring during command execution is also signalled to the host, and it can then test the status of the subsystem in an attempt to learn what type of error occurred.

EXAMPLE 2

One critical operating situation arises in the situation where the first host command received by the system is a Seek command, and the very next command received is a Test Drive Ready command. During the fastest portion of the seek, the microcomputer 381 has to receive, process and complete the command by returning a status byte to the host, while simultaneously monitoring track to track crossings of the head and actuator structure, all in such a manner that the actuator does not become lost. In order to carry out this worst case operating scenario, the processing task for processing the incoming command from the host is divided up into several segments. The microcomputer 381 accomplishes the segments in the very little time available between the track boundary sensing and calculations which are required to maintain control over head position during the seek. The microcomputer 381 in effect begins to process the incoming command, and goes as far as it can with the process until it is time to leave it and to sense the track crossing and increment (decrement) the track counter. Then, the microcomputer 381 returns to the task of processing the incoming command until the next time interval elapses for monitoring track crossing.

The seeking algorithm employed in the subsystem 5 is interrupt driven by a timer. It is a position algorithm, rather than a velocity or acceleration algorithm. Every 150 microseconds during track seeking, the microcomputer 381 is interrupted and carries out a Seek routine. It looks at the digital P1-P2 phases to see how far the actuator has progressed in that fixed time interval, i.e. how many tracks have been passed over by the head during that time; and, it updates the tracks traversed register and checks actual location of the transducer against a look up table containing a power acceleration curve which contains expected position data. Finally, it adjusts the acceleration of the actuator 100 to bring head position into correspondence with expected head position stored in the look up table.

For example, if the head 320, 332 has crossed 20 tracks by the end of the interval, and the look up table says the head should have crossed 25 tracks by that time, the acceleration (current through coil 91) is increased to catch up. If the actuator 100 is four tracks off of the target track location stored in the look up table, the actuator 100 will receive a maximum torque value (maximum current will be passed through the coil 308). At the completion of the Seek command, the actuator 300 will be permitted to settle at the target track.

Since the optical encoder 100 is capable of separately identifying each one of four tracks, the timer interval must be selected in relation to the maximum head actuator seek velocity, so that the head will not move more than three tracks during the time interval. If it were to move four tracks, a hopeless ambiguity would arise, making it impossible for the microprocessor to update the track count register and to calculate the current correction value.

Here follows an object cone listing of a control program which actually carries out the operations described hereinabove in a subsystem constructed in accordance with the presently preferred subsystem 5 as described. In this listing, in Tektronics format, each horizontal line represents a separate record. The slash mark is the beginning of each record. The first two hexadecimal bytes correspond to the address of the first byte of the record. The third byte corresponds to the hexadecimal count number of data bytes in the record. The fourth byte comprises an eight bit sum of four bit hexadecimal values for the six digits which make up the address and byte count. The last byte of the record is an eight bit check sum of the four bit hexadecimal digits comprising the program data bytes. All bytes between the fourth byte and the last byte of each record are program data bytes.

```
/000003003477017
/000403075412010D
/0008040C1011AA211A
/00100506549CFF010441
/0018040D69014E622A
/00201E11B04CE3404D13A0AA62436F7079726967687420313938352050 4C5553204434
/003E1E2065762E20436F72702E484454E81664190868807112EF68FF6407FF6406FF83
/005C1E2004FFFFAA40940154D8004844549FFF64011D68807112EF68FFAA6268FF69B1
/007A1E2000710105BA63006400806401546004DD269004DD3640200697F4DD469081B
/00981E204DD169084DD01068FF04FFFF7102003402FF2403FF6BFC31716E047172047E
/00B61E20141006701E83FF341300488334C0FF489371020840E61440A7150502F76427
/00D41E204A084F7E6406FF344700703E9DFF69006364636363654843006407E7AA4063
/00F21E2017134095116A0201585701482241470 2C64CC260CAC6E84CC260CAE369023F
/01101E114F6C5B02C2AA62690358024F6148440004FFFF6409F3641904440500 40EF5B
/012E03140B4FA72F
/01311E14000104050607080A0B0C0D0E0FE0E3E4E5E6E7E8E9EAEBECEDEEEFF0F1F2D3
/014F1E23F3F4F51F037F04520 42606D503D20397055406A0F5B034A03BC03A303B244
/016D1E2302AE02FB02DD05B206390AAC0AD809FD09AE08ED08F40A4F0BCB0AA10B1BA4
/018B1E230AEB09DD08E50B75093466FF71800540110C6409F740A701401102B8700E45
/01A91E23A2FF656603542B03346EFF5567203472FF4B00715E003436FF01693D016864
/01C71E231A4835483548350703 3D0167073F3D0A073F3B016A6381717D20345201141E
/01E51E2331010166488570E9482812307DF669201503043472FF5D67346EFF709B3B5B
/02031107700FA2FF644A08B804FFFF54D000403D13E1
/02141E1601670720170 25A0307FD636C44000040000C346CFF71800040210C656603FD
/02321E164E1D3471FF5567203475FF2436FF2C3F2C22482A48314831 4831709E3F2A7A
/02501E163B4088026C0358586C01147E0F5F0314190F580214020F6DEE69ED6419085E
/026E1E257079128048297 07D12806409F364190405 03FB44050040EF0BB8703F83FF4C
/028C1E25693340CB0B71800F3466FF40210C3483FF488369107041140008 74ED44103D
/02AA041A064893B831
/02AE1E29407B0CB8407B0C6406FE6AFF40CE026A0040CE026406FFB86406FF6930548C
/02CC1E29F501340000 6933 40CB0B2428804400080A3A3274FFFB340000693140CB0B1E
/02EA1E29242880440 0082A2A60FA4FD03274FFF7B8407B0C403D136406FE34000044 4C
/03081E1A0020690 70 9332 74FFFA633F6406FF6700B8693154F501407B0C550201B847
/03261E1A6908 54F501440300400 00 C718003346EFF5567203472FF40210C69ED707937
/03441E1A128040020FB8407B0C44000040000C718000349BFF4FE2407B0C440700400E
/03621E1AEF0B69EF7079128040020F34A4FF71800740110C01A4634801A5634701A640
/03801E1A634901AB370C690B6387408A1501A71801A81934320174EF44C80048A4343A
/039E1E294AFF4893B8407B0C44FF0140C50B340000 7 03E7AFF69EF40D60B40020FB884
/03BC1E29407B0C44FF0140C50B703F7AFF69ED40D60B40020FB8715E80402A0C409FB0
/03DA1E290F40ED0C717604402C1240F41240E50D146004701E9DFF6409FE383A64195D
/03F81E29014843006407F734000369 3140E40B690670792080636D40680E4E11644916
/04161E1A014E0C6409FE30764FC1690154F50140750 87181107139 0071760A69316A2D
/04341E1A0240160740680ECF67004E04644901C76409FE30764FE62039 30814FDDB85E
/04521E1A402A0C409F0F40DB0340070EB8F8C0C0B0401713483A690740E1146409FE53
/04701D1940171370692280 57F06407FFA0AA62407B0C056BF85C024E877176043445
/048D1E28A000703E85FF40AE0CD3406705F85502084E2E15020840A7150502F7B84047
/04AB1E287414405708400014703F3DFFA7340000703E3BFF74EFB83076C1C8409F0F6B
/04C91E28402C124FBE40380540741414FBFF408505346009703E85FF404 91235A5C04C
/04E71E28C6406705F54E2240491201A474B8A5C6406705F34E1340741414FFFF408558
/05051E1905402C12407414400014B80502EF403805014C5858C66900595869FF634F32
/05231E19014C555801C669FF59586900635014F6FF408505B80502FD34200340AC114C
/05411E196700D015020240E0114 0590540E01140590 5B86905547E00205805580301E4
/055F1D27505858014F6356B8716700716A1471690140F2083485FF488369147 0612C
/057C1B24489314000074EDB9B8440000343BFF4895A54893400014409F0FB82D
/05971E24402A0C409F0F719B0044FF01407208409008693 36A1940160740680EC5402A
/05B51E242E07C1F045030840020F703F7AFF69ED40D60B3081C440020FB840FE0D546B
/05D31E24780C017B1604637B4FCC402A0C409F0F44030275 66E544050240720B40902F
/05F11E240869336A09 40160740680EC5402E07C1F045030840020F703F7AFF69ED404F
/060F1E24D60B3081C440020FB840FE0D54780C017B1604637B4FCC402A0C409F0F7167
/062D1E249B0044FF01407208409008693 36A1940160740680EC5402E07C1F03081C127
/064B1E24B840FE0D54780C4FE4402A0C409F0F44FF01407208409008340 00069EF4059
/06690217D60B1E
```

```
/06681E2640020F69316A024016073081CC40680EB8402E07B8718100EA703F78FF7442
/06891E261604703E78FF69EF40D60B40680ECC402E07C869316A02401607F0017B1665
/06A71E2604637B40FE0D54780C4FB9402A0C409F0F4403027366E64405024072084040
/06C51E26900834000069EF40D60B40020F69316A0A4016073081CC40680EB6402E072C
/06E31E26B8718100EA703F78FF741604703E78FF69EF40D60B40680ECC402E07C869A1
/07011E17316A0A401607F0017B1604637B40FE0D54780C4FB9703F7AFF40E40B342164
/071F1E26804B0101397079278007333B636DB86409FE67004E33701E7DFF0B67004E61
/073D1E261E57704E33745A044E2E745A084E2F745A10D65704D357024E55745A03D162
/07581E26CE65660AC47366E6B8691F6912691C691D691E691430764E34C840AE0CC79E
/07791E266910691954F5017069248074F837D37069258074F836CB70692680071F7456
/07971E26E8384FD33076C469154FDB405708409F0F402C12B96566E5B86566F3B84695
/07B51E26480064O6FE703F7AFF44000274C7B7693140CB0B348AFF71800540110C0153
/07D31E268774B89BC1D4348AFF2490FF6A052D70FAC82252F91503104E21348AFF249A
/07F11E2690FF6B0531407C176406FF30774FA80503EF018774B89BC5691154F5017072
/080F1E263F7AFFA7703F96FF74C7B7B3693140CB0B34A4FF71800240110C01A4749089
/082D1D259863A401A574909963A501A674909A63A6A3693340CB0B34A4FF71800254
/084A1E2540210C716E981C304718100B8706E2480706F2580A770692680070348A420
/08681E2548217041343DFF1893B840C50B34298048333324B0E34248001373D01363D36
/08861E2501383B690270792280B83478FF4400004895489315030830810034900FF6A2A
/08A40A200569003D52FD40550EB876
/08AE1E2F3468FF69FC70FDC9690A70FDC4483A70FBD701021A409B0C0A74E802C847AD
/08CC1E2F10C56906547E00150302B80503FD54F301590354F30154DD05590354F30125
/08EA1E2F54B206590354F301402A0C016A633B1502024569010502FD55038054620902
/09081E201502046901455802C5483A0502FB550202CA483A1A0102160463020A74C001
/09261E2056635640171301 4C74E056450204483A74B04C4E1F403A1474E8584E17633B
/09441E2058344FFF555801324CC074E057455802483A70C36356303B4FAA40F412B863
/09621E20013B550202483A74C051635140591840591 8B8590354F301408B0944010001
/09801E2040000C7180013485FF4E8369004DCC44FFFF48D248450034AD09703EA0FF83
/099E1E2F40A412700E7DFF550208FF401713FC69044DCC700F7DFF34C809703EA0FFA1
/09BC1E2F40A412AA550208FF401713FC48C03485FF4893700F7DFF40D012AAB859037C
/09DA1E2F54F30144010040000C718001345FFF4E2344FF0740C50B34000069ED40D62B
/09F81E2F0B40020FB8590354F30144FF0040000C7180FF3400FF40210C69ED70791240
/0A161E208040020FB8590354F30144EF0040EF0B69EF707912804 0020F3400FF718046
/0A341E20EF40110CB8590354F301402A0C40D40C718111717A00717B0014620A701E1F
/0A521E209DFF484300700E7DFF6407F7401713FC700F7DFF6407FFAA690051FE6A05B2
/0A701E2040E30C00701E7DFF017B1E017A46041F4602637A693340CB0B347DFF718065
/0A8E1E2F0140210C30814FD8446B0040C50B340000703E7AFF69ED40D60B40020FB843
/0AAC1E2F590354F301402A0C409F0F44700 40C50B34000369EF40D60B40020F54DE38
/0ACA1E2F03590354F301402A0C641A8040E50D6409FE70692080690670792080403D27
/0AE81E2F13401713645A10F9640A7FB8590354F301402A0C40E50D342C0B703E9DFF5C
/0B061E204843006407F76409FE6906707920804017137069228047F0F6690070792029
/0B241E20806407FF6409FEB8B0690740E114483A483AC06419014017134017134017 32
/0B421E20137069228047F06409FEA0AA62590354F301402A0C40E50D34870B703E9D52
/0B601D1FFF64190148430064 07F76906707920804017137069228047F0F66900701A
/0B7D1E2E7920806407FF6409FEB8B0690840E114C0006409FE690640E114C06900004A
/0B9B1E2E641901A0AA62590354F301402A0C40491244010040000C71800134A4FF40F9
/0BB90C2B210C69ED7079128040020FB883
/0BC51E2B340A804893B8A7240C80489270791380B9A724088048927070712800503F73A
/0BE31E2BB8A7240804892707910 80B840C50B340003693140CB0B69EE40D60BB84043
/0C011E1CC50B340003693340CB0B69EE40D60BB840020F01801B2428802A002A3D5333
/0C1F1E2BFCB82428802D3A3080FBB8346EFF5567203472FF69803B407B0C6409FE3498
/0C3D1E2B36FF4B85701F47FF74BD4E2F08670369FF182D071F74B8494E21070348A49E
/0C5B1E2B4821483670412D3711D30A07013D489340900C550302B834650274AFB8692C
/0C791E2B21D0556720CC550208C8656600B85802FDB8690454F5015701C46409FDB861
/0C971E2B641902B86480 0B690640E1144CE00502EF3780150210B840D40C717F126A35
/0CB51E2B8540E30CC76700D0745B30CC706B2780744BFFC44 0750 8B8307FE440750870
/0CD31E2BB93429804B33324B0769027079228 0B69334 0160740680EB8B96920356A3C
/0CF11E2B114F97717F0940D40C69004DCC44FFFF48D2141B0D701E9DFF484300700E91
/0D0F1E2B7DFF6407F7401713FC69044DCC700F7DFF6407FFAA718100717D114017138A
/0D2D1E2B34870048C074AFFB44FA00C848C074AFFB44900174C7B7B36A8569334 01684
/0D4B1E2B07A3644A10C748C074AFF74E267069208057304E247069278067114E1C204A
/0D691E2B8165811 24E266B0540171353FB44FD0174C7B74FBB2420804A002A757D114C
/0D871E2BC60181637D4FDA307F4F68717D113400036 93340CB0B34D0D016AAC1C6B6A
/0DA51E2B00703F36FFA701381D6A00342B800083B093B0D74985E3B017D60FBC34B1160
```

```
/0DC31E2BC90A3B60C4371166111A43747B124FE0B8010109060D0703050F020C0E0A25
/0DE11E2B040B08106903707922806912707921803B0E70692080B84004
/0DFF1E3A550E2039753911B971390001384174E84969006338707926807700D6343622
/0E1D1E2BFF4883A84893703F47FF74EFB83424B0083D093D013A4167026900633A406D
/0E3B1E2B900C7700B9343DFF4883AB34 BFF4B9334660274EFB8409F0FB97177035592
/0E591E2B6B40717700717603356B80717600B85503804E8D4CC0637C6A03585B6A0140
/0E771D2A0A4DC8717D30717E09690440E1140A644A104E5E4DC84CE0644A104E555F
/0E941E2A74E056644A104E4D555802483A644A104E4374C0574DC0644A104E39596D5C
/0EB21E2ADF644A104E316610483A644A104E2874C07C644A104E2026E0641901644A40
/0ED01E2A10D7307D4FAF644A10CF307E4FA7690070792080701F2080B969FF701F2073
/0EEE1E3980645901B9747B00B96900B84017136 45A10F9E758024E875503804E736C52
/0F0C1E2A0358586C010C4DC8690540E114645A044E300C645A044E2A4DC84CE0645A62
/0F2A1E2A044E2174E056645A044E19555802483A645A044E0F74C057645A044E074D50
/0F481E2AC0644A044FCB644A20B80C644A20B84DC84CE0644A20B874E056644A2CB879
/0F661D29555802483A644A20B874C057644A20B84DC0645A204FD1B8401713644A43
/0F831C2704F9401713645A20F9B8645A04C55802F94F70644A20B85802F94F6755
/0F9F1E3640D80F5802FDB8402A0C5F6BC4409F0FB840110234680 0703E9DFF6407EF8F
/0FBD1E3640D80F5802C8BA644A08C754D800645A08F104FFFFAA4094014FE8405B1389
/0FDB1E366409EF40CC13243BFF4884703F4AFF64192074BF6409DFB5746AFF641920A8
/0FF91E3648847 01E3DFF74EDB874E50857804E0A0502FD715BC0715C40CF14FFFFF74B6
/10171E1B93A8150202715B40715CC01503010503DF0502FEB440B613A4456B074E5E39
/10351E1814010074AD4E4448A04894B5481A122443FF34471B48A4488E4894A548A462
/10531E18488E489213701E41FF1114E01024000034391A116900590269FF4DC0699639
/10711D174DDA648590648580484100640FFDB8015B4DC0699F40E1141134431A144D
/108E1E262F19114FDC340000715D06B548224833015D482160AB460160BB6601370A27
/10AC1E26690A270469044825635D40E01169015902483A74C05807036358015058381B
/10CA1E26014F6356A974FF4FC640591840961340F412150201B84CC207031A4822603A
/10E81E2692635914FF105502025100070374F85814E01032101162015918B4CC20703FA
/11061E171A48226092635960E35902483A0703747C00483A60452B60E5747C00483A30
/11241E1744000064800047B0D7483A1848A048A05902D5015B7041086700C369FFD834
/11421E1709D61848A048A05902EB015B70610867FFC36900C309483A4DC0747C004E6B
/11601E1722701F43FFA574FFD8013F60E574C0411D015C635B6CFF703F43FF14FF10A2
/117E171F10116232F8449C1A74AFCA743D03C6142F1910116233E6FE
/11931E1F4CC074A0632064636320658016463576900636363648B150280703E96FF34
/11B31E1F715D0240E01177004E1F69015902483A74C058070363580150585801 4F631A
/11D11E1F5630964FE030974FDC690005027FB9015D5958483A550202483A74C0566355
/11EF1E2E564017135F02CB4CC074E0574630269F4E28407414015058 58014F74E04C43
/120D1E1F555802483A550202483A27804FC5055803403D1474E8584FBA6900B869FF61
/122B1E1FB85C02B834E816703EA0FF0503DF40A4124017135D03FA641F2040D012B857
/12491E1F0502FB346412703EA0FF40A4124017135A02FA40D012AA401713BEB0B14C36
/12671E1FC11A7566F007FD4DC1690240E1144082120A4DC1484300A1A0AA264800941
/12851E1F690640E1144CE063A46900483AC0C0648009690440E1144CE063A51502042A
/12A31E1FB84CC75710DC249DFF488214660074BDC4444700C1A507F7BA48924DC7489B
/12C11E1F4300AAB8703E9DFF484300640FF7B84CC75710DB249DFF488214660074BD9B
/12DF1E2EC4444C00C3446B001708BA48924DC7AAB8641F08B8717FFF71820A4CC06389
/12FD1E2E5A307FC56904547E004017134CC074E05A4 60526F5E43082EBB85F03D76466
/131B1E1F80000151635214000070 1E53FF690840E11440DF18B8403D13690340E1140D
/13391E1F404B13B86406FF5858C46 48003B8648001B84CE074E056555802483A74C05B
/13571E1F574DC0B82061256117B87161006A032062C1D101626A0C6740CA6A30678029
/13751E1FC56AC060FAB83431FF717F040A708B60EA4E080A4821608A70C33B32307F79
/13931E1F4FECB8408A14403D14635801505858014F6356701F3BFF40A8141A708B605B
/13B11E1FEA402C12B8408A1440B7196351701F3BFF40BC14342CFFAD6357B8701F3D86
/13CF1E2EFFA55C02D95D03D6407414409914014FBD420150BDB540A81416FF708B3B75
/13ED1E2EB540BC14342CFF0157BD690063636346365B8013D07031B702F4FFF746B6F
/140B1E1F00CB0C1A0D4057141C0A1D53F16B133404FF0D3D0C3D1A0D1C0A4057141D56
/14291E1F53F26B0401573D53FD69FF6B043D53FDB8407414717D00015074A84F717D7A
/14471D1E034057146A0274B84F6A030A74907DB8B4B1701F4CFF6A00A548A470615A
/14641E1EB50B746A00C76900742A8069FFA1A4B8648000690440E1144CE0634F69045A
/14821E1E40E1144CE16350B8701F3BFF409914AD634F42AD6350B840BC14482648266F
/14A01E1E601A48263404FFB840BC146B0351C83431FF0A60470BB848274827F10B075D
/14BE1E2D03746AFF14000048274836B8483A483AC0B0696140E114A0C05154CA14B848
/14DC0A28483A483AC05154DC14B87E
/14E61E2B484400341080 69303D3D69EE3D3269053B4409F364190444050040EF0B7136
/15041E199C54719D6B719E00719F546407EFAA71030C. 80345D156B0C3134238051
```

```
/15221E194B01242980346A15142E80717D00017D3A2D39122D3913207D5C7DF2706940
/15401E192080343301703E47FF7149043490017O3E4AFF71870B719B00408A15B80337
/155E1E28CAD800001818280A0C880000CA3302000AFF01FF01530400020003FF0AFF2A
/157C1E2801FF01530000060002FF09330133718 9FF3488FF01872707C54B0032660829
/159A1E281A69FF746A00C4482152F83BB83001D340D0120502F671010564194040B933
/15B81E2816409401F9698063576340690063676 36B36563636364714DAE714E1E6452
/15D61E2800806409BF409B0C5502104E2334FFFF40C616403A14635801503858014F3D
/15F41E28635640F41234320003O2FD40AC1116FF635F64006071900171919E7192FF37
/16121E1940B91640940130 92F73091F43090EB34A04140C61615022064009871760 40B
/16301E194CC207031A4CC20 70360EAF91A3076F57131807158007156804059180 14C32
/164E1E28634F71500014900 01056BF840850540F41240F41240171340951155 65FFF61B
/166C1E280502FD715D0140E 011713B8030 14F74C0 504831634E40E011715802014F630D
/168A1E285640E011715B801014F74C0504831634D74C04E4831634C635640F41240F426
/16A81E281240B91640940140 8204716E00710105B8645F10C5644A0BB8B9000000B90E
/16C61E28703E96FF717F0140B916 409401408B09703F85FFA7703F96FF484574BFE69E
/16E4041D307FE6B840
/16E81E2C6409FD484300AAB0B1B45C024E6F690040E114747200C04082120 13A409029
/17061E1D0C44A041406B1740171301A474C0A348311A27414E3F01A4453D0101A54413
/17241E1D00001848A048A048A04017136406FE6 900C1417062480AFA6406FF6620452C
/17421E1D5802483A74C056635640D01240F41248 4300703FA0FF40A412150320405B14
/17601C1B13A4A1A062013A40900CF048D269004DCC484500690 44DCC640FDFBE51
/177C1E2A440810018A1A018B1B018C1C018D1D018E1E018F1F747A00D10B1A0C1B0D4E
/179A1E2A1C0E1D0F1E6F0069087041EB097700C50867004E8DA9482248330C48311C5A
/17B81E2A0D48311D0E48311E0F48311F480AD274128C74130C74140A74152874161839
/17D61E2A7417080A609D60 9E609F77004FC20B74D8884FBC0C74D8894FB6094707CDA5
/17F41E2A48230C48311C0D48311DA74FEF48A048A048A03496FF48950B3D0C3D0D3B8A
/18121E1B6A080B403F18CA0C403F18C50D403F18000A1F6A200D404C18CA0C404C1855
/18301E1BC50B404C18000A60E7639BB869FFFA717D074825481AB842307DF7B9717D97
/184E0B26074821481AB852307DF7B988
/18591E260502FE0503FE44FFFF406B1764800069C84DDA648590648580484100640F70
/18771E26FD1114821811450201FCB80151635271530071540 00502FB71820A015263F8
/18951E265A149C1810116240DF18015274E05A460A26EBE63082EA150204 71820A7134
/18B31E26550014BB1811106240DF1874E057460526F571820A3082EA641F2215020 11A
/18D11E265803E140961340F41264191 04FD640BD196480001C3452FF2B60E41B6A003D
/18EF1E3557806AFF0C3D488374C548955A02D60970C35780C8273FCC20576640C73784
/190D1E26C1C43057464 03B015748A47041086700CD2780C569004DC0B869FF4DC0B867
/192B1E26094DC0B8B340BD196480 006352A369C84DDAA734381A74E7B748A474C7488B
/19491E26A048A048A434AF1D74C7B7015174E052550202483A1D6C0044FFFF40 6B1767
/19671E264E4B8340BD19648000A31A74E052550202 483A57804F04A6706136481AF74A
/19851E260A6352488374E6015C5902CA7041B50B747A0069FFCB7061B50B4B3A747A6D
/19A31E26FF69004DC0333344AF1D74EF4FCB14691911106 201501B014FC54CE11B4C72
/19C11E26E034FB1D74B04C4E361A0B74B04CD6602ACC44000018483EAE6640483AB879
/19DF1E356B00A54B3DAEB8483A602ACA440000 18483EAE4640B86B00A54B3DAE66B077
/19FD1E35483AB8483A1A0B74B04CD6602ACA440000 18483EAE6640B86B00A54B3DAE79
/1A1B1D25483AB8483A602ACC440000 18483EAE66C0483AB86B00A54B3DAE46B0B872
/1A381E250000000000000000000000000000000 0010101010102020202020303031 9
/1A561E2503040404050505060606070707080808 09090A0A0B0B0B0C0C0D0D0E0EF6
/1A741E250F0F10101111121213141415151617171819191A1B1B1C1D1D1E1F202021EA
/1A921E2522223232425262627282 92A2B2C2C2D2E2F3031323334353636373839 3A3B1D
/1AB01E253C3D3E40414243444546474849 4A4B4D4E4F5051525455565758 5A5B5C5D63
/1ACE1E345F60616364656668696A6C6D6F70717374757778 7A7B7D7E80818384868790
/1AEC1E34898A8C8D8F90929395979899A9B9D9FA0A2A4A5A7A9AAACAEB0B1B3B5B7B8FA
/1B0A1E25BABCBEBFC1C3C5C7C9CACCCED0D2D4D6D8 DADBDDDFE1E3E5E7E9EBEDEFF176
/1B281E25F3F5F7F9FBFD00020406080A0C0E10131517191B1E2022242629 2B2D2F324B
/1B461E2534381A481A4E1A531A571A5B1A5E1A611A641A671A691A6B1A6E1A701A7263
/1B641E251A741A761A781A7A1A7C1A7D1A7F1A811A821A841A851A871A881A8A1A8BBA
/1B82171E1A8D1A8E1A8F1A911A921A931A951A961A971A991A9A1A39
/1B991E2D9B1A9C1A9D1A9E1AA01AA11AA21AA31AA41AA51AA61AA71AA81AA91AAB1AA1
/1BB71E2DAC1AAD1AAE1AAF1AB01AB11AB21AB31AB31AB41AB51AB61AB71AB81AB91AAC
/1BD51827BA1ABB1ABC1ABD1ABE1ABF1ABF1AC01AC11AC21AC31AC41A71
/1BED1E36C51AC61AC71AC81AC91ACA1ACA1ACB1ACC1ACD1ACE1ACE1ACF1AD01AE5
/1C0B1E27D11AD21AD31AD41AD51AD51AD61AD71AD81AD81AD91ADA1ADA1ADB1AC2
/1C291E27DC1ADD1ADD1ADE1ADF1AE01AE01AE11AE21AE21AE31AE41AE41AE51AE61AD0
/1C470820E61AE71AE81AE81A81
```

```
/1C4F1E2FE91AEA1AEA1AEB1AEC1AEC1AED1AEE1AEE1AEF1AF01AF01AF11AF21AF21AF9
/1C6D1E2FF31AF41AF41AF51AF51AF61AF71AF71AF81AF91AF91AFA1AFA1AFB1AFC1AF4
/1C8B1E2FFC1AFD1AFD1AFE1AFF1AFF1A001B001B011B021B021B031B031B041B041B6D
/1CA91223051B061B061B071B071B081B081B091B0A1BAE
/1CBB1E320A1B0B1B0B1B0C1B0C1B0D1B0E1B0E1B0F1B0F1B101B101B111B111B121B3C
/1CD91E32121B131B141B141B151B151B161B161B171B171B181B181B191B191B1A1B20
/1CF71E321A1B1B1B1B1B1C1B1D1B1D1B1E1B1E1B1F1B1F1B201B201B211B211B221B4C
/1D151A1F221B231B231B241B241B251B251B261B261B271B271B281B291BFA
/1D2F1E2E291B291B2A1B2A1B2B1B2B1B2C1B2C1B2D1B2D1B2E1B2E1B2E1B2F1B2F1B88
/1D4D1E2E301B301B311B311B321B321B331B331B341B341B351B351B361B361B371B12
/1D6B1E2E371B371B381B381B391B391B3A1B3A1B3B1B3B1B3C1B3C1B3C1B3D1B3D1B79
/1D891C2C3E1B3E1B3F1B3F1B401B401B411B411B411B421B421B431B431B441B27
/1DA50A27441B451B451B451B461B69
/1DAF1E3601000100020005000800000001200180001F002700310038004600520005F007A
/1DCD1E366D007C008C009C00AE00C100D500EA00FF0016012D0146015F017A01950115
/1DEB1028B201CF01ED010D022D024E027002940292
/1DFB1E370000000000000001010101010202020202030303030303040404040437
/1E191E280404050505050506060606060606070707070708080808080809090C4
/1E371E28090909090A0A0A0A0A0B0B0B0B0B0B0C0C0C0C0C0C0D0D0D0D0D4B
/1E551E280D0D0E0E0E0E0E0E0F0F0F0F0F0F0F101010101010111111111107
/1E731E2811111212121212121313131313131414141414141515151557E
/1E911E2815151515161616161616161717171717171718181818181818E7
/1EAF1E3718191919191919191A1A1A1A1A1A1A1A1A1B1B1B1B1B1B1B1B49
/1ECD1E371B1C1C1C1C1C1C1C1C1C1D1D1D1D1D1D1D1D1D1D1E1E1E1E1E1E9F
/1EEB112A1E1E1E1E1F1F1F1F1F1F1F1F1F1F1F1F20FE
/0015030905218515
/00000000
```

Having thus described an embodiment of the invention, it will now be appreciated that the objects of the invention have been fully achieved in realizing a completely self contained, compact, modular plug-in disk file subsystem, and it will be understood by those skilled in the art that many changes in construction and widely differing embodiments and applications of the invention will suggest themselves without departing from the spirit and scope of the invention. The disclosures and description herein are purely illustrative and are not intended to be in any sense limiting.

We claim:

1. A fixed disk memory subsystem for electrical connection to digital address, data and control signal buses and a power supply of a host computer, comprising:

printed circuit board means for physical attachment of the fixed disk memory subsystem to the host computer and forming a mounting and electrical interconnection substrate for interconnecting elements comprising a head and disk assembly means and comprising disk drive electronics, and including an interface connection means for electrically connecting the fixed disk memory subsystem with the host computer, the head and disk assembly means including a housing mounted directly to the printed circuit board means and electrically connected thereto by plug and jack connection means, at least one rotating data storage disk having a diameter not substantially greater than 95 millimeters and defining a multiplicity of concentric data storage tracks, a radially positionable head transducer for flying in close proximity to the data storage surface of the rotating data storage disk, read preamplifier/write driver circuit means connected to the head transducer and to the disk drive electronics via the plug and jack connection means for reading data from, and for writing data to, each selected data track and for reading embedded head position servo information, rotary voice coil actuator means for positioning the data transducer at concentric data tracks defined on said surface in accordance with control values supplied by the disk electronics via the plug and jack connection means, and DC brushless spindle motor means for rotating the data storage disk at a predetermined rotational velocity, the disk drive electronics including:

a data head transducer position servo control means for controlling operation of the rotary voice coil actuator means in relation to the concentric data tracks in response to servo information including the embedded head position servo information during track seeking operations when the data head transducer is moved radially from a departure track location to a destination track location, and during track following operations when the data head transducer is held in alignment with a centerline of a said data track being followed during data reading and writing, read/write electronics means connected to the read preamplifier/write driver for processing data signals to and from the disk during data writing and reading, disk user data sequencer means connected to the read/write electronics means and to disk buffer memory means for controlling the formatting, storage and retrieval of blocks of user data to and from the concentric data storage tracks, the disk user data buffer memory means for temporarily storing at least one data block of user data in transit between the disk and said host computer, buffer memory controller means connected to the disk user data sequencer means for controlling addressing of said disk user data buffer memory means as user data is transferred between the disk and the disk user data buffer memory means, and to an interface means for controlling addressing of said disk user data buffer memory means as user data is being transferred between the disk user data buffer memory means and the host computer, interface circuit means connected to the address, data and control signal buses of said host computer via said interface connection means and to said disk user data buffer memory means and to said buffer memory controller means, for obtaining digital control signals and digital data blocks from the host computer for storage in predetermined ones of said data tracks via said disk buffer memory means, and for supplying digital status signals and digital data blocks retrieved from predetermined ones of said data tracks to the host computer, and programmed digital microcontroller means connected to the interface circuit means for receiving, decoding and executing digital control values from the host computer and for thereupon controlling operations of said data head transducer position servo control means during track seeking operations and track following operations, and said disk user data sequencer means, said buffer memory controller means and said interface circuit means during data reading and writing.

2. The fixed disk memory subsystem set forth in claim 1 wherein the printed circuit board means defines a serface having a first area and a second area, and wherein the head and disk assembly means is mounted directly to the printed circuit board means at said first area thereof, and wherein the drive electronics is mounted directly to the printed circuit board means at the second area thereof.

3. The fixed disk memory subsystem set forth in claim 1 wherein said data head transducer position servo control means includes a multiple phase optical encoder means including a scale means movably attached to said rotary voice coil actuator means for providing head position information.

4. The fixed disk memory subsystem set forth in claim 1 wherein the interface connection means comprises an edge connector extension region of the printed circuit board means carrying a multiplicity of aligned, parallel connection traces for mating with an edge connector receptacle of the host computer.

5. The fixed disk memory subsystem set forth in claim 1 wherein the head and disk assembly means includes at least one flexible plastic film multi-conductor means extending therefrom to said plug and jack connection means for enabling said electrical connections to be made between said rotary voice coil actuator means and said preamplifier/head driver circuit of said head and disk assembly means, and said printed circuit board means.

6. The fixed disk memory subsystem set forth in claim 5 comprising a plurality of flexible plastic film multi-conductor means, and wherein said plug and jack connection means comprises a plurality of plugs and jacks each connecting a said one of the plurality of flexible plastic film multi-conductor means to the printed circuit board means.

7. The fixed disk memory subsystem set forth in claim 1 wherein the drive electronics further includes an external BIOS program memory means for storing program instruction sequences executed by the host computer.

8. The fixed disk memory subsystem set forth in claim 1 wherein said housing comprises a generally thin and flat, rectangular box-shaped housing integrally defining a bottom wall and four sidewalls, and a cover means removably secured over gasket means to the housing at an upper peripheral edge defined by said four sidewalls.

9. The fixed disk memory subsystem set forth in claim 8 further comprising a flexible plastic film multiconductor means entering an interior space of the housing at the gasket means, and wherein said plug and jack connection means comprises a plug and jack connecting the flexible plastic film multi-conductor means to the printed circuit board means.

* * * * *